(12) United States Patent
MacKay et al.

(10) Patent No.: US 12,368,227 B2
(45) Date of Patent: *Jul. 22, 2025

(54) SINGLE SPACE WIRELESS PARKING WITH IMPROVED ANTENNA PLACEMENTS

(71) Applicant: J.J. MACKAY CANADA LIMITED, New Glasgow (CA)

(72) Inventors: George Allan MacKay, New Glasgow (CA); Gregory Emile Chauvin, Brookside (CA); Neil Stuart Erskine, Halifax (CA); Darren Scott Cameron, New Glasgow (CA); Donald Wesley Church, Halifax (CA); Ben Garvey, Halifax (CA); Josh Michael Bablitch, Port Washington, WI (US); Matt Gonia, Hubertus, WI (US); Glenn Eric Pederson, Sussex, WI (US); Robert Thomas Buczkiewicz, West Bend, WI (US)

(73) Assignee: J.J. MACKAY CANADA LIMITED, New Glasgow (CA)

( * ) Notice: Subject to any disclaimer, the term of this patent is extended or adjusted under 35 U.S.C. 154(b) by 170 days.

This patent is subject to a terminal disclaimer.

(21) Appl. No.: 18/142,435

(22) Filed: May 2, 2023

(65) Prior Publication Data
US 2023/0268636 A1    Aug. 24, 2023

Related U.S. Application Data

(63) Continuation of application No. 17/222,694, filed on Apr. 5, 2021, now Pat. No. 11,670,835, which is a
(Continued)

(51) Int. Cl.
*G07C 1/30*      (2006.01)
*G04C 11/00*     (2006.01)
(Continued)

(52) U.S. Cl.
CPC .......... *H01Q 1/225* (2013.01); *G04C 11/026* (2013.01); *G04G 7/026* (2013.01);
(Continued)

(58) Field of Classification Search
CPC ........ G06Q 30/0284; G07C 1/30; H01Q 1/38; H01Q 1/42
See application file for complete search history.

(56) References Cited

U.S. PATENT DOCUMENTS

| | | | |
|---|---|---|---|
| 480,108 A | 8/1892 | Loch | 232/62 |
| 1,189,991 A | 7/1916 | Mugler | 70/120 |

(Continued)

FOREIGN PATENT DOCUMENTS

| | | | |
|---|---|---|---|
| AT | 507762 | 7/2010 | G07F 19/00 |
| AU | 4035701 | 9/2001 | G07F 17/24 |

(Continued)

OTHER PUBLICATIONS

US 8,636,133 B2, 01/2014, MacKay et al. (withdrawn)
(Continued)

*Primary Examiner* — Christle I Marshall
(74) *Attorney, Agent, or Firm* — HAYES SOLOWAY P.C.

(57) ABSTRACT

A wireless parking meter with an improved antenna location is described. The antenna may be located within a covering protruding from the top of the parking meter, allowing radio frequency (RF) signals to be transmitted through a portion of the parking meter with high permittivity to the RF signals. Additionally or alternatively, the antenna may be located within the parking meter housing above a lower parking meter mechanism housing so that RF signals can be transmitted through the dome covering of the parking meter, which may have a high permittivity to the RF signals.

14 Claims, 17 Drawing Sheets

Related U.S. Application Data continuation of application No. 16/709,531, filed on Dec. 10, 2019, now Pat. No. 10,998,612, which is a continuation of application No. 16/165,844, filed on Oct. 19, 2018, now Pat. No. 10,573,953, which is a continuation of application No. 15/348,785, filed on Nov. 10, 2016, now Pat. No. 10,141,629, which is a continuation of application No. 13/141,977, filed as application No. PCT/CA2009/001657 on Nov. 18, 2009, now Pat. No. 9,494,922.

(60) Provisional application No. 61/140,543, filed on Dec. 23, 2008.

(51) Int. Cl.
*G04G 7/00* (2006.01)
*G06Q 30/0283* (2023.01)
*G07B 15/02* (2011.01)
*H01Q 1/22* (2006.01)
*H01Q 1/24* (2006.01)
*H01Q 1/38* (2006.01)
*H01Q 1/42* (2006.01)
*H04W 52/02* (2009.01)

(52) U.S. Cl.
CPC ......... *G06Q 30/0284* (2013.01); *G07B 15/02* (2013.01); *G07C 1/30* (2013.01); *H01Q 1/24* (2013.01); *H01Q 1/38* (2013.01); *H01Q 1/42* (2013.01); *H04W 52/0235* (2013.01); *Y02D 30/70* (2020.08)

(56) References Cited

U.S. PATENT DOCUMENTS

| | | | |
|---|---|---|---|
| 1,445,771 A | 2/1923 | Keplinger | |
| 1,818,568 A | 8/1931 | Melick | 194/203 |
| D98,810 S | 3/1936 | Magee | |
| D100,875 S | 8/1936 | Michaels | |
| D101,237 S | 9/1936 | Miller | |
| D106,561 S | 10/1937 | Broussard et al. | |
| D107,577 S | 12/1937 | McGay | D10/42 |
| 2,118,318 A | 5/1938 | Magee | 194/84 |
| D112,677 S | 12/1938 | Broussard et al. | |
| 2,161,046 A | 6/1939 | Hitzeman | 194/205 |
| D116,805 S | 9/1939 | Reznek | |
| 2,229,183 A | 1/1941 | Mitchell | 194/277 |
| 2,261,353 A | 11/1941 | Gaetano | 70/120 |
| 2,289,838 A | 7/1942 | Herschede et al. | 194/226 |
| D152,294 S | 1/1949 | Siegel et al. | D20/10 |
| D152,587 S | 2/1949 | Brundage | D52/3 |
| D154,716 S | 8/1949 | Simpson | D10/42 |
| 2,483,805 A | 10/1949 | Broussard et al. | 232/1 |
| 2,495,784 A | 1/1950 | Starts | |
| 2,535,472 A | 12/1950 | Wood | 161/15 |
| D161,888 S | 2/1951 | Wilkin | D52/3 |
| D162,698 S | 3/1951 | Teague | D52/3 |
| 2,546,433 A | 3/1951 | Dick | 368/6 |
| 2,547,272 A | 4/1951 | Lawson et al. | 116/282 |
| 2,550,433 A | 4/1951 | Tichenor | 224/1 |
| 2,570,920 A | 10/1951 | Clough et al. | 232/16 |
| 2,575,650 A | 11/1951 | Alexander | 161/15 |
| D166,059 S | 2/1952 | Yoss | D10/42 |
| 2,594,388 A | 4/1952 | Broussard | 194/1 |
| 2,595,124 A | 4/1952 | Campbell | 250/27 |
| D166,753 S | 5/1952 | Jones | D10/42 |
| 2,596,122 A | 5/1952 | Broussard | 194/101 |
| 2,596,123 A | 5/1952 | Broussard | 194/1 |
| 2,596,124 A | 5/1952 | Broussard | 368/90 |
| 2,599,881 A | 6/1952 | Woodruff | 368/92 |
| 2,613,792 A | 10/1952 | Broussard | 194/72 |
| 2,613,871 A | 10/1952 | Broussard et al. | 232/16 |
| 2,618,371 A | 11/1952 | Broussard | 194/84 |
| 2,633,960 A | 4/1953 | Broussard | 194/72 |
| 2,652,551 A | 9/1953 | Gumpertz et al. | 340/51 |
| D181,359 S | 11/1957 | Jones | D10/42 |
| 2,818,371 A | 12/1957 | Wessinger | 167/93 |
| 2,822,682 A | 2/1958 | Sollenberger | 70/158 |
| 2,832,506 A | 4/1958 | Hatcher | 221/103 |
| 2,945,341 A | 7/1960 | Griffin et al. | 58/142 |
| D189,106 S | 10/1960 | Leiderman | D52/3 |
| 2,956,525 A | 10/1960 | Blauvelt | 109/59 |
| 2,985,978 A | 5/1961 | Breen et al. | 40/333 |
| 2,988,191 A | 6/1961 | Grant | 194/1 |
| 2,995,230 A | 8/1961 | Moody et al. | 194/9 |
| 3,018,615 A | 1/1962 | Minton et al. | 368/7 |
| 3,056,544 A | 10/1962 | Sollenberger et al. | 232/16 |
| 3,114,128 A | 12/1963 | Ljungman et al. | 340/51 |
| 3,141,292 A | 7/1964 | Bailey et al. | 58/142 |
| D199,270 S | 9/1964 | Michaels | D52/3 |
| 3,154,175 A | 10/1964 | Botterill et al. | 188/73 |
| 3,166,732 A | 1/1965 | Ljungman et al. | 340/51 |
| D200,216 S | 2/1965 | Broussard | D52/3 |
| 3,183,411 A | 5/1965 | Palfi | 317/123 |
| 3,194,005 A | 7/1965 | Schalow | 53/142 |
| 3,199,321 A | 8/1965 | Sollenberger | 70/1.5 |
| 3,204,438 A | 9/1965 | Sollenberger | 70/417 |
| 3,208,061 A | 9/1965 | Gervasi et al. | 340/539.31 |
| 3,262,540 A | 7/1966 | Sollenberger et al. | 194/72 |
| 3,272,299 A | 9/1966 | Sollenberger | 194/2 |
| 3,324,647 A | 6/1967 | Jedynak | 368/6 |
| 3,373,856 A | 3/1968 | Kusters et al. | 194/100 |
| 3,438,031 A | 4/1969 | Fathauer | 343/8 |
| 3,486,324 A | 12/1969 | Andersson | 368/90 |
| 3,519,113 A | 7/1970 | Arzig et al. | 194/2 |
| 3,535,870 A | 10/1970 | Mitchell | 58/142 |
| 3,565,283 A | 2/1971 | Sciacero et al. | 221/197 |
| 3,637,277 A | 1/1972 | Krug et al. | 312/217 |
| 3,666,067 A | 5/1972 | Kaiser | 194/225 |
| 3,721,463 A | 3/1973 | Attwood et al. | 287/20.3 |
| 3,770,090 A | 11/1973 | Fayling et al. | 194/1 B |
| D230,511 S | 2/1974 | Stieber | D6/4 |
| 3,858,165 A | 12/1974 | Pegg | 340/3 R |
| D234,606 S | 3/1975 | Gamble | D23/150 |
| 3,873,964 A | 3/1975 | Potter | 340/38 |
| 3,875,555 A | 4/1975 | Potter | 340/38 |
| D235,801 S | 7/1975 | Gore | D52/3 R |
| 3,930,363 A | 1/1976 | Rubenstein | 58/142 |
| 3,941,989 A | 3/1976 | McLaughlin et al. | 235/156 |
| 3,943,339 A | 3/1976 | Koerner et al. | 235/92 |
| 3,964,590 A | 6/1976 | May et al. | 194/83 |
| 3,975,934 A | 8/1976 | Babai et al. | 70/120 |
| 3,982,620 A | 9/1976 | Kortenhaus | 194/1 N |
| 3,991,595 A | 11/1976 | Bahry et al. | 70/120 |
| 3,999,372 A | 12/1976 | Welch et al. | 58/142 |
| 4,007,564 A | 2/1977 | Chisholm | 52/98 |
| 4,025,791 A | 5/1977 | Lennington et al. | 250/341 |
| 4,031,991 A | 6/1977 | Malott | 194/1 R |
| 4,037,700 A | 7/1977 | Heraty | 194/1 |
| 4,043,117 A | 8/1977 | Maresca et al. | 58/142 |
| D246,917 S | 1/1978 | Sauter | D21/3 |
| 4,147,707 A | 4/1979 | Alewelt et al. | 260/37 SB |
| 4,183,205 A | 1/1980 | Kaiser | 58/142 |
| 4,237,710 A | 12/1980 | Cardozo | 70/108 |
| 4,248,336 A | 2/1981 | Fiedler | 194/97 |
| 4,249,648 A | 2/1981 | Meyer | 194/102 |
| 4,264,963 A | 4/1981 | Leach | 364/707 |
| 4,306,219 A | 12/1981 | Main et al. | 340/825.54 |
| 4,310,890 A | 1/1982 | Trehn et al. | 364/467 |
| 4,317,180 A | 2/1982 | Lies | 364/707 |
| 4,317,181 A | 2/1982 | Teza et al. | 364/707 |
| 4,323,847 A | 4/1982 | Karbowski | 324/327 |
| 4,358,749 A | 11/1982 | Clark | G08B 13/26 |
| 4,369,442 A | 1/1983 | Werth et al. | 340/825.35 |
| 4,379,334 A | 4/1983 | Feagins, Jr. et al. | 364/467 |
| 4,409,665 A | 10/1983 | Tubbs | 364/707 |
| D272,291 S | 1/1984 | Hauser et al. | D99/28 |
| 4,432,447 A | 2/1984 | Tanaka | 194/100 |
| 4,438,426 A | 3/1984 | Adkins | 340/64 |
| 4,460,080 A | 7/1984 | Howard | 194/100 A |
| 4,460,965 A | 7/1984 | Trehn et al. | 364/464 |
| 4,472,706 A | 9/1984 | Hodge et al. | G08C 1/01 |
| 4,474,281 A | 10/1984 | Roberts et al. | 194/1 N |

(56) References Cited

U.S. PATENT DOCUMENTS

| | | | |
|---|---|---|---|
| 4,479,191 A | 10/1984 | Nojima et al. | 364/707 |
| 4,483,431 A | 11/1984 | Pratt | 194/97 |
| 4,491,841 A | 1/1985 | Clark | G08C 1/00 |
| D278,689 S | 5/1985 | Jupe | D10/42 |
| 4,574,936 A | 3/1986 | Klinger | 194/318 |
| 4,615,280 A | 10/1986 | Shoop et al. | 109/24.1 |
| 4,639,021 A | 1/1987 | Hope | 292/7 |
| D288,441 S | 2/1987 | Lalonde | D14/55 |
| D289,914 S | 5/1987 | Willinger et al. | D23/4 |
| 4,678,994 A | 7/1987 | Davies | 324/236 |
| 4,680,717 A | 7/1987 | Martin | G08G 1/07 |
| 4,697,171 A | 9/1987 | Suh | 340/543 |
| 4,738,334 A | 4/1988 | Weishaupt | 180/287 |
| 4,742,903 A | 5/1988 | Trummer | 194/317 |
| 4,749,074 A | 6/1988 | Ueki et al. | 194/317 |
| 4,754,126 A | 6/1988 | Caldwell | G06K 5/00 |
| D296,795 S | 7/1988 | Bouve | D20/10 |
| 4,763,769 A | 8/1988 | Levasseur | 194/217 |
| 4,789,859 A | 12/1988 | Clarkson et al. | 340/825.31 |
| 4,798,273 A | 1/1989 | Ward, II | 194/350 |
| 4,809,838 A | 3/1989 | Houserman | 194/317 |
| 4,812,805 A | 3/1989 | Lachat et al. | 340/825.05 |
| 4,823,928 A | 4/1989 | Speas | |
| 4,825,425 A | 4/1989 | Turner | 368/7 |
| 4,827,206 A | 5/1989 | Speas | 323/299 |
| 4,845,484 A | 7/1989 | Ellsberg | 340/825.35 |
| 4,848,556 A | 7/1989 | Shah et al. | 194/212 |
| 4,851,987 A | 7/1989 | Day | 364/200 |
| 4,872,149 A | 10/1989 | Speas | 368/90 |
| 4,875,598 A | 10/1989 | Dahl | 221/4 |
| 4,880,097 A | 11/1989 | Speas | 194/200 |
| 4,880,406 A | 11/1989 | Van Horn et al. | 464/38 |
| 4,895,238 A | 1/1990 | Speas | 194/319 |
| D307,875 S | 5/1990 | Mallory | D10/106 |
| 4,951,799 A | 8/1990 | Xai | 194/317 |
| 4,967,895 A | 11/1990 | Speas | 194/200 |
| 4,976,630 A | 12/1990 | Schuder et al. | 439/260 |
| 4,989,714 A | 2/1991 | Abe | 194/317 |
| 5,027,390 A | 6/1991 | Hughes | 379/150 |
| 5,027,935 A | 7/1991 | Berg et al. | 194/318 |
| 5,029,094 A | 7/1991 | Wong | 364/467 |
| D319,077 S | 8/1991 | Arato et al. | D20/6 |
| 5,036,859 A | 8/1991 | Brown | A61B 5/20 |
| 5,060,777 A | 10/1991 | Van Horn et al. | 194/317 |
| 5,065,156 A | 11/1991 | Bernier | 340/932.2 |
| 5,076,414 A | 12/1991 | Kimoto | 194/317 |
| 5,088,073 A | 2/1992 | Speas | 368/90 |
| 5,109,972 A | 5/1992 | Van Horn et al. | 194/217 |
| 5,119,916 A | 6/1992 | Carmen et al. | 194/210 |
| 5,142,277 A | 8/1992 | Yarberry et al. | G04Q 1/00 |
| 5,153,525 A | 10/1992 | Hoekman et al. | G01R 27/26 |
| 5,155,614 A | 10/1992 | Carmen et al. | 398/202 |
| 5,158,166 A | 10/1992 | Barson | 194/319 |
| D331,996 S | 12/1992 | Fukutake et al. | D99/28 |
| 5,184,707 A | 2/1993 | Van Horn et al. | 194/204 |
| 5,192,855 A | 3/1993 | Insulander et al. | 235/381 |
| 5,201,396 A | 4/1993 | Chalabian et al. | 194/217 |
| D335,460 S | 5/1993 | Tanaka | D10/40 |
| D336,860 S | 6/1993 | Clough | D10/42 |
| 5,222,076 A | 6/1993 | Ng et al. | 375/9 |
| D337,953 S | 8/1993 | Verborn et al. | D10/40 |
| 5,244,070 A | 9/1993 | Carmen et al. | 194/319 |
| D340,038 S | 10/1993 | Venne et al. | D14/420 |
| 5,259,491 A | 11/1993 | Ward II | 194/350 |
| 5,266,947 A | 11/1993 | Fujiwara et al. | 340/932.2 |
| D342,209 S | 12/1993 | Clough | D10/42 |
| 5,273,151 A | 12/1993 | Carmen et al. | 194/319 |
| 5,287,384 A | 2/1994 | Avery et al. | 375/1 |
| 5,293,979 A | 3/1994 | Levasseur | 194/317 |
| 5,298,894 A | 3/1994 | Cerny et al. | 340/870.02 |
| 5,339,594 A | 8/1994 | Ventura-Berti | 52/727 |
| 5,343,237 A | 8/1994 | Morimoto | 348/143 |
| 5,351,187 A | 9/1994 | Hassett | G06F 15/21 |
| D351,193 S | 10/1994 | Abe | D20/9 |
| 5,351,798 A | 10/1994 | Hayes | 194/318 |
| 5,360,095 A | 11/1994 | Speas | 194/217 |
| D354,047 S | 1/1995 | Leggate et al. | D14/101 |
| D354,835 S | 1/1995 | Brendel | D99/43 |
| 5,382,780 A | 1/1995 | Carmen | 235/384 |
| 5,402,475 A | 3/1995 | Lesner, Jr. et al. | 379/106 |
| 5,407,049 A | 4/1995 | Jacobs | 194/200 |
| 5,426,363 A | 6/1995 | Akagi et al. | 324/239 |
| D360,734 S | 7/1995 | Hall | D99/28 |
| D360,737 S | 7/1995 | Helbig, Jr. | D99/28 |
| 5,439,089 A | 8/1995 | Parker | 194/317 |
| 5,442,348 A | 8/1995 | Mushell | 340/932.2 |
| 5,454,461 A | 10/1995 | Jacobs | 194/200 |
| D364,165 S | 11/1995 | Esslinger | D14/213 |
| 5,471,139 A | 11/1995 | Zadoff | 324/244.1 |
| 5,475,373 A | 12/1995 | Speas | 340/815.58 |
| 5,489,014 A | 2/1996 | Menoud | 194/211 |
| 5,500,517 A | 3/1996 | Cagliostro | 235/486 |
| 5,507,378 A | 4/1996 | Leone | 194/202 |
| 5,526,662 A | 6/1996 | Diekhoff et al. | 70/278 |
| 5,563,491 A | 10/1996 | Tseng | 320/2 |
| 5,568,441 A | 10/1996 | Sanemitsu | 365/229 |
| D375,607 S | 11/1996 | Hall | D99/28 |
| 5,570,771 A | 11/1996 | Jacobs | 194/200 |
| 5,573,099 A | 11/1996 | Church et al. | 194/317 |
| 5,614,892 A | 3/1997 | Ward, II et al. | 340/870.02 |
| 5,617,942 A | 4/1997 | Ward, II et al. | 194/217 |
| 5,619,932 A | 4/1997 | Efland et al. | 109/24.1 |
| 5,640,002 A | 6/1997 | Ruppert et al. | 235/472 |
| 5,642,119 A | 6/1997 | Jacobs | 342/69 |
| 5,648,906 A | 7/1997 | Amirpanahi | 705/418 |
| D381,976 S | 8/1997 | Sandor et al. | D14/420 |
| 5,659,306 A | 8/1997 | Bahar | 340/932.2 |
| 5,687,129 A | 11/1997 | Kim | 365/229 |
| D388,227 S | 12/1997 | Dallman et al. | D99/28 |
| D388,231 S | 12/1997 | Magee et al. | D99/28 |
| 5,710,743 A | 1/1998 | Dee et al. | 368/90 |
| D391,238 S | 2/1998 | Sakata | D14/420 |
| 5,732,812 A | 3/1998 | Grainger et al. | 194/217 |
| D393,212 S | 4/1998 | Lucas | D10/42 |
| 5,737,710 A | 4/1998 | Anthonyson | 701/1 |
| 5,740,050 A | 4/1998 | Ward, II | 364/464.28 |
| 5,748,103 A | 5/1998 | Flach et al. | 340/870.07 |
| D395,133 S | 6/1998 | Makami et al. | D99/43 |
| 5,761,061 A | 6/1998 | Amano | 364/187 |
| 5,777,302 A | 7/1998 | Nakagawa et al. | 235/7 A |
| 5,777,951 A | 7/1998 | Mitschele et al. | 368/90 |
| 5,777,957 A | 7/1998 | Lyman | 369/37 |
| 5,778,067 A | 7/1998 | Jones et al. | 380/24 |
| D396,655 S | 8/1998 | Anderson | D10/42 |
| 5,792,298 A | 8/1998 | Sauer et al. | C03C 27/12 |
| 5,803,228 A | 9/1998 | Lucas | 194/350 |
| 5,805,083 A | 9/1998 | Sutton et al. | 340/932.2 |
| 5,806,651 A | 9/1998 | Carmen et al. | 194/319 |
| D400,115 S | 10/1998 | Yaron et al. | D10/104 |
| D400,684 S | 11/1998 | Dallman | D99/28 |
| 5,833,042 A | 11/1998 | Baitch et al. | 194/317 |
| 5,841,369 A | 11/1998 | Sutton et al. | 340/932.2 |
| 5,842,411 A | 12/1998 | Johnson | 101/36 |
| 5,845,268 A | 12/1998 | Moore | 705/418 |
| 5,852,411 A | 12/1998 | Jacobs et al. | 340/932.2 |
| D404,025 S | 1/1999 | Van Horne et al. | D14/331 |
| 5,903,520 A | 5/1999 | Dee et al. | 368/90 |
| 5,906,260 A | 5/1999 | Goodrich | 194/203 |
| 5,911,763 A | 6/1999 | Quesada | 70/120 |
| 5,915,246 A | 6/1999 | Patterson et al. | G06F 17/60 |
| D411,848 S | 7/1999 | Maruska et al. | D16/202 |
| D412,233 S | 7/1999 | Cajacob et al. | D99/28 |
| D412,289 S | 7/1999 | Winwood | D10/42 |
| D413,311 S | 8/1999 | Blalock | D14/420 |
| 5,936,551 A | 8/1999 | Allen et al. | G08G 1/01 |
| 5,940,481 A | 8/1999 | Zietman | 379/114 |
| 5,946,774 A | 9/1999 | Ramsey et al. | E05D 11/06 |
| 5,954,182 A | 9/1999 | Wei | 194/345 |
| 5,936,527 A | 10/1999 | Isaacman et al. | 340/572.1 |
| 5,966,345 A | 10/1999 | Dee et al. | 368/90 |
| D419,277 S | 1/2000 | Ishii et al. | D99/35 |
| 6,018,327 A | 1/2000 | Nakano et al. | H01Q 1/36 |
| 6,026,946 A | 2/2000 | McCarty, Jr. | 194/317 |
| 6,029,888 A | 2/2000 | Harvey | G06F 17/60 |

(56) References Cited

U.S. PATENT DOCUMENTS

| | | | |
|---|---|---|---|
| D421,399 S | 3/2000 | Bennett et al. | D10/50 |
| 6,037,880 A | 3/2000 | Manion | 340/932.2 |
| D423,181 S | 4/2000 | Dallman | D99/28 |
| D423,755 S | 4/2000 | Ha | D99/28 |
| 6,052,453 A | 4/2000 | Sagady et al. | 379/146 |
| D427,413 S | 6/2000 | Wallace et al. | D99/35 |
| 6,078,272 A | 6/2000 | Jacobs et al. | 340/932.2 |
| 6,081,205 A | 6/2000 | Williams | 340/932.2 |
| 6,081,206 A | 6/2000 | Keilland | 340/937 |
| 6,082,153 A | 7/2000 | Schoell et al. | 70/1.5 |
| D430,045 S | 8/2000 | Omuro et al. | D10/43 |
| 6,098,361 A | 8/2000 | Roten et al. | 52/298 |
| 6,107,942 A | 8/2000 | Yoo et al. | 340/932.2 |
| 6,109,418 A | 8/2000 | Yost | 194/350 |
| 6,111,522 A | 8/2000 | Hiltz et al. | 340/932.2 |
| D430,810 S | 9/2000 | Omuro et al. | D10/43 |
| 6,116,403 A | 9/2000 | Kiehl | 194/217 |
| 6,121,880 A | 9/2000 | Scott et al. | G08B 13/157 |
| D431,788 S | 10/2000 | Tuxen et al. | D10/42 |
| D432,286 S | 10/2000 | Irie | D99/34 |
| 6,132,152 A | 10/2000 | Kaibach et al. | 411/54.1 |
| 6,147,624 A | 11/2000 | Clapper | 340/932.2 |
| D437,468 S | 2/2001 | Fukutake et al. | D99/28 |
| 6,188,328 B1 | 2/2001 | Ho | 340/932.2 |
| 6,193,045 B1 | 2/2001 | Ishida et al. | 194/203 |
| 6,195,015 B1 | 2/2001 | Jacobs et al. | 340/693.9 |
| D439,591 S | 3/2001 | Reidt et al. | D16/208 |
| RE37,193 E | 5/2001 | Ward et al. | 194/217 |
| 6,227,343 B1 | 5/2001 | Neathway et al. | 194/319 |
| 6,229,455 B1 | 5/2001 | Yost et al. | 340/943 |
| 6,230,868 B1 | 5/2001 | Tuxen et al. | 194/217 |
| 6,236,716 B1 | 5/2001 | Marcus et al. | H04M 11/00 |
| 6,243,028 B1 | 6/2001 | Krygler et al. | 340/932.2 |
| 6,243,029 B1 | 6/2001 | Tomer | 340/932.2 |
| 6,275,169 B1 | 8/2001 | Krygler et al. | 340/932.2 |
| 6,275,170 B1 | 8/2001 | Jacobs et al. | 340/932.2 |
| D447,519 S | 9/2001 | Pinchuk et al. | D21/324 |
| D447,714 S | 9/2001 | Cappiello | D10/104 |
| D448,910 S | 10/2001 | Kit et al. | D99/28 |
| D449,010 S | 10/2001 | Petrucelli | D10/109 |
| 6,307,152 B1 | 10/2001 | Bonilla et al. | H02G 3/04 |
| 6,309,098 B1 | 10/2001 | Wong | 368/94 |
| D450,253 S | 11/2001 | Marguet | D10/42 |
| 6,312,152 B2 | 11/2001 | Dee et al. | 368/90 |
| 6,321,201 B1 | 11/2001 | Dahl | 705/1 |
| RE37,531 E | 1/2002 | Chaco et al. | 379/38 |
| 6,340,935 B1 | 1/2002 | Hall | 340/932.2 |
| 6,344,806 B1 | 2/2002 | Katz | 340/932.2 |
| D454,421 S | 3/2002 | Jeon et al. | D99/28 |
| D454,807 S | 3/2002 | Cappiello | D10/109 |
| 6,354,425 B1 | 3/2002 | Tuxen et al. | 194/350 |
| D456,587 S | 4/2002 | Kit et al. | D99/28 |
| 6,366,220 B1 | 4/2002 | Elliott | 340/928 |
| 6,373,401 B2 | 4/2002 | Ho | 340/932.2 |
| 6,373,422 B1 | 4/2002 | Mostafa | 341/155 |
| 6,373,442 B1 | 4/2002 | Thomas et al. | 343/767 |
| 6,380,851 B1 | 4/2002 | Gilbert et al. | 340/517 |
| D460,005 S | 7/2002 | Jacquet | D10/42 |
| D461,728 S | 8/2002 | Tuxen et al. | D10/42 |
| 6,456,491 B1 | 9/2002 | Flannery et al. | 361/685 |
| D463,749 S | 10/2002 | Petrucelli | D10/109 |
| 6,457,586 B2 | 10/2002 | Yasuda et al. | 209/534 |
| 6,467,602 B2 | 10/2002 | Bench et al. | 194/217 |
| 6,477,505 B2 | 11/2002 | Ward, II et al. | G06F 17/60 |
| 6,477,875 B2 | 11/2002 | Field et al. | 70/491 |
| D467,954 S | 12/2002 | Suzuki et al. | D16/208 |
| 6,493,676 B1 | 12/2002 | Levy | 705/13 |
| 6,505,774 B1 | 1/2003 | Fulcher et al. | |
| D471,238 S | 3/2003 | Showers et al. | D20/8 |
| D472,362 S | 3/2003 | Zerman et al. | D99/28 |
| 6,527,172 B1 | 3/2003 | Lewis et al. | G06F 17/60 |
| 6,539,370 B1 | 3/2003 | Chang et al. | 707/2 |
| 6,559,776 B2 | 5/2003 | Katz | 340/932.2 |
| 6,575,281 B2 | 6/2003 | Lee | 192/49 |
| D477,030 S | 7/2003 | Kolls et al. | D20/8 |
| D481,516 S | 10/2003 | Magee et al. | D99/28 |
| D485,417 S | 1/2004 | Magee et al. | D99/28 |
| 6,697,730 B2 | 2/2004 | Dickerson | 701/200 |
| D488,280 S | 4/2004 | Zerman et al. | D99/28 |
| 6,731,942 B1 | 5/2004 | Nageli | 455/458 |
| D490,727 S | 6/2004 | Kido et al. | D10/60 |
| D492,080 S | 6/2004 | Magee et al. | D99/28 |
| D492,081 S | 6/2004 | Magee et al. | D99/28 |
| D492,085 S | 6/2004 | Korte et al. | D99/43 |
| 6,747,575 B2 | 6/2004 | Chauvin et al. | 340/932.2 |
| 6,763,094 B2 | 7/2004 | Conn et al. | 379/91.01 |
| D494,730 S | 8/2004 | Magee et al. | D99/28 |
| 6,791,473 B2 | 9/2004 | Kibria et al. | 340/932.2 |
| RE38,626 E | 10/2004 | Kielland | 340/937 |
| D497,393 S | 10/2004 | Herbst | D20/99 |
| 6,799,387 B2 | 10/2004 | Pippins | 37/456 |
| D497,814 S | 11/2004 | Odinotski et al. | D10/42 |
| D498,795 S | 11/2004 | Nunn | D20/8 |
| 6,812,857 B1 | 11/2004 | Kassab et al. | 340/932.2 |
| 6,823,317 B1 | 11/2004 | Ouimet et al. | 705/13 |
| 6,856,922 B2 | 2/2005 | Austin et al. | 702/63 |
| 6,874,340 B1 | 4/2005 | Berman | 7/161 |
| 6,885,311 B2 | 4/2005 | Howard et al. | 340/932.2 |
| D505,240 S | 5/2005 | Swaine et al. | D99/28 |
| D505,765 S | 5/2005 | Swaine et al. | D99/28 |
| 6,889,899 B2 | 5/2005 | Silberberg | 235/384 |
| D506,509 S | 6/2005 | Nunn | D20/9 |
| D506,769 S | 6/2005 | Asai | D16/203 |
| 6,914,411 B2 | 7/2005 | Couch et al. | 320/101 |
| D508,064 S | 8/2005 | Ramirez | D16/200 |
| 6,929,179 B2 | 8/2005 | Fulcher et al. | 235/381 |
| 6,946,974 B1 | 9/2005 | Racunas Jr. | 340/932.2 |
| D510,751 S | 10/2005 | Magee et al. | D20/3 |
| 7,004,385 B1 | 2/2006 | Douglass | 235/379 |
| 7,014,355 B2 | 3/2006 | Potter, Sr. et al. | 368/90 |
| 7,019,420 B2 | 3/2006 | Kogan et al. | 307/150 |
| 7,019,670 B2 | 3/2006 | Bahar | 340/932.2 |
| 7,023,360 B2 | 4/2006 | Staniszewski | 340/932.2 |
| 7,027,773 B1 | 4/2006 | McMillin | 455/41.2 |
| 7,027,808 B2 | 4/2006 | Wesby | 455/419 |
| 7,028,888 B2 | 4/2006 | Laskowski | 235/379 |
| 7,029,167 B1 | 4/2006 | Mitschele | 368/90 |
| D520,883 S | 5/2006 | Hillard et al. | D10/50 |
| 7,040,534 B2 | 5/2006 | Turocy et al. | 235/379 |
| 7,046,123 B1 | 5/2006 | Goldberg | 340/309.8 |
| D524,834 S | 7/2006 | Dozier et al. | D16/200 |
| 7,071,839 B2 | 7/2006 | Patel et al. | 340/933 |
| 7,104,447 B1 | 9/2006 | Lopez et al. | 235/384 |
| 7,110,762 B1 | 9/2006 | Cameron et al. | 455/434 |
| D530,880 S | 10/2006 | Magee et al. | D99/28 |
| 7,114,651 B2 | 10/2006 | Hjelmvik | 235/384 |
| 7,131,576 B2 | 11/2006 | Utz et al. | 235/379 |
| D535,268 S | 1/2007 | Holger | D14/130 |
| 7,181,426 B2 | 2/2007 | Dutta | 705/37 |
| 7,183,999 B2 | 2/2007 | Matthews et al. | 345/1.1 |
| D538,505 S | 3/2007 | Kang et al. | D99/28 |
| 7,188,070 B2 | 3/2007 | Dar et al. | 750/1 |
| D543,588 S | 5/2007 | Herbert et al. | D20/8 |
| 7,222,031 B2 | 5/2007 | Heatley | |
| 7,222,782 B2 | 5/2007 | Lute, Jr. et al. | 235/379 |
| 7,230,545 B2 | 6/2007 | Nath et al. | 340/932.2 |
| 7,237,176 B2 | 6/2007 | Briggs et al. | 714/67 |
| D546,365 S | 7/2007 | Jost et al. | D16/221 |
| 7,237,716 B2 | 7/2007 | Silberberg | 235/384 |
| 7,253,747 B2 | 8/2007 | Noguchi | 340/932.2 |
| 7,262,737 B2 | 8/2007 | Zarnowitz et al. | 343/702 |
| 7,284,692 B1 | 10/2007 | Douglass | 235/379 |
| D559,792 S | 1/2008 | Gemme et al. | D13/164 |
| 7,319,974 B1 | 1/2008 | Brusseaux | 705/13 |
| 7,321,317 B2 | 1/2008 | Nath et al. | 340/933 |
| 7,330,131 B2 | 2/2008 | Zanotti et al. | 340/932.2 |
| D570,920 S | 6/2008 | Choi | D20/2 |
| 7,382,238 B2 | 6/2008 | Kavaler | 340/438 |
| 7,382,281 B2 | 6/2008 | Kavaler | 340/941 |
| 7,382,282 B2 | 6/2008 | Kavaler | 340/941 |
| 7,385,484 B2 | 6/2008 | Nath et al. | 340/426.1 |
| 7,388,349 B2 | 6/2008 | Elder et al. | 320/104 |
| 7,388,517 B2 | 6/2008 | Kavaler | 340/941 |
| 7,391,339 B2 | 6/2008 | Howard et al. | 340/932.2 |

(56) References Cited

U.S. PATENT DOCUMENTS

| | | | |
|---|---|---|---|
| 7,393,134 B2 | 7/2008 | Mitschele | 368/90 |
| D575,168 S | 8/2008 | King et al. | D10/42 |
| 7,419,091 B1 | 9/2008 | Scanlon | 235/379 |
| 7,427,931 B1 | 9/2008 | Kavaler et al. | 340/941 |
| D579,795 S | 11/2008 | Martinez et al. | D10/42 |
| 7,445,144 B2 | 11/2008 | Schlabach et al. | 235/379 |
| D582,125 S | 12/2008 | Kang et al. | D99/28 |
| D587,141 S | 2/2009 | King et al. | D10/42 |
| D588,916 S | 3/2009 | DeMarco | D9/504 |
| D591,181 S | 4/2009 | Kanbar | D10/40 |
| D592,825 S | 5/2009 | Kang et al. | D99/28 |
| 7,533,802 B1 | 5/2009 | McGinley et al. | 235/379 |
| 7,533,809 B1 | 5/2009 | Robinson et al. | G06K 5/00 |
| 7,554,460 B2 | 6/2009 | Verkleeren et al. | 340/870.02 |
| D596,373 S | 7/2009 | Kang et al. | D99/28 |
| D596,374 S | 7/2009 | Kang et al. | D99/28 |
| 7,558,564 B2 | 7/2009 | Wesby | 455/419 |
| 7,575,166 B2 | 8/2009 | McNamara | 235/440 |
| 7,579,964 B2 | 8/2009 | Nath et al. | 340/933 |
| D600,152 S | 9/2009 | Stack et al. | 10/5 |
| 7,594,235 B2 | 9/2009 | Moreau | 719/310 |
| D602,225 S | 10/2009 | Lute et al. | D99/28 |
| D604,189 S | 11/2009 | Leer et al. | D10/123 |
| 7,611,045 B1 | 11/2009 | Lute et al. | 235/379 |
| 7,617,120 B2 | 11/2009 | Derasmo et al. | 705/13 |
| D605,145 S | 12/2009 | Kellar | D14/125 |
| 7,624,919 B2 | 12/2009 | Meek et al. | 235/379 |
| 7,632,419 B1 | 12/2009 | Grimbergen et al. | 216/60 |
| 7,671,803 B2 | 3/2010 | Neill et al. | 343/700 MS |
| 7,679,526 B2 | 3/2010 | Mardirossian | 340/932.2 |
| 7,699,224 B2 | 4/2010 | Molé | 235/439 |
| D615,274 S | 5/2010 | Kim et al. | D99/28 |
| 7,717,327 B2 | 5/2010 | Gomes | 235/379 |
| D617,799 S | 6/2010 | Odhe et al. | D14/420 |
| 7,726,558 B1 | 6/2010 | Lute et al. | 235/379 |
| 7,739,000 B2 | 6/2010 | Kevaler | 701/1 |
| D620,050 S | 7/2010 | Hultzman et al. | D20/2 |
| 7,748,620 B2 | 7/2010 | Gomez et al. | 235/383 |
| 7,772,720 B2 | 8/2010 | McGee et al. | 307/66 |
| 7,780,072 B1 | 8/2010 | Lute et al. | 235/379 |
| 7,783,530 B2 | 8/2010 | Stemmer et al. | 750/28 |
| D624,274 S | 9/2010 | Pendleton | D99/28 |
| D625,305 S | 10/2010 | Bleck et al. | D14/307 |
| 7,806,248 B2 | 10/2010 | Hunter et al. | 194/317 |
| D627,814 S | 11/2010 | Tzeng et al. | D16/202 |
| 7,825,826 B2 | 11/2010 | Welch | 340/932.2 |
| D629,585 S | 12/2010 | Bleck et al. | D99/28 |
| 7,854,310 B2 | 12/2010 | King et al. | 194/350 |
| 7,855,661 B2 | 12/2010 | Ponert | 340/932.2 |
| 7,874,482 B2 | 1/2011 | Mitschele | 235/379 |
| D632,740 S | 2/2011 | Adeline | D20/2 |
| 7,891,546 B1 | 2/2011 | Steinbach et al. | 235/375 |
| D634,417 S | 3/2011 | Abbondanzio | D23/366 |
| D635,035 S | 3/2011 | Matsumoto | D10/41 |
| 7,899,583 B2 | 3/2011 | Mendelson | 701/1 |
| 7,908,149 B2 | 3/2011 | Dar et al. | 705/1 |
| 7,933,841 B2 | 4/2011 | Schmeyer et al. | 705/64 |
| 7,945,670 B2 | 5/2011 | Nakamura et al. | G06F 15/173 |
| D645,223 S | 9/2011 | Bleck et al. | D99/28 |
| 8,035,533 B2 | 10/2011 | Kavaler | 340/933 |
| 8,044,139 B2 | 10/2011 | Youn et al. | 524/606 |
| D651,784 S | 1/2012 | Rohan et al. | D99/28 |
| D652,329 S | 1/2012 | MacKay et al. | D10/42 |
| D652,601 S | 1/2012 | Rohan et al. | D99/28 |
| D652,602 S | 1/2012 | Rohan et al. | D99/28 |
| D652,872 S | 1/2012 | Mougin et al. | D20/1 |
| D653,012 S | 1/2012 | Rohan et al. | D99/28 |
| D653,014 S | 1/2012 | Rohan et al. | D99/28 |
| D653,420 S | 1/2012 | Rohan et al. | D99/28 |
| D653,421 S | 1/2012 | Rohan et al. | D99/28 |
| D653,422 S | 1/2012 | Rohan et al. | D99/28 |
| D653,423 S | 1/2012 | Rohan et al. | D99/28 |
| D653,424 S | 1/2012 | Rohan et al. | D99/28 |
| D654,816 S | 2/2012 | MacKay et al. | D10/42 |
| RE43,245 E | 3/2012 | Ouimet et al. | 705/13 |
| D655,263 S | 3/2012 | Tsai | D14/125 |
| D656,046 S | 3/2012 | MacKay et al. | D10/42 |
| 8,138,950 B1 | 3/2012 | Leung | 340/932.2 |
| 8,144,034 B2 | 3/2012 | Kavaler | 340/941 |
| D659,557 S | 5/2012 | Jones et al. | D10/42 |
| 8,181,857 B1 | 5/2012 | Lute et al. | 235/379 |
| 8,184,019 B2 | 5/2012 | Chauvin et al. | 340/932.2 |
| D661,603 S | 6/2012 | MacKay et al. | D10/42 |
| D661,608 S | 6/2012 | Kimmich | D10/98 |
| 8,193,540 B2 | 6/2012 | Huang et al. | 257/81 |
| 8,207,394 B2 | 6/2012 | Feldkamp et al. | 604/361 |
| 8,232,894 B2 | 7/2012 | Weiss et al. | 340/932.2 |
| 8,264,401 B1 | 9/2012 | Kavaler | 342/128 |
| 8,279,107 B2 | 10/2012 | Krstanovic et al. | 342/27 |
| D672,525 S | 12/2012 | Lee et al. | D99/28 |
| 8,325,057 B2 | 12/2012 | Salter | G08B 23/00 |
| D674,985 S | 1/2013 | Lee | D99/28 |
| D677,035 S | 2/2013 | Lee et al. | D99/28 |
| D677,714 S | 3/2013 | Helgesson et al. | D18/4.4 |
| 8,395,532 B2 | 3/2013 | Chauvin et al. | 340/932.2 |
| 8,402,281 B2 | 3/2013 | Dahl | 718/189 |
| 8,402,380 B2 | 3/2013 | Kikin-Gil et al. | G06F 3/048 |
| D680,156 S | 4/2013 | Hernandez et al. | D18/4.4 |
| 8,417,715 B1 | 4/2013 | Bruckhaus et al. | 707/758 |
| D681,717 S | 5/2013 | Helgesson et al. | D18/4.6 |
| D682,504 S | 5/2013 | Lee et al. | D99/28 |
| 8,450,627 B2 | 5/2013 | Mittleman et al. | 200/600 |
| D683,779 S | 6/2013 | Uemachi et al. | D16/202 |
| D683,794 S | 6/2013 | Randall | D20/8 |
| D683,795 S | 6/2013 | Randall | D20/8 |
| D684,745 S | 6/2013 | Reuter et al. | D99/28 |
| D684,870 S | 6/2013 | Jones et al. | D10/42 |
| 8,479,909 B2 | 7/2013 | King et al. | 194/302 |
| 8,487,754 B2 | 7/2013 | Mitschele | 340/539.1 |
| D687,809 S | 8/2013 | Bergmann et al. | D14/209.1 |
| 8,513,832 B2 | 8/2013 | Hunter et al. | 307/66 |
| D689,554 S | 9/2013 | Echanove Hernandez | D20/2 |
| D690,771 S | 10/2013 | Randall | D20/9 |
| D691,165 S | 10/2013 | Attoma | D14/486 |
| 8,566,159 B2 | 10/2013 | King et al. | 705/14.53 |
| 8,568,055 B2 | 10/2013 | Marques Lito Velez Grilo | F16C 11/00 |
| D692,784 S | 11/2013 | Anderssen et al. | D10/70 |
| D693,983 S | 11/2013 | Budde et al. | D99/28 |
| 8,573,484 B1 | 11/2013 | Irudayam et al. | 235/379 |
| 8,589,216 B2 | 11/2013 | Yu et al. | 705/13 |
| 8,590,687 B2 | 11/2013 | King et al. | 194/350 |
| 8,595,054 B2 | 11/2013 | King et al. | 705/13 |
| D696,484 S | 12/2013 | Lee et al. | D99/28 |
| D696,485 S | 12/2013 | Lee et al. | D99/28 |
| 8,621,245 B2 | 12/2013 | Shearer et al. | 713/300 |
| 8,631,921 B2 | 1/2014 | Jones et al. | 194/350 |
| 8,662,279 B2 | 3/2014 | Jones et al. | 194/350 |
| 8,666,801 B2 | 3/2014 | Cho | 705/13 |
| D702,913 S | 4/2014 | Budde et al. | D99/28 |
| D702,914 S | 4/2014 | Budde et al. | D99/28 |
| 8,684,158 B2 | 4/2014 | Jones et al. | 194/215 |
| 8,710,798 B2 | 4/2014 | Turner | 320/109 |
| D705,090 S | 5/2014 | MacKay et al. | D10/42 |
| 8,727,207 B1 | 5/2014 | Church et al. | 235/33 |
| D707,140 S | 6/2014 | King et al. | D10/42 |
| D707,141 S | 6/2014 | King et al. | D10/42 |
| D707,142 S | 6/2014 | King et al. | D10/42 |
| D707,574 S | 6/2014 | Ku et al. | D10/40 |
| 8,749,403 B2 | 6/2014 | King et al. | 340/932.2 |
| 8,770,371 B2 | 7/2014 | MacKay et al. | 194/350 |
| 8,770,372 B2 | 7/2014 | Dobbins et al. | 194/350 |
| 8,807,317 B2 | 8/2014 | MacKay et al. | 194/350 |
| D714,165 S | 9/2014 | Salama | D10/42 |
| D715,661 S | 10/2014 | McKaughan et al. | D10/53 |
| D716,156 S | 10/2014 | Jones et al. | D10/42 |
| D716,515 S | 10/2014 | Cha et al. | D99/28 |
| 8,862,494 B2 | 10/2014 | King et al. | 705/13 |
| 8,866,624 B2 | 10/2014 | Ales et al. | 340/604 |
| D716,671 S | 11/2014 | Jones et al. | D10/42 |
| 8,884,785 B2 | 11/2014 | Groft et al. | G06Q 20/3278 |
| 8,936,505 B2 | 1/2015 | Bengtsson | G07D 1/00 |
| D722,740 S | 2/2015 | Budde et al. | D99/28 |

(56) References Cited

U.S. PATENT DOCUMENTS

| | | |
|---|---|---|
| 8,957,787 B1 | 2/2015 | Al-Hmalan et al. ........................ G08G 1/0175 |
| D724,290 S | 3/2015 | Cha et al. ................. D99/28 |
| D724,811 S | 3/2015 | Reitinger ................. D99/28 |
| D724,812 S | 3/2015 | Cha et al. ................. D99/28 |
| D725,504 S | 3/2015 | McEneany et al. ........... D10/42 |
| D728,190 S | 4/2015 | Sheley ................. D99/28 |
| 9,002,723 B2 | 4/2015 | King et al. ................. 340/932.2 |
| D732,263 S | 6/2015 | Budde et al. ................. D99/28 |
| 9,047,712 B2 | 6/2015 | King et al. ................. 705/1.1 |
| 9,064,358 B2 | 6/2015 | Lidror ................. H04Q 5/22 |
| D733,585 S | 7/2015 | Jones et al. ................. D10/42 |
| D735,437 S | 7/2015 | Randall ................. D99/28 |
| D735,438 S | 7/2015 | Randall ................. D99/28 |
| D735,439 S | 7/2015 | Randall ................. D99/28 |
| D735,440 S | 7/2015 | Randall ................. D99/28 |
| D735,963 S | 8/2015 | Randall ................. D99/28 |
| D735,964 S | 8/2015 | Randall ................. D99/28 |
| D735,965 S | 8/2015 | Randall ................. D99/28 |
| D739,637 S | 9/2015 | Randall ................. D99/28 |
| D739,638 S | 9/2015 | Randall ................. D99/28 |
| D739,639 S | 9/2015 | Randall ................. D99/28 |
| 9,123,184 B2 | 9/2015 | Jones et al. ................. G07B 15/00 |
| 9,127,964 B2 | 9/2015 | Schwarz et al. ................. 340/943 |
| 9,147,345 B2 | 9/2015 | Agrait et al. ................. G08G 1/14 |
| D741,040 S | 10/2015 | Budde et al. ................. D99/28 |
| D742,090 S | 10/2015 | Randall ................. D99/28 |
| 9,159,080 B2 | 10/2015 | Fiorucci et al. ... G06Q 30/0226 |
| 9,169,626 B2 | 10/2015 | Guler et al. ................. E03D 3/06 |
| D742,371 S | 11/2015 | Bopp et al. ................. D14/336 |
| D743,956 S | 11/2015 | Kraft et al. ................. D14/307 |
| 9,196,097 B2 | 11/2015 | Jones et al. ................. 340/870.02 |
| 9,196,161 B2 | 11/2015 | Lai et al. ................. B60Q 1/48 |
| D746,015 S | 12/2015 | King et al. ................. D99/28 |
| D746,704 S | 1/2016 | Jones et al. ................. D10/42 |
| D748,364 S | 1/2016 | King et al. ................. D99/28 |
| D748,888 S | 2/2016 | King et al. ................. D99/28 |
| D749,000 S | 2/2016 | King et al. ................. D10/42 |
| D749,290 S | 2/2016 | Pollmann ................. D99/28 |
| 9,262,915 B2 | 2/2016 | Clem et al. ................. G08G 1/0112 |
| 9,269,216 B2 | 2/2016 | Keilwert ................. G07F 17/3206 |
| D750,513 S | 3/2016 | King et al. ................. D10/70 |
| D750,978 S | 3/2016 | van Slooten et al. ......... D10/41 |
| D752,552 S | 3/2016 | D'Ascanio et al. ........... D14/216 |
| D755,649 S | 5/2016 | King et al. ................. D10/42 |
| D755,650 S | 5/2016 | King et al. ................. D10/42 |
| D756,807 S | 5/2016 | King et al. ................. D10/42 |
| D756,808 S | 5/2016 | King et al. ................. D10/42 |
| D762,040 S | 7/2016 | King et al. ................. D99/28 |
| 9,384,554 B2 | 7/2016 | Xu et al. ................. G06T 7/0075 |
| 9,391,474 B2 | 7/2016 | Hunter et al. ................. H02J 9/06 |
| 9,406,056 B2 | 8/2016 | MacKay et al. ........ G06Q 30/02 |
| 9,407,608 B2 | 8/2016 | Mullick et al. ........ G06F 17/00 |
| 9,424,691 B2 | 8/2016 | King et al. ................. G07B 15/02 |
| 9,437,050 B2 | 9/2016 | Hilton et al. ................. G07B 15/00 |
| 9,443,236 B2 | 9/2016 | MacKay et al. ........ G06Q 20/18 |
| D769,570 S | 10/2016 | Kraft et al. ................. D99/28 |
| D769,571 S | 10/2016 | Lee et al. ................. D99/28 |
| D769,572 S | 10/2016 | Park et al. ................. D99/28 |
| 9,489,776 B2 | 11/2016 | Keller et al. ................. G07B 15/02 |
| 9,494,922 B2 | 11/2016 | MacKay et al. ..... G04C 11/026 |
| 9,508,198 B1 | 11/2016 | King et al. ................. G07B 15/02 |
| 9,508,260 B2 | 11/2016 | Shaik ................. G08G 1/14 |
| 9,519,761 B2 | 12/2016 | Jakobsson ................. G06F 17/04 |
| 9,524,498 B2 | 12/2016 | Jones et al. ................. G06Q 20/145 |
| 9,536,235 B2 | 1/2017 | Jones et al. ................. G06Q 20/145 |
| 9,536,370 B2 | 1/2017 | Jones et al. ................. G07F 17/246 |
| D779,771 S | 2/2017 | King et al. ................. D99/28 |
| D779,772 S | 2/2017 | King et al. ................. D99/28 |
| D779,773 S | 2/2017 | King et al. ................. D99/28 |
| D779,774 S | 2/2017 | King et al. ................. D99/28 |
| 9,580,198 B2 | 2/2017 | Ehrmann et al. ........ B23B 41/00 |
| D781,024 S | 3/2017 | King et al. ................. D99/28 |
| D782,349 S | 3/2017 | Konotopskyi et al. ...... D10/70 |
| 9,661,403 B2 | 5/2017 | King et al. ................. H04Q 9/00 |
| 9,685,027 B2 | 6/2017 | King et al. ................. G07F 17/248 |
| 9,692,256 B2 | 6/2017 | Hunter et al. ................. H02J 9/061 |
| D791,621 S | 7/2017 | Loye et al. ................. D10/42 |
| D792,049 S | 7/2017 | Oh et al. ................. D99/28 |
| 9,697,506 B2 | 7/2017 | Jones et al. ........ G06Q 20/145 |
| 9,707,911 B1 | 7/2017 | Myers et al. ........ B60R 16/037 |
| D795,523 S | 8/2017 | King et al. ................. D99/28 |
| 9,728,085 B2 | 8/2017 | Schwarz et al. ........ G08G 1/017 |
| 9,746,954 B2 | 8/2017 | Wyatt et al. ........ G06F 3/0416 |
| 9,749,823 B2 | 8/2017 | Rowe et al. ................. H04W 4/18 |
| D796,355 S | 9/2017 | Cho et al. ................. D10/70 |
| 9,773,351 B2 | 9/2017 | Hudson et al. ................. G07B 15/02 |
| D799,992 S | 10/2017 | Ehara ................. D10/41 |
| D801,304 S | 10/2017 | Kiafoulis et al. ............ D14/214 |
| D801,405 S | 10/2017 | Shih et al. ................. D16/203 |
| 9,779,565 B2 | 10/2017 | Rabbat ................. G07C 9/00 |
| 9,805,518 B2 | 10/2017 | King et al. ................. G07B 15/02 |
| D802,874 S | 11/2017 | King et al. ................. D99/28 |
| D802,875 S | 11/2017 | King et al. ................. D99/28 |
| D802,876 S | 11/2017 | King et al. ................. D99/28 |
| D802,877 S | 11/2017 | King et al. ................. D99/28 |
| D802,878 S | 11/2017 | King et al. ................. D99/28 |
| 9,842,346 B2 | 12/2017 | Fiorucci et al. ... G06Q 30/0226 |
| 9,842,455 B2 | 12/2017 | MacKay et al. ........ G07F 7/10 |
| D813,059 S | 3/2018 | MacKay et al. ........ D10/42 |
| D813,838 S | 3/2018 | Pietschmann et al. ...... D14/214 |
| 9,934,645 B2 | 4/2018 | MacKay et al. ........ G07F 17/24 |
| 10,069,233 B2 | 9/2018 | Goto ................. H01R 13/4223 |
| D832,553 S | 10/2018 | Angelopoulos et al. ...... D99/28 |
| 10,089,814 B2 | 10/2018 | King et al. ................. G07F 17/0021 |
| D832,809 S | 11/2018 | Hardi ................. D14/204 |
| 10,141,629 B2 | 11/2018 | Mackay ................. G04C 11/026 |
| D834,971 S | 12/2018 | Ahn et al. ................. D10/70 |
| 10,154,029 B1 | 12/2018 | Griffin ................. H04L 63/0861 |
| D843,973 S | 3/2019 | Klosowski et al. ........ D14/216 |
| 10,262,345 B2 | 4/2019 | King et al. ........ G06Q 30/0284 |
| 10,275,650 B2 | 4/2019 | Laaksonen ................. G06K 9/00 |
| 10,297,150 B2 | 5/2019 | Schwarz et al. ........ G08B 23/00 |
| 10,299,018 B1 | 5/2019 | King et al. ................. H04Q 9/00 |
| D851,605 S | 6/2019 | Maetani et al. ............ D13/168 |
| D852,454 S | 6/2019 | King et al. ................. D99/43 |
| 10,192,388 B2 | 6/2019 | MacKay et al. ........ G07F 17/24 |
| 10,315,665 B2 | 6/2019 | Halder ................. G01C 22/00 |
| D853,079 S | 7/2019 | King et al. ................. D99/43 |
| D853,678 S | 7/2019 | King et al. ................. D99/43 |
| D853,679 S | 7/2019 | King et al. ................. D99/43 |
| D854,430 S | 7/2019 | Elrod et al. ................. D10/52 |
| 10,366,546 B2 | 7/2019 | King et al. ........ G06Q 10/00 |
| D858,381 S | 9/2019 | Ahn et al. ................. D12/173 |
| 10,423,980 B2 | 9/2019 | King et al. ........ G06Q 30/0255 |
| 10,424,147 B2 | 9/2019 | MacKay et al. ........ G06K 7/00 |
| D863,074 S | 10/2019 | MacKay et al. ............ D10/42 |
| D863,075 S | 10/2019 | MacKay et al. ............ D10/42 |
| D863,076 S | 10/2019 | MacKay et al. ............ D10/42 |
| D863,987 S | 10/2019 | MacKay et al. ............ D10/42 |
| D863,988 S | 10/2019 | MacKay et al. ............ D10/42 |
| D865,315 S | 10/2019 | King et al. ................. D99/43 |
| 10,464,530 B2 | 11/2019 | Falkson et al. ........ G60R 25/25 |
| 10,491,972 B2 | 11/2019 | King et al. ................. H04Q 9/00 |
| 10,503,990 B2 | 12/2019 | Gleeson-May et al. . H04N 7/18 |
| D872,600 S | 1/2020 | King et al. ................. D10/43 |
| 10,573,953 B2 | 2/2020 | MacKay ................. H01Q 1/42 |
| 10,574,085 B2 | 2/2020 | Hunter et al. ........ H02J 9/061 |
| D879,404 S | 3/2020 | Morishita et al. ............ D99/28 |
| D882,426 S | 4/2020 | Gross et al. ................. D10/65 |
| D883,605 S | 5/2020 | Lee et al. ................. D99/28 |
| 10,664,880 B2 | 5/2020 | King et al. ........ G06Q 30/02 |
| D886,649 S | 6/2020 | Lan et al. ................. D10/70 |
| 10,674,236 B2 | 6/2020 | King et al. ................. H04Q 9/00 |
| 10,691,904 B1 | 6/2020 | Randall et al. ........ G06K 7/10 |
| 10,741,064 B2 | 8/2020 | Schwarz et al. ........ G08G 1/017 |
| D901,825 S | 11/2020 | Nelson et al. ................. D99/28 |
| 10,861,278 B2 | 12/2020 | MacKay et al. ........ G07F 17/24 |
| 10,861,334 B2 | 12/2020 | Torres ................. G08G 1/14 |
| D911,857 S | 3/2021 | King et al. ................. D10/42 |
| RE48,566 E | 5/2021 | MacKay et al. ............ D10/42 |
| 10,998,612 B2 | 5/2021 | MacKay et al. ........ H01Q 1/22 |
| 11,074,612 B2 | 7/2021 | King et al. ........ G06Q 30/02 |
| D927,998 S | 8/2021 | Ahn et al. ................. D10/70 |

(56) References Cited

U.S. PATENT DOCUMENTS

| | | | |
|---|---|---|---|
| D928,639 S | 8/2021 | Ahn et al. ................ D10/70 |
| 11,100,824 B2 | 8/2021 | King et al. ............. G09F 23/00 |
| D930,493 S | 9/2021 | Katzenelson ............ D10/106.6 |
| 11,132,723 B2 | 9/2021 | King et al. ............ G06Q 30/02 |
| 11,172,274 B2 | 11/2021 | King et al. ............ H04Q 9/00 |
| D938,668 S | 12/2021 | Jia ........................ D30/199 |
| D954,571 S | 6/2022 | Ahn et al. .................. D10/70 |
| D955,230 S | 6/2022 | King et al. .................. D10/42 |
| D955,231 S | 6/2022 | King et al. .................. D10/42 |
| 11,386,420 B2 | 7/2022 | Nolan et al. ........ G06Q 20/3674 |
| D959,298 S | 8/2022 | Jones et al. ................ D10/42 |
| D959,299 S | 8/2022 | Jones et al. ................ D10/42 |
| D959,997 S | 8/2022 | Jones et al. ................ D10/42 |
| D960,400 S | 8/2022 | Ding ........................ D26/24 |
| D962,239 S | 8/2022 | Arenas de Jesus et al. D14/420 |
| 11,423,776 B2 | 8/2022 | Schwarz et al. ......... G06G 1/017 |
| 11,430,027 B2 | 8/2022 | King et al. ............ G06Q 30/02 |
| 11,436,649 B2 | 9/2022 | King et al. ............ G06Q 30/02 |
| 11,462,109 B2 | 10/2022 | King et al. ............ G06Q 30/00 |
| 11,475,491 B2 | 10/2022 | King et al. ............ G06Q 30/02 |
| D971,033 S | 11/2022 | King et al. .................. D10/42 |
| D971,034 S | 11/2022 | King et al. .................. D10/42 |
| D971,035 S | 11/2022 | King et al. .................. D10/42 |
| D976,516 S | 1/2023 | Nelson et al. ................ D99/28 |
| D986,082 S | 5/2023 | Jones et al. ................ D10/42 |
| D986,084 S | 5/2023 | Jones et al. ............. D10/104.1 |
| D987,444 S | 5/2023 | King et al. .................. D10/42 |
| 11,670,835 B2 * | 6/2023 | MacKay ............... H01Q 1/38 343/702 |
| 11,683,617 B2 | 6/2023 | King et al. ............. H04Q 9/00 |
| 11,688,277 B2 | 6/2023 | Schwarz et al. ........ G08G 1/017 |
| D996,237 S | 8/2023 | Jones et al. ................ D10/42 |
| 11,764,593 B2 | 9/2023 | Hunter et al. ......... H02J 7/0044 |
| 11,776,022 B2 | 10/2023 | King et al. ........ G06Q 30/0284 |
| 2001/0012241 A1 | 8/2001 | Dee et al. .................. 368/90 |
| 2001/0027626 A1 | 10/2001 | Natelli, Jr. .................. 52/170 |
| 2001/0037928 A1 | 11/2001 | Bench et al. ............ G06F 7/00 |
| 2001/0047278 A1 | 11/2001 | Brookner et al. .............. 705/1 |
| 2001/0051531 A1 | 12/2001 | Singhal et al. ............. 455/556 |
| 2002/0008639 A1 | 1/2002 | Dee ........................ 340/932.2 |
| 2002/0030606 A1 | 3/2002 | Chauvin et al. ........... 340/932.2 |
| 2002/0062172 A1 | 5/2002 | Bench et al. ............. 700/232 |
| 2002/0063035 A1 | 5/2002 | Blad et al. .............. G07F 9/06 |
| 2002/0074344 A1 | 6/2002 | Long et al. .................. 222/71 |
| 2002/0080013 A1 | 6/2002 | Anderson, III et al. ... 340/425.5 |
| 2002/0100810 A1 | 8/2002 | Amadeo ............... G06K 19/06 |
| 2002/0109609 A1 | 8/2002 | Potter et al. ............. 340/932.2 |
| 2002/0109610 A1 | 8/2002 | Katz ..................... 340/932.2 |
| 2002/0109611 A1 | 8/2002 | Howard ................. 340/932.2 |
| 2002/0111768 A1 | 8/2002 | Ghorayeb et al. ............ 702/178 |
| 2002/0134645 A1 | 9/2002 | Alexander et al. .......... 194/351 |
| 2003/0010821 A1 | 1/2003 | Silberberg ................ 235/382 |
| 2003/0017904 A1 | 1/2003 | Lee ........................ 475/232 |
| 2003/0092387 A1 | 5/2003 | Hjelmvik ................... 455/41 |
| 2003/0112151 A1 | 6/2003 | Chauvin et al. ......... 340/870.02 |
| 2003/0112597 A1 | 6/2003 | Smith ....................... 361/685 |
| 2003/0117904 A1 | 6/2003 | Lank et al. |
| 2003/0121754 A1 | 7/2003 | King ...................... 194/302 |
| 2003/0128010 A1 | 7/2003 | Hsu ........................ 320/101 |
| 2003/0128136 A1 | 7/2003 | Spier et al. ............... 340/932.2 |
| 2003/0132292 A1 | 7/2003 | Gomez et al. .......... G06K 15/00 |
| 2003/0132840 A1 | 7/2003 | Bahar ...................... 340/541 |
| 2003/0135407 A1 | 7/2003 | Reinhardt et al. ............. 705/13 |
| 2003/0140531 A1 | 7/2003 | Pippins ...................... 37/456 |
| 2003/0144905 A1 | 7/2003 | Smith ....................... 705/14 |
| 2003/0144972 A1 | 7/2003 | Cordery et al. .............. 705/401 |
| 2003/0169183 A1 | 9/2003 | Korepanov et al. ........ 340/932.2 |
| 2003/0179107 A1 | 9/2003 | Kibria et al. ............. 340/932.2 |
| 2003/0220835 A1 | 11/2003 | Barnes, Jr. ................ 705/14 |
| 2003/0222792 A1 | 12/2003 | Berman et al. ........... 340/932.2 |
| 2003/0229793 A1 | 12/2003 | McCall et al. ........... H04L 9/00 |
| 2003/0234888 A1 | 12/2003 | Hong et al. ................ 348/375 |
| 2004/0011099 A1 | 1/2004 | Andersson ................... 70/371 |
| 2004/0016796 A1 | 1/2004 | Hanna et al. .............. 235/375 |
| 2004/0039632 A1 | 2/2004 | Han et al. .................. 705/13 |
| 2004/0040028 A1 | 2/2004 | Moreau .................... 719/310 |
| 2004/0059693 A1 | 3/2004 | Hausen et al. ......... G07B 15/02 |
| 2004/0068434 A1 | 4/2004 | Kanekon |
| 2004/0084278 A1 | 5/2004 | Harris et al. ................ 194/302 |
| 2004/0094619 A1 | 5/2004 | Silberberg ................ 235/382 |
| 2004/0160905 A1 | 8/2004 | Bernier et al. ............. 370/310 |
| 2004/0160906 A1 | 8/2004 | Greszczuk et al. .......... 370/311 |
| 2004/0181496 A1 | 9/2004 | Odinotski et al. ............ 705/418 |
| 2004/0207530 A1 | 10/2004 | Nielsen ................. G08B 21/00 |
| 2004/0232878 A1 | 11/2004 | Couch et al. .............. 320/101 |
| 2004/0243526 A1 | 12/2004 | Krygler et al. ............. 705/418 |
| 2004/0254840 A1 | 12/2004 | Slemmer et al. ............. 705/22 |
| 2004/0254900 A1 | 12/2004 | Reinhard .................. 705/418 |
| 2004/0262379 A1 | 12/2004 | Gomes ..................... 235/379 |
| 2004/0263117 A1 | 12/2004 | Kogan et al. .............. 320/114 |
| 2004/0264302 A1 | 12/2004 | Ward, II ................... 368/90 |
| 2005/0001779 A1 | 1/2005 | Copeland ................. 343/867 |
| 2005/0029340 A1 | 2/2005 | Ferraro .................... 235/379 |
| 2005/0035740 A1 | 2/2005 | Elder et al. ................ 320/116 |
| 2005/0040951 A1 | 2/2005 | Zalewski et al. .......... 340/572.1 |
| 2005/0068201 A1 | 3/2005 | Wulff et al. ................. 341/20 |
| 2005/0099320 A1 | 5/2005 | Nath et al. ................ 340/933 |
| 2005/0102075 A1 | 5/2005 | Dar et al. ................... 701/29 |
| 2005/0155839 A1 | 7/2005 | Banks et al. ................ 194/302 |
| 2005/0168352 A1 | 8/2005 | Tomer .................... 340/932.2 |
| 2005/0178639 A1 | 8/2005 | Brumfield et al. ........... 194/350 |
| 2005/0192911 A1 | 9/2005 | Mattern ................... 705/401 |
| 2005/0216354 A1 | 9/2005 | Bam et al. .................. 705/26 |
| 2005/0226201 A1 | 10/2005 | McMilliin ................ 370/348 |
| 2006/0020487 A1 | 1/2006 | Spittel et al. ................ 705/1 |
| 2006/0021848 A1 | 2/2006 | Smith ..................... 194/350 |
| 2006/0028919 A1 | 2/2006 | Mitschele ............... G04F 3/00 |
| 2006/0052055 A1 | 3/2006 | Rowse et al. ............. 455/41.1 |
| 2006/0072286 A1 | 4/2006 | Tseng ..................... 361/679.22 |
| 2006/0074159 A1 | 6/2006 | Yoshikawa et al. |
| 2006/0116972 A1 | 6/2006 | Wong ...................... 705/418 |
| 2006/0136131 A1 | 6/2006 | Dugan et al. .............. 701/300 |
| 2006/0149684 A1 | 7/2006 | Matsuura et al. .............. 705/65 |
| 2006/0152349 A1 | 7/2006 | Ratnakar ................. 340/426.1 |
| 2006/0152385 A1 | 7/2006 | Mandy ................... 340/932.2 |
| 2006/0173733 A1 | 8/2006 | Fancher .................... 705/13 |
| 2006/0227010 A1 | 10/2006 | Berstis et al. ............. G08G 1/14 |
| 2006/0255119 A1 | 11/2006 | Marchasin et al. .......... 235/375 |
| 2006/0259354 A1 | 11/2006 | Yan ......................... 705/13 |
| 2006/0267799 A1 | 11/2006 | Mendelson ............... 340/932.2 |
| 2007/0011700 A1 | 1/2007 | Johnson .................... 725/34 |
| 2007/0016539 A1 | 1/2007 | Groft et al. ................ 705/418 |
| 2007/0017265 A1 | 1/2007 | Andersson ................... 70/379 |
| 2007/0029825 A1 | 2/2007 | Franklin et al. ............ 293/128 |
| 2007/0040449 A1 | 2/2007 | Spurlin et al. ............... 307/64 |
| 2007/0044523 A1 | 3/2007 | Davis ........................ 70/34 |
| 2007/0046651 A1 | 3/2007 | Sinclair et al. .............. 345/173 |
| 2007/0061155 A1 | 3/2007 | Ji et al. ..................... 705/1 |
| 2007/0074702 A1 | 4/2007 | Nakamura et al. .......... 123/299 |
| 2007/0094153 A1 | 4/2007 | Ferraro ..................... 705/67 |
| 2007/0114849 A1 | 5/2007 | Falik et al. .................. 307/64 |
| 2007/0119682 A1 | 5/2007 | Banks et al. ................ 194/239 |
| 2007/0129974 A1 | 6/2007 | Chen et al. ................. 705/5 |
| 2007/0136128 A1 | 6/2007 | Janacek et al. .............. 705/13 |
| 2007/0171069 A1 | 7/2007 | Allen ..................... 340/572.1 |
| 2007/0184852 A1 | 8/2007 | Johnson et al. ........... 455/456.1 |
| 2007/0190907 A1 | 8/2007 | Kunihiro et al. ........... 417/44.2 |
| 2007/0208499 A1 | 9/2007 | Kwong ..................... 701/117 |
| 2007/0210935 A1 | 9/2007 | Yost et al. ............... 340/932.2 |
| 2007/0276724 A1 | 11/2007 | Catt ......................... 705/13 |
| 2007/0285281 A1 | 12/2007 | Welch .................... 340/932.2 |
| 2008/0052254 A1 | 2/2008 | Al Amri .................. 705/418 |
| 2008/0061967 A1 | 3/2008 | Corrado |
| 2008/0071611 A1 | 3/2008 | Lovett ...................... 705/13 |
| 2008/0093454 A1 | 4/2008 | Yamazaki et al. |
| 2008/0147268 A1 | 6/2008 | Fuller ...................... 701/35 |
| 2008/0158010 A1 | 7/2008 | Nath et al. ................ 340/932.2 |
| 2008/0165030 A1 | 7/2008 | Kuo et al. ................ 340/932.2 |
| 2008/0208680 A1 | 8/2008 | Cho ........................ 705/13 |
| 2008/0218383 A1 | 9/2008 | Franklin et al. ............. 340/937 |
| 2008/0238715 A1 | 10/2008 | Cheng et al. ............ 340/870.03 |
| 2008/0245638 A1 | 10/2008 | King et al. ................ 194/350 |
| 2008/0257965 A1 | 10/2008 | Klein et al. ............... 235/483 |
| 2008/0265019 A1 | 10/2008 | Artino et al. .............. 235/379 |

(56) References Cited

U.S. PATENT DOCUMENTS

| | | | |
|---|---|---|---|
| 2008/0266138 A1 | 10/2008 | Ponert | 340/932.2 |
| 2008/0270227 A1 | 10/2008 | Al Amri | 705/13 |
| 2008/0277468 A1 | 11/2008 | Mitschele | 235/384 |
| 2008/0289030 A1 | 11/2008 | Poplett | 726/15 |
| 2008/0291054 A1 | 11/2008 | Groft | 340/932.2 |
| 2008/0296365 A1 | 12/2008 | Schliebe | 235/379 |
| 2008/0319837 A1 | 12/2008 | Mitschele | 705/13 |
| 2009/0026842 A1 | 1/2009 | Hunter et al. | 307/66 |
| 2009/0032368 A1 | 2/2009 | Hunter et al. | 194/318 |
| 2009/0049875 A1 | 2/2009 | Buhl et al. | 70/52 |
| 2009/0057398 A1 | 3/2009 | Douglass et al. | 235/379 |
| 2009/0083149 A1 | 3/2009 | Maekawa et al. | 705/14 |
| 2009/0095593 A1 | 4/2009 | King et al. | 194/302 |
| 2009/0099761 A1 | 4/2009 | Davis et al. | 701/120 |
| 2009/0102726 A1 | 4/2009 | Imano et al. | |
| 2009/0109062 A1 | 4/2009 | An | 340/932.2 |
| 2009/0121889 A1 | 5/2009 | Lin et al. | G08B 21/00 |
| 2009/0137204 A1 | 5/2009 | Chang | 455/41.1 |
| 2009/0146796 A1 | 6/2009 | Goto et al. | H04Q 5/22 |
| 2009/0159674 A1 | 6/2009 | King et al. | 235/382 |
| 2009/0174528 A1 | 7/2009 | Toda et al. | H04Q 5/22 |
| 2009/0177580 A1 | 7/2009 | Lowenthal et al. | 705/39 |
| 2009/0183966 A1 | 7/2009 | King et al. | 194/217 |
| 2009/0192950 A1 | 7/2009 | King et al. | 705/418 |
| 2009/0199966 A1 | 8/2009 | Coleman et al. | |
| 2009/0254438 A1 | 10/2009 | Johnson, Jr. et al. | 705/17 |
| 2009/0256707 A1 | 10/2009 | Uschold | 340/568.1 |
| 2009/0267732 A1 | 10/2009 | Chauvin et al. | 340/5.53 |
| 2009/0284907 A1 | 11/2009 | Regimbal et al. | 361/679.02 |
| 2009/0287578 A1 | 11/2009 | Paluszek et al. | 705/17 |
| 2009/0315773 A1 | 12/2009 | Clement et al. | 340/573.5 |
| 2010/0019936 A1 | 1/2010 | Kaveler | 340/933 |
| 2010/0025459 A1 | 2/2010 | Yamada | 235/375 |
| 2010/0026522 A1 | 2/2010 | Ward, II | 340/932.2 |
| 2010/0030629 A1 | 2/2010 | Ward, II | 705/13 |
| 2010/0032266 A1 | 2/2010 | Stephan | 200/4 |
| 2010/0060479 A1 | 3/2010 | Salter | 340/870 |
| 2010/0103100 A1 | 4/2010 | Yamamoto | 345/158 |
| 2010/0106517 A1 | 4/2010 | Kociubinski et al. | 705/2 |
| 2010/0116883 A1 | 5/2010 | Cost et al. | 235/381 |
| 2010/0153193 A1 | 6/2010 | Ashby et al. | 705/13 |
| 2010/0161489 A1 | 6/2010 | Goodall et al. | 705/45 |
| 2010/0168694 A1 | 7/2010 | Gakhar et al. | A61F 13/42 |
| 2010/0187300 A1 | 7/2010 | Ramachandran et al. | 235/379 |
| 2010/0188932 A1 | 7/2010 | Hanks et al. | 367/140 |
| 2010/0224682 A1 | 9/2010 | Busch-Sorensen | 235/380 |
| 2010/0241564 A1 | 9/2010 | Miller et al. | 705/43 |
| 2010/0243729 A1 | 9/2010 | Russell et al. | 235/379 |
| 2010/0328104 A1 | 12/2010 | Groft | 340/932.2 |
| 2010/0332394 A1 | 12/2010 | Ioli | 705/44 |
| 2011/0015934 A1 | 1/2011 | Rowe et al. | G06Q 30/00 |
| 2011/0022427 A1 | 1/2011 | Dayan | 705/5 |
| 2011/0037562 A1 | 2/2011 | Braukmann et al. | |
| 2011/0057815 A1 | 3/2011 | King et al. | 340/932.2 |
| 2011/0060653 A1 | 3/2011 | King et al. | 705/14.58 |
| 2011/0062230 A1 | 3/2011 | Ward, II et al. | 235/377 |
| 2011/0063133 A1 | 3/2011 | Keller et al. | 340/932.2 |
| 2011/0066297 A1 | 3/2011 | Saberi et al. | 700/287 |
| 2011/0079564 A1 | 4/2011 | Palmer | A47F 7/00 |
| 2011/0093314 A1 | 4/2011 | Redmann et al. | |
| 2011/0106329 A1 | 5/2011 | Donnelly et al. | 700/291 |
| 2011/0122036 A1 | 5/2011 | Leung et al. | |
| 2011/0133613 A1 | 6/2011 | Descamps et al. | 312/223.1 |
| 2011/0158331 A1 | 6/2011 | Kavaler et al. | 375/259 |
| 2011/0203901 A1 | 8/2011 | King et al. | 194/211 |
| 2011/0204847 A1 | 8/2011 | Turner | H02J 7/00 |
| 2011/0205087 A1 | 8/2011 | Kell et al. | 340/932.2 |
| 2011/0210827 A1 | 9/2011 | Lidror | H04Q 5/22 |
| 2011/0213656 A1 | 9/2011 | Turner | 705/14.49 |
| 2011/0218940 A1 | 9/2011 | Bergstrom et al. | 705/418 |
| 2011/0221624 A1 | 9/2011 | Kavaler | 342/22 |
| 2011/0222957 A1 | 9/2011 | Marques Lito Velez Grilo | F16B 5/02 |
| 2011/0241604 A1 | 10/2011 | Anderson | H01M 10/46 |
| 2011/0261548 A1 | 10/2011 | Gandhi | |
| 2011/0276519 A1 | 11/2011 | MacKay et al. | 705/418 |
| 2011/0289985 A1 | 12/2011 | MacKay et al. | 70/1.5 |
| 2011/0313822 A1 | 12/2011 | Burdick | 705/13 |
| 2011/0316716 A1 | 12/2011 | MacKay et al. | 340/870.02 |
| 2011/0320243 A1 | 12/2011 | Khan | 705/13 |
| 2011/0320256 A1 | 12/2011 | Florucci et al. | 705/14.33 |
| 2012/0026015 A1 | 2/2012 | Kavaler | 340/933 |
| 2012/0073222 A1 | 3/2012 | Sargentini | 52/235 |
| 2012/0078686 A1 | 3/2012 | Bashani | 705/13 |
| 2012/0084210 A1 | 4/2012 | Farahmand | 705/64 |
| 2012/0092528 A1 | 4/2012 | Jung et al. | H04N 5/262 |
| 2012/0143657 A1 | 6/2012 | Silberberg | G08G 1/14 |
| 2012/0158466 A1 | 6/2012 | John | 705/13 |
| 2012/0173171 A1 | 7/2012 | Bajwa et al. | 702/56 |
| 2012/0185325 A1 | 7/2012 | Shani | 705/14.43 |
| 2012/0197806 A1 | 8/2012 | Hill | 705/67 |
| 2012/0208521 A1 | 8/2012 | Hager et al. | 455/422.1 |
| 2012/0213351 A1 | 8/2012 | Boyce et al. | 379/167.01 |
| 2012/0222935 A1 | 9/2012 | MacKay et al. | 194/210 |
| 2012/0223841 A1 | 9/2012 | Chauvin et al. | 340/870.02 |
| 2012/0254040 A1 | 10/2012 | Dixon et al. | 705/44 |
| 2012/0255333 A1 | 10/2012 | MacKay et al. | 70/357 |
| 2012/0273322 A1 | 11/2012 | MacKay et al. | 194/210 |
| 2012/0285790 A1 | 11/2012 | Jones et al. | 194/217 |
| 2012/0285791 A1 | 11/2012 | Jones et al. | 194/217 |
| 2012/0285792 A1 | 11/2012 | Jones et al. | 194/217 |
| 2012/0285793 A1 | 11/2012 | Jones et al. | 194/217 |
| 2012/0286036 A1 | 11/2012 | Jones et al. | 235/380 |
| 2012/0286968 A1 | 11/2012 | Jones et al. | 340/870.02 |
| 2012/0292385 A1 | 11/2012 | MacKay et al. | 235/375 |
| 2013/0005445 A1 | 1/2013 | Walker et al. | 463/25 |
| 2013/0016952 A1 | 1/2013 | Knuth | 385/135 |
| 2013/0027218 A1 | 1/2013 | Schwarz et al. | 340/870.02 |
| 2013/0085928 A1 | 4/2013 | McKinney | 705/39 |
| 2013/0086375 A1 | 4/2013 | Lyne et al. | H01L 9/00 |
| 2013/0099943 A1 | 4/2013 | Subramanya | 340/933 |
| 2013/0124270 A1 | 5/2013 | Tziperman et al. | 705/13 |
| 2013/0124320 A1 | 5/2013 | Karner | G06Q 30/02 |
| 2013/0143536 A1 | 6/2013 | Ratti | H04W 4/003 |
| 2013/0231985 A1 | 9/2013 | MacKay et al. | G06Q 50/30 |
| 2013/0238406 A1 | 9/2013 | King et al. | 705/13 |
| 2013/0257589 A1 | 10/2013 | Mohiuddin et al. | G08C 17/02 |
| 2013/0262275 A1 | 10/2013 | Outwater et al. | G06Q 20/40 |
| 2013/0285455 A1 | 10/2013 | Hunter et al. | 307/66 |
| 2014/0040028 A1 | 2/2014 | King et al. | 705/14.53 |
| 2014/0041301 A1 | 2/2014 | Oakley et al. | 49/14 |
| 2014/0058805 A1 | 2/2014 | Paesler et al. | 705/13 |
| 2014/0108107 A1 | 4/2014 | Jones et al. | 705/13 |
| 2014/0129158 A1 | 5/2014 | Shea | 702/57 |
| 2014/0139360 A1 | 5/2014 | Vilajosana Guillen et al. | G08G 1/14 |
| 2014/0165885 A1 | 6/2014 | Denny | E05G 1/14 |
| 2014/0172518 A1 | 6/2014 | King et al. | 705/13 |
| 2014/0174880 A1 | 6/2014 | MacKay et al. | G07F 1/043 |
| 2014/0174881 A1 | 6/2014 | King et al. | 194/350 |
| 2014/0210646 A1 | 7/2014 | Subramanya | 340/928 |
| 2014/0213176 A1 | 7/2014 | Mendelson | 455/39 |
| 2014/0214499 A1 | 7/2014 | Hudson et al. | 705/13 |
| 2014/0214500 A1 | 7/2014 | Hudson et al. | G06Q 30/0284 |
| 2014/0218527 A1 | 8/2014 | Subramanya | G08G 1/143 |
| 2014/0229246 A1 | 8/2014 | Ghaffari | G06K 19/0723 |
| 2014/0231505 A1 | 8/2014 | King et al. | 235/375 |
| 2014/0257943 A1 | 9/2014 | Nerayoff et al. | G06T 7/2093 |
| 2014/0279565 A1 | 9/2014 | Trump et al. | 705/72 |
| 2014/0289025 A1 | 9/2014 | King et al. | 705/13 |
| 2014/0319211 A1 | 10/2014 | MacKay et al. | 235/380 |
| 2014/0344891 A1 | 11/2014 | Mullick et al. | H04L 63/0272 |
| 2015/0000511 A1 | 1/2015 | Engl | F41H 5/26 |
| 2015/0029041 A1 | 1/2015 | Liu et al. | G08F 1/14 |
| 2015/0045984 A1 | 2/2015 | Hui et al. | B60W 50/08 |
| 2015/0068827 A1 | 3/2015 | Makitalo et al. | B62M 27/02 |
| 2015/0084786 A1 | 3/2015 | King et al. | 340/870.02 |
| 2015/0106172 A1 | 4/2015 | Salama | G07F 17/246 |
| 2015/0120336 A1 | 4/2015 | Grokop et al. | G06Q 40/08 |
| 2015/0129391 A1 | 5/2015 | Jones et al. | G07F 17/24 |
| 2015/0134460 A1 | 5/2015 | Tian et al. | G06Q 30/02 |
| 2015/0160761 A1 | 6/2015 | Lee et al. | G06F 3/044 |
| 2015/0179070 A1 | 6/2015 | Sanbrook | G08G 1/14 |
| 2015/0191178 A1 | 7/2015 | Roy et al. | B60W 40/09 |

(56) References Cited

U.S. PATENT DOCUMENTS

| | | | |
|---|---|---|---|
| 2015/0215375 A1 | 7/2015 | Hundt et al. | 701/1 |
| 2015/0235503 A1 | 8/2015 | King et al. | G07F 17/248 |
| 2015/0242605 A1 | 8/2015 | Du et al. | G06F 21/31 |
| 2015/0278969 A1 | 10/2015 | Benoy et al. | G06Q 50/10 |
| 2015/0283902 A1 | 10/2015 | Tuukkanen | B60K 35/00 |
| 2015/0288713 A1 | 10/2015 | Lawrence et al. | H04L 29/06 |
| 2015/0288932 A1 | 10/2015 | Smith et al. | H04N 7/183 |
| 2015/0294526 A1 | 10/2015 | Vogt | G07F 17/24 |
| 2015/0302057 A1 | 10/2015 | Kealey et al. | G06F 17/30 |
| 2015/0332587 A1 | 11/2015 | Schwarz et al. | G08G 1/017 |
| 2015/0333598 A1 | 11/2015 | Conticchio et al. | H02K 7/1876 |
| 2015/0341241 A1 | 11/2015 | Robertson | H04L 43/0811 |
| 2015/0356604 A1 | 12/2015 | Kim et al. | G06Q 30/02 |
| 2015/0371483 A1 | 12/2015 | Sun | G07F 17/248 |
| 2015/0376891 A1 | 12/2015 | Laurindo | E04B 1/28 |
| 2016/0001782 A1 | 1/2016 | Fiedler | B60W 40/09 |
| 2016/0012418 A1 | 1/2016 | MacKay et al. | G06Q 20/352 |
| 2016/0012602 A1 | 1/2016 | Xu et al. | G06T 7/0075 |
| 2016/0040699 A1 | 2/2016 | Nayar | F16B 5/0225 |
| 2016/0055322 A1 | 2/2016 | Thomas | G06F 21/10 |
| 2016/0069557 A1 | 3/2016 | Rueckgauer | F21V 25/12 |
| 2016/0086397 A1 | 3/2016 | Phillips | G07C 5/08 |
| 2016/0133085 A1 | 5/2016 | Eagon et al. | G07F 17/24 |
| 2016/0163119 A1 | 6/2016 | Bashani | G07B 15/00 |
| 2016/0267340 A1 | 9/2016 | Jensen | G06K 9/00926 |
| 2016/0268838 A1 | 9/2016 | Hunter et al. | H02J 9/061 |
| 2016/0321714 A1 | 11/2016 | King et al. | G06Q 30/0284 |
| 2016/0371915 A1 | 12/2016 | MacKay et al. | G07F 1/042 |
| 2017/0031464 A1 | 2/2017 | Montero | G06F 3/038 |
| 2017/0032485 A1 | 2/2017 | Vemury | G06Q 50/26 |
| 2017/0032582 A1 | 2/2017 | Moran et al. | G07B 15/02 |
| 2017/0034600 A1 | 2/2017 | King et al. | H04Q 9/00 |
| 2017/0083043 A1 | 3/2017 | Bowers et al. | G06F 1/1601 |
| 2017/0094517 A1 | 3/2017 | Jakobsson | H04Q 12/06 |
| 2017/0096123 A1 | 4/2017 | Gennermann et al. | B60R 25/24 |
| 2017/0098339 A1 | 4/2017 | Keller et al. | G07F 17/24 |
| 2017/0116857 A1 | 4/2017 | Moran et al. | G08G 1/14 |
| 2017/0148230 A1 | 5/2017 | Richard | G07B 15/02 |
| 2017/0154368 A1 | 6/2017 | Jones et al. | G06Q 30/0284 |
| 2017/0168155 A1 | 6/2017 | Richard | G01S 13/86 |
| 2017/0186054 A1 | 6/2017 | Fish et al. | G06Q 30/02 |
| 2017/0193734 A1 | 7/2017 | King et al. | G07F 17/0021 |
| 2017/0197586 A1 | 7/2017 | Kawamura et al. | B60R 25/24 |
| 2017/0206716 A1 | 7/2017 | King et al. | G07B 15/02 |
| 2017/0213262 A1 | 7/2017 | Kelley, II et al. | G06Q 30/02 |
| 2017/0256983 A1 | 9/2017 | Hunter et al. | H02J 9/061 |
| 2017/0262882 A1 | 9/2017 | Shina | G06Q 30/02 |
| 2017/0299400 A1 | 10/2017 | Joung et al. | G01C 21/36 |
| 2017/0320501 A1 | 11/2017 | Li et al. | B60W 50/08 |
| 2017/0323227 A1 | 11/2017 | Sadeghi | G06Q 10/02 |
| 2017/0323513 A1 | 11/2017 | Jones | G07F 17/246 |
| 2017/0325082 A1 | 11/2017 | Rowe et al. | H04W 4/18 |
| 2017/0369071 A1 | 12/2017 | Gould et al. | B60W 50/00 |
| 2018/0018179 A1 | 1/2018 | Scheufler et al. | G06F 9/44 |
| 2018/0025549 A1 | 1/2018 | King et al. | G07B 15/02 |
| 2018/0025550 A1 | 1/2018 | Hudson et al. | G07B 15/02 |
| 2018/0025629 A1 | 1/2018 | Schwarz et al. | G08G 1/017 |
| 2018/0061172 A1 | 3/2018 | MacKay et al. | G07F 17/24 |
| 2018/0068337 A1 | 3/2018 | Fiorucci et al. | G06Q 30/0226 |
| 2018/0082488 A1 | 3/2018 | King et al. | G07B 15/02 |
| 2018/0082489 A1 | 3/2018 | King et al. | G07B 15/02 |
| 2018/0082490 A1 | 3/2018 | King et al. | G07B 15/02 |
| 2018/0160282 A1 | 6/2018 | Van De Poll | G06K 9/00 |
| 2018/0225908 A1 | 8/2018 | MacKay et al. | G07F 17/24 |
| 2018/0225909 A1 | 8/2018 | MacKay | G07F 17/24 |
| 2018/0322534 A1 | 11/2018 | King et al. | G06Q 30/0268 |
| 2018/0339708 A1 | 11/2018 | Geller | B60W 30/18 |
| 2018/0342165 A1 | 11/2018 | Sweeney et al. | G08G 1/00 |
| 2018/0350185 A1 | 12/2018 | King et al. | G07F 17/0021 |
| 2019/0062914 A1 | 2/2019 | King et al. | C23C 16/455 |
| 2019/0066424 A1 | 2/2019 | Hassani et al. | G07C 9/00 |
| 2019/0073837 A1 | 3/2019 | Oliver | G07B 15/02 |
| 2019/0114869 A1 | 4/2019 | MacKay et al. | G07F 17/24 |
| 2019/0131819 A1 | 5/2019 | Bell | H02J 7/35 |
| 2019/0220011 A1 | 7/2019 | Della Penna | G05D 1/00 |
| 2019/0227954 A1 | 7/2019 | Shi | G06F 13/10 |
| 2019/0251608 A1 | 8/2019 | King et al. | G06Q 30/02 |
| 2019/0272680 A1 | 9/2019 | King et al. | G07B 15/02 |
| 2019/0272681 A1 | 9/2019 | King et al. | G07B 15/02 |
| 2019/0304203 A1 | 10/2019 | King et al. | G07B 15/02 |
| 2019/0362383 A1 | 11/2019 | King et al. | G06Q 30/02 |
| 2019/0370923 A1 | 12/2019 | Randall et al. | G06Q 50/30 |
| 2019/0378368 A1 | 12/2019 | MacKay et al. | G07F 17/24 |
| 2019/0385454 A1 | 12/2019 | King et al. | G08G 1/148 |
| 2020/0059708 A1 | 2/2020 | King et al. | H04Q 9/00 |
| 2020/0136229 A1 | 4/2020 | MacKay et al. | H01Q 1/22 |
| 2020/0153270 A1 | 5/2020 | Hunter et al. | H02J 9/061 |
| 2020/0160263 A1 | 5/2020 | Kuettner | G06Q 10/08 |
| 2020/0276503 A1 | 9/2020 | Marchiorello | A63F 13/798 |
| 2020/0310528 A1 | 10/2020 | Upmanue et al. | G06F 3/01 |
| 2020/0327801 A1 | 10/2020 | Schwarz et al. | G08G 1/017 |
| 2020/0334581 A1 | 10/2020 | Skaling | G06Q 10/02 |
| 2020/0349666 A1 | 11/2020 | Hodge et al. | G06Q 50/30 |
| 2020/0364967 A1 | 11/2020 | Spice | G07F 7/08 |
| 2021/0065263 A1 | 3/2021 | King et al. | G06Q 30/02 |
| 2021/0067846 A1 | 3/2021 | King et al. | H04Q 9/00 |
| 2021/0319485 A1 | 10/2021 | King et al. | G06Q 30/02 |
| 2021/0344218 A1 | 11/2021 | Hunter et al. | H02J 9/06 |
| 2021/0407348 A1 | 12/2021 | King et al. | G09F 23/00 |
| 2022/0030335 A1 | 1/2022 | King et al. | G04Q 9/00 |
| 2022/0076303 A1 | 3/2022 | King et al. | G06Q 30/02 |
| 2022/0076304 A1 | 3/2022 | King et al. | G06Q 30/02 |
| 2022/0076305 A1 | 3/2022 | King et al. | G06Q 30/02 |
| 2023/0005369 A1 | 1/2023 | King et al. | G08G 1/148 |
| 2023/0057773 A1 | 2/2023 | King et al. | G07B 15/02 |
| 2023/0072870 A1 | 3/2023 | Marvi et al. | F16L 55/32 |
| 2023/0274635 A1 | 8/2023 | Schwarz et al. | G08G 1/017 |

FOREIGN PATENT DOCUMENTS

| | | | |
|---|---|---|---|
| AU | 200227724 | 1/2003 | G07C 1/30 |
| AU | 2006203554 | 9/2006 | G07C 1/30 |
| AU | 314132 | 5/2007 | 10/3 |
| AU | 315845 | 8/2007 | 10/3 |
| AU | 315846 | 8/2007 | 10/3 |
| AU | 315847 | 8/2007 | 10/3 |
| BR | MU76023990 | 1/1998 | G06F 3/05 |
| CA | 2233931 | 4/1997 | G08G 1/14 |
| CA | 2260925 | 1/1998 | G07B 15/00 |
| CA | 2186406 | 3/1998 | G07C 1/30 |
| CA | 2227833 | 7/1998 | G07F 17/24 |
| CA | 2346908 | 4/2000 | G07C 1/30 |
| CA | 2352968 | 1/2001 | G07F 17/24 |
| CA | 2373400 | 8/2001 | G07D 5/04 |
| CA | 2401429 | 9/2001 | G07C 1/30 |
| CA | 2377010 | 12/2001 | G07F 19/00 |
| CA | 2357179 | 3/2002 | G08C 17/00 |
| CA | 2437722 | 8/2002 | G08G 1/14 |
| CA | 2453369 | 1/2003 | G07C 1/30 |
| CA | 2363915 | 5/2003 | G07F 17/24 |
| CA | 2413198 | 5/2003 | G07F 17/24 |
| CA | 2414132 | 6/2003 | G07F 17/24 |
| CA | 2302922 | 1/2004 | G07D 5/08 |
| CA | 2443677 | 10/2004 | G08G 1/00 |
| CA | 2248347 | 10/2005 | G07C 1/30 |
| CA | 2595309 | 7/2006 | G08G 1/14 |
| CA | 2511461 | 2/2007 | G07C 1/30 |
| CA | 2631699 | 6/2007 | G06Q 10/00 |
| CA | 2622164 | 8/2008 | G07F 17/24 |
| CA | 122930 | 9/2008 | |
| CA | 126745 | 9/2008 | |
| CA | 2693911 | 1/2009 | G06Q 50/00 |
| CA | 2650192 | 7/2009 | G08C 17/02 |
| CA | 2650195 | 7/2009 | G01D 4/02 |
| CA | 2933066 | 7/2009 | G07F 17/24 |
| CA | 2387540 | 4/2010 | G07F 17/24 |
| CA | 134041 | 9/2010 | |
| CA | 134042 | 9/2010 | |
| CA | 2773132 | 3/2011 | G06Q 30/00 |
| CA | 2773135 | 3/2011 | G06Q 20/00 |
| CA | 2517717 | 1/2012 | G07F 19/00 |
| CA | 2770093 | 5/2012 | G07C 1/30 |
| CA | 2870544 | 5/2012 | G07C 1/30 |

(56) References Cited

FOREIGN PATENT DOCUMENTS

| | | | |
|---|---|---|---|
| CA | 2870592 | 5/2012 | ............ G07F 17/24 |
| CA | 2874155 | 5/2012 | ............ G07F 17/24 |
| CA | 2773250 | 9/2012 | ............. G07C 1/30 |
| CA | 142346 | 7/2013 | |
| CA | 145137 | 7/2013 | |
| CA | 155382 | 5/2015 | |
| CA | 155383 | 5/2015 | |
| CA | 155391 | 5/2015 | |
| CA | 156990 | 5/2015 | |
| CA | 156991 | 5/2015 | |
| CA | 156992 | 5/2015 | |
| CA | 156993 | 5/2015 | |
| CA | 156994 | 5/2015 | |
| CA | 156995 | 5/2015 | |
| CA | 157067 | 5/2015 | |
| CA | 157068 | 5/2015 | |
| CA | 157069 | 5/2015 | |
| CA | 161049 | 10/2015 | |
| CA | 160598 | 2/2016 | |
| CA | 163369 | 2/2016 | |
| CA | 163370 | 2/2016 | |
| CA | 2900177 | 2/2017 | ............ G07F 17/24 |
| CA | 2908793 | 2/2017 | ............. G07C 1/30 |
| CA | 2932667 | 2/2017 | ............. G07C 1/30 |
| CA | 168171 | 3/2017 | |
| CA | 168172 | 3/2017 | |
| CA | 168173 | 3/2017 | |
| CA | 168199 | 3/2017 | |
| CA | 168200 | 3/2017 | |
| CA | 169198 | 3/2017 | |
| CA | 171649 | 11/2017 | |
| CA | 171650 | 11/2017 | |
| CA | 171651 | 11/2017 | |
| CA | 171652 | 11/2017 | |
| CA | 171653 | 11/2017 | |
| CA | 171654 | 11/2017 | |
| CA | 2650195 C | 1/2018 | .............. G01D 4/02 |
| CA | 3046774 | 12/2019 | ............ G06Q 20/32 |
| CA | 189362 | 6/2021 | |
| CA | 189363 | 6/2021 | |
| CA | 189364 | 6/2021 | |
| CA | 189365 | 6/2021 | |
| CA | 189366 | 6/2021 | |
| CN | 1037604 | 11/1989 | ............. G07C 1/30 |
| CN | 2395344 | 9/2000 | ............ G07F 17/24 |
| CN | 2470887 | 1/2002 | ............ G07B 15/02 |
| CN | 2544352 | 4/2003 | ............ G06F 19/00 |
| CN | 1549990 | 11/2004 | ............ G07B 15/02 |
| CN | 201303054 | 9/2009 | .............. H01Q 7/06 |
| CN | 202217169 | 5/2012 | ........... G05B 19/414 |
| CN | 305987969 | 8/2020 | |
| DE | 28 04 085 A1 | 2/1977 | |
| DE | 27 50 193 C2 | 11/1977 | |
| DE | 102005041290 | 3/2007 | ............ G07B 15/02 |
| EM | 002416206-0001 | 3/2014 | |
| EM | 002416206-0002 | 3/2014 | |
| EM | 002416206-0003 | 3/2014 | |
| EM | 003076702-0001 | 4/2014 | |
| EM | 003076702-0002 | 4/2014 | |
| EM | 003076702-0003 | 4/2014 | |
| EM | 003076702-0004 | 4/2014 | |
| EM | 003076702-0005 | 4/2014 | |
| EM | 003076702-0006 | 4/2014 | |
| EM | 002479352-0001 | 6/2014 | |
| EM | 002479352-0002 | 6/2014 | |
| EM | 002479352-0003 | 6/2014 | |
| EM | 002479360-0001 | 6/2014 | |
| EM | 002479360-0002 | 6/2014 | |
| EM | 002479360-0003 | 6/2014 | |
| EM | 002479428-0001 | 6/2014 | |
| EM | 002479428-0002 | 6/2014 | |
| EM | 002479428-0003 | 6/2014 | |
| EM | 003462183-0001 | 11/2014 | |
| EM | 003462183-0002 | 11/2014 | |
| EM | 003462183-0003 | 11/2014 | |
| EM | 003462183-0004 | 11/2014 | |
| EM | 003462183-0005 | 11/2014 | |
| EM | 003462183-0006 | 11/2014 | |
| EM | 004415164-0001 | 1/2017 | |
| EM | 004415164-0002 | 10/2017 | |
| EM | 004415164-0003 | 10/2017 | |
| EM | 004415164-0004 | 10/2017 | |
| EM | 004415164-0005 | 10/2017 | |
| EM | 004415164-0006 | 10/2017 | |
| EM | 006836128-0001 | 6/2019 | |
| EM | 006836128-0002 | 6/2019 | |
| EM | 006836128-0003 | 6/2019 | |
| EM | 006836128-0004 | 6/2019 | |
| EM | 006836128-0005 | 6/2019 | |
| EM | 006836128-0006 | 6/2019 | |
| EM | 006836128-0007 | 6/2019 | |
| EM | 006836128-0008 | 6/2019 | |
| EM | 006836128-0009 | 6/2019 | |
| EP | 0265328 | 4/1988 | ............... H02J 7/34 |
| EP | 0329129 | 8/1989 | ............ G07F 17/24 |
| EP | 0933288 | 8/1999 | .............. B62H 3/00 |
| EP | 980055 | 2/2000 | ............ G07F 17/24 |
| EP | 1227448 | 7/2002 | ............ G07D 11/01 |
| EP | 1327962 | 7/2003 | ............ G07B 15/02 |
| EP | 1376491 | 1/2004 | .............. G07F 7/00 |
| EP | 1748393 | 1/2007 | ............. G07C 1/30 |
| EP | 1128350 | 10/2007 | ............ G07B 15/02 |
| EP | 1898360 | 3/2008 | ............ G07B 15/02 |
| EP | 2215605 | 8/2012 | ............ G07B 15/02 |
| FR | 2600448 | 6/1986 | ............. G07C 1/30 |
| FR | 2837583 | 9/2003 | ......... G06K 19/077 |
| FR | 2979726 | 3/2008 | ............ G06F 21/86 |
| FR | 2928678 | 9/2009 | ............ E05B 17/00 |
| GB | 1 237 579 | 12/1968 | |
| GB | 1 283 555 | 10/1969 | |
| GB | 1431862 | 4/1976 | ............ G08B 25/00 |
| GB | 2077475 | 12/1981 | ............ G07F 17/24 |
| GB | 2155228 | 9/1985 | ............ G09F 23/00 |
| GB | 2284919 | 6/1995 | ............. G07C 1/30 |
| GB | 2298510 | 9/1996 | .............. G07F 7/10 |
| GB | 2461397 | 1/2010 | ............ G07B 15/02 |
| IL | 149880 | 6/2007 | ............ G07B 15/00 |
| JP | S58121494 | 7/1983 | ............. G07C 1/30 |
| JP | S6437661 | 2/1989 | .............. E04H 6/00 |
| JP | 01165494 | 6/1989 | ............. B42D 15/10 |
| JP | 01303026 | 12/1989 | .............. G11C 5/00 |
| JP | H028692 | 1/1990 | .............. F28F 1/32 |
| JP | 0261711 | 3/1990 | .............. G06F 1/26 |
| JP | H02180623 | 7/1990 | ............ B01D 63/02 |
| JP | 0487533 | 3/1992 | ............... H02J 9/00 |
| JP | H08305998 | 11/1996 | .............. E04H 6/00 |
| JP | S5259000 | 5/1997 | ............. G07C 1/30 |
| JP | 2000286936 | 10/2000 | ............. H04M 1/00 |
| JP | 2002-42181 | 2/2002 | ............ G07B 1/00 |
| JP | 2002074430 | 3/2002 | ............ G06Q 50/00 |
| JP | 2002099640 | 4/2002 | ............ G06Q 10/00 |
| JP | 2002528799 | 9/2002 | ............ G06Q 10/00 |
| JP | 3441832 | 6/2003 | ............ G07B 5/00 |
| JP | 2003169133 | 6/2003 | ............. H04M 1/73 |
| JP | 2003527701 | 9/2003 | ............ G06Q 40/00 |
| JP | 2005242888 | 9/2005 | ............ G06Q 10/00 |
| JP | 2005267430 | 9/2005 | ............ G06Q 10/00 |
| JP | 2007052773 | 3/2007 | ............ G07F 17/24 |
| JP | 4240927 | 1/2009 | ............. H04M 1/73 |
| JP | 4247079 | 1/2009 | ............ G07B 5/00 |
| JP | 2011060206 | 3/2011 | ............ G07B 15/00 |
| JP | 5238316 | 4/2013 | ............ G07B 15/00 |
| KR | 20000016671 | 3/2000 | ............ G07F 17/24 |
| KR | 20010028481 | 4/2001 | ............ G07B 1/00 |
| KR | 20050038077 | 4/2005 | ............ G07B 5/12 |
| KR | 1020060088085 | 8/2006 | ............ G08G 1/017 |
| KR | 100693204 | 3/2007 | .............. H01Q 7/00 |
| KR | 1020080026282 | 3/2008 | ............ G06F 19/00 |
| KR | 20080041730 | 5/2008 | .............. G06T 7/20 |
| MX | 2008007047 | 8/2008 | ............ G06Q 10/00 |
| NZ | 530606 | 11/2006 | ............. G07C 1/30 |
| WO | WO 81/00778 | 3/1981 | |
| WO | WO9520204 | 7/1995 | ............ G07F 17/24 |
| WO | WO9611453 | 4/1996 | ............. G07C 1/30 |

(56) References Cited

FOREIGN PATENT DOCUMENTS

| | | | | |
|---|---|---|---|---|
| WO | WO97/12345 | 4/1997 | ............ | G07F 17/24 |
| WO | WO97/33341 | 9/1997 | ............... | H01Q 9/27 |
| WO | WO9737328 | 10/1997 | ............ | G07B 15/02 |
| WO | WO98/04080 | 1/1998 | ............ | H04M 15/00 |
| WO | WO0059201 | 10/2000 | ............ | H04M 15/00 |
| WO | WO0124127 | 4/2001 | ............ | G07F 17/24 |
| WO | WO01/69541 | 9/2001 | ............ | G07F 17/24 |
| WO | WO0180157 | 10/2001 | ............ | G06F 19/00 |
| WO | WO02063570 | 8/2002 | | |
| WO | WO02084600 | 10/2002 | ............ | G07B 15/02 |
| WO | WO03005324 | 1/2003 | ............... | G08G 1/14 |
| WO | WO03009238 | 1/2003 | ............... | G07C 1/30 |
| WO | WO03065322 | 8/2003 | ............ | G07F 17/24 |
| WO | WO2004012352 | 2/2004 | ............... | H04B 1/38 |
| WO | WO2005027035 | 3/2005 | ............ | G06K 19/07 |
| WO | WO2005031494 | 4/2005 | | |
| WO | WO2006076773 | 7/2006 | ............... | G08G 1/14 |
| WO | WO2006095352 | 9/2006 | ............... | H02J 9/06 |
| WO | WO2007063530 | 6/2007 | ............ | G06Q 10/00 |
| WO | WO2009009854 | 1/2009 | ............ | G06Q 50/00 |
| WO | WO2009154787 | 12/2009 | ............... | G08G 1/14 |
| WO | WO2010008610 | 1/2010 | ............ | G08G 1/065 |
| WO | WO2010062105 | 6/2010 | ............ | G07F 19/00 |
| WO | WO2010071972 | 7/2010 | ............... | G07C 1/30 |
| WO | WO2010071974 | 7/2010 | ............... | G07C 1/30 |
| WO | WO2011029061 | 3/2011 | ............ | G06Q 30/00 |
| WO | WO2011029062 | 3/2011 | ............ | G06Q 20/00 |
| WO | WO2012015453 | 2/2012 | ............ | G08G 1/042 |
| WO | WO2012092609 | 7/2012 | ............... | G08G 1/01 |
| WO | WO2012154902 | 11/2012 | ............ | G07F 17/14 |
| WO | WO2012154913 | 11/2012 | ............ | G06Q 50/30 |
| WO | WO2013016453 | 1/2013 | ............ | G07B 15/02 |
| WO | WO2013019273 | 3/2013 | ............... | G06F 7/00 |
| WO | WO2013049418 | 4/2013 | | |
| WO | WO2014014494 | 1/2014 | ............ | G07B 15/02 |
| WO | WO2014127384 | 8/2014 | ............ | G07F 19/00 |
| WO | WO2014152369 | 9/2014 | ............ | G07B 15/02 |
| WO | WO2017024396 | 2/2017 | ............... | G07C 1/30 |
| WO | WO2017024397 | 2/2017 | ............... | G07C 1/30 |

OTHER PUBLICATIONS

US 9,640,016 B2, 05/2017, King et al. (withdrawn)
(Cell Net Data Systems) "First Wireless Monitoring of Parking Meters Results in Theft Arrests Using CellNet Data Systems Technology," PRNewswire, May 11, 1999 (2 pgs).
Ambravan, B., "Improved-Clarity Polycarbonate (PC) Resins used in liniLED PU," http://organiclighting.com/tag/polycarbonate-pc-resins/, Sep. 26, 2016 (1 pg).
Anonymous, "The Originators of Metered Parking, Series II, APM-E Mechanism, Service Manual," POM Incorporated, May 23, 2006 revision (22 pgs).
Barefoot, D., "There'll be lies, there'll be tears, a jury of your peers," DarrenBarefoot.com: Dec. 2005, pp. 8-9 (39 pages).
Basu et al., "Networked Parking Spaces: Architecture and Applications," MCL Technical Report No. 07-01-2002, Proc. IEEE Vehicular Transportation Conference, Vancouver, Canada, Sep. 2002 (10 pgs).
Bayless et al., "Smart Parking and the Connected Consumer," ITS America Research, Dec. 2012 (39 pgs).
Bernspång, F., "Smart Parking using Magnetometers and Mobile Applications," Master's Thesis, Master of Science in Engineering Technology, Computer Science and Engineering, LuleáUniversity of Technology, Nov. 2010-May 2011 (35 pgs).
Bridge IR Group, Inc., Changing the Way the World Pays for On-Street Parking, Research Report, United States-Technology Processing Systems/Products, Dec. 6, 2006 (23 pgs).
Burden et al., "Near Field Communications (NFC) in Public Transport," Digital Identity Forum, 2006 (18 pgs).
Byrd, Dennis, "City officials plug solar-powered parking meters, Electronic eye ends free parking," Lawrence Journal World, Apr. 30, 1989, p. 11C (1pg).
Byrd, Dennis, Parking Meter Manufacturer Sees Bright Future for New Sun-Powered Devices, Los Angeles Times, May 14, 1989 (2 pgs).
Cardinal Tracking Inc.—MobileCite brochure, dated prior to Jun. 15, 2015 (2 pgs).
Cosgrove, D., "SmartPark," Senior Project Report, Jun. 12, 2013 (20 pgs).
CWT MAX Single/Dual Space Meter, Technical Data, May 18, 2016 (4 pgs).
DAT Self-Service System Limited, Product Brochure, Version 1.0, Date: May 2005, pp. 1-39 (39 pgs), plus English translation (42 pgs).
Digital Payment Technologies—LUKE brochure, dated prior to Jun. 15, 2015 (4 pgs).
Digital Payment Technologies—LUKE website, https://web.archive.org/web/20061025094839/http:www.digitalpaytech.com/luke.html, Oct. 25, 2006 (5 pgs).
Digital Payment Technologies, Credit Card Processing with LUKE and SHELBY, Dec. 2007 (15 pgs).
Digital Payment Technologies, Digital Payment Technologies and PXT Payments Forge Partnership To Bring Cities Smart Parking Meters and Merchant Loyalty Debit Cards, www.digitalpaytech.com, Apr. 27, 2010 (2 pgs).
Digital Payment Technologies, Request for Proposal #B09030—Parking Pay Stations, City of Dover, New Hampshire, Oct. 22, 2008 (part 1—110 pgs).
Digital Payment Technologies, Request for Proposal #B09030—Parking Pay Stations, City of Dover, New Hampshire, Oct. 22, 2008 (part 2—160 pgs).
Parking Pay Stations, City of Cocoa Beach, Florida, accessed May 27, 2022, web archive 2 pgs.
Digital Payment Technologies, Request for Proposal for Multi-Space Parking Meters, City of Fort Lauderdale, Jan. 13, 2010 (89 pgs).
Digital Payment Technologies, Sierra Wireless Case Study, Dec. 7, 2009(2 pgs).
Digital Payment Technologies, Technologies Launches Luke II Multi-Space Parking Pay Station, May 16, 2011 (3 pgs).
*Duncan Parking Technologies, Inc.* v. *IPS Group Inc.*, Case IPR2016-00068, Decision, Mar. 30, 2016 (13 pgs).
*Duncan Parking Technologies, Inc.* v. *IPS Group Inc.*, Case IPR2016-00070, Decision, Apr. 1, 2016 (17 pgs).
*Duncan Parking Technologies, Inc.* v. *IPS Group Inc.*, Case IPR2016-00069, Decision, Apr. 1, 2016 (13 pgs).
*Duncan Parking Technologies, Inc.* v. *IPS Group Inc.*, Case IPR2016-00067, Decision, Mar. 30, 2016 (19 pgs).
*Duncan Parking Technologies, Inc.* v. *IPS Group Inc.*, Case IPR2016-00067, Preliminary Response, Jan. 29, 2016 (38 pgs).
*Duncan Parking Technologies, Inc.* v. *IPS Group Inc.*, Case IPR2016-00068, Patent Owner's Preliminary Response, Feb. 1, 2016 (48 pgs).
*Duncan Parking Technologies, Inc.* v. *IPS Group Inc.*, Case IPR2016-00069, Patent Owner's Preliminary Response, Feb. 1, 2016 (48 pgs).
*Duncan Parking Technologies, Inc.* v. *IPS Group Inc.*, Case IPR2016-00070, Preliminary Response, Feb. 1, 2016 (49 pgs).
*Duncan Parking Technologies, Inc.* v. *IPS Group Inc.*, Case IPR2016-00067, Patent Owner's Mandatory Notices, Nov. 6, 2015 (4 pgs).
*Duncan Parking Technologies, Inc.* v. *IPS Group Inc.*, Case IPR2016-00067, Scheduling Order, Mar. 30, 2016 (9 pgs).
*Duncan Parking Technologies, Inc.* v. *IPS Group Inc.*, Case IRP2016-00067, Final Written Decision, Mar. 27, 2017 (19 pgs).
*Duncan Parking Technologies, Inc.* v. *IPS Group Inc.*, Petition for *Inter Partes* Review of U.S. Pat. No. 7,854,310, IPR2016-00067, Oct. 22, 2015 (66 pgs).
*Duncan Parking Technologies, Inc.* v. *IPS Group Inc.*, Petition for *Inter Partes* Review of U.S. Pat. No. 7,854,310, IPR2016-00068, Oct. 22, 2015 (64 pgs).
*Duncan Parking Technologies, Inc.* v. *IPS Group Inc.*, Petition for *Inter Partes* Review of U.S. Pat. No. 8,595,054, IPR2016-00069, Oct. 22, 2015 (67 pgs).

(56) References Cited

OTHER PUBLICATIONS

*Duncan Parking Technologies, Inc.* v. *IPS Group Inc.*, Petition for *Inter Partes* Review of U.S. Pat. No. 8,595,054, IPR2016-00070, Oct. 22, 2015 (61 pgs).
*Duncan Parking Technologies, Inc.* vs. *IPS Group Inc.*, Patent Owner's Preliminary Response, Case IPR2016-01144, dated Sep. 8, 2016 (58 pgs).
*Duncan Parking Technologies, Inc.* vs. *IPS Group Inc.*, Patent Owner's Preliminary Response, Case IPR2016-01145, dated Sep. 8, 2016 (52 pgs).
*Duncan Parking Technologies, Inc.* vs. *IPS Group Inc.*, Patent Owner Response, Case IPR2016-00067, dated Jul. 12, 2016 (32 pgs).
*Duncan Parking Technologies, Inc.* vs. *IPS Group Inc.*, Petition for Inter Partes Review, U.S. Pat. No. 8,595,054, dated Jun. 3, 2016 (79 pgs).
*Duncan Parking Technologies, Inc.* vs. *IPS Group Inc.*, Petition for Inter Partes Review, U.S. Pat. No. 7,854,310, dated Jun. 3, 2016 (70 pgs).
Duncan Solutions—AutoCITE brochure, 2013 (2 pgs).
Duncan Solutions—Eagle 2100 brochure, 2013 (2 pgs).
Duncan Solutions—Eagle CK brochure, 2013 (2 pgs).
Duncan Solutions—Intermec CN50 webpage, Mar. 8, 2011 (2 pgs).
Duncan Solutions—Motorola MC75 webpage, Mar. 8, 2011 (2 pgs).
Duncan Solutions—VM Pay-by-Space Multi-Space Meter brochure, 2013 (2 pgs).
Duncan Solutions "Single-Space Meters" brochure (2 pgs); Rev. Apr. 2006, 2006 Duncan Solutions, Inc.
Duncan Solutions, AutoCITE™ X3 Handheld Computer, 2013 (2 pgs).
Duncan Solutions, Duncan VS, 2006 (2 pgs).
Duncan Solutions, Pay-by-Space Parking Meters, Customer Support Manual, Jul. 2006 (part 1—113 pgs).
Duncan Solutions, Pay-by-Space Parking Meters, Customer Support Manual, Jul. 2006 (part 2—103 pgs).
Duncan Solutions/Reino, RSV3 Digital Parking Meter, Jul. 5, 2011 (2 pgs).
Duncan, Duncan VM-Solar Power meter photograph, pre-Mar. 2011 (1 pg).
Exhibit 1003—Declaration of Todd Magness in Support of Petition for Inter Partes Review of U.S. Pat. No. 7,854,310, dated Oct. 21, 2015 (70 pgs).
Exhibit 1004—Declaration of Anderson Moore in Support of Petition for Inter Partes Review of U.S. Pat. No. 8,595,054, dated Oct. 21, 2015 (19 pgs).
Exhibit 1005—U.S. Appl. No. 60/741,920, filed Dec. 2, 2005 (20 pgs).
Exhibit 1009—Tung, Y., "Design of an Advanced On-street Parking Meter," Thesis, Rochester Institute of Technology, 2001 (75 pgs).
Exhibit 1010—Christian, S.E., "Parking Meter Winding Up for Computer Age," Chicago Tribune, May 19, 1995 (6 pgs).
Exhibit 1011—Associated Press, "New parking meters based on computer," The San Diego Union, Feb. 1, 1987 (1 pg).
Exhibit 1012—Lunden, J., Good Morning America transcript, Nov. 6, 1986 (3 pgs).
Exhibit 1013—LUKE Parking Station ad (p. 28), Parking Today, vol. 10, No. 4, Apr. 2005 (64 pgs).
Exhibit 1014—Blass, E., "Changing times," Lansing State Journal, Feb. 19, 1987 (1 pg).
Exhibit 1015—Gabriele, M.C., "Electronic Parking Meters Rival Mechanical Units," American Metal Market/Metalworking News, Sep. 29, 1986 (1 pg).
Exhibit 1016—Sandler, L., "Lovely VISA, meter maid: Use credit card to park," Milwaukee Journal Sentinel, Jun. 13, 2005 (1 pg).
Exhibit 1017—Item for Finance Committee, "Capital Works Reserve Fund, Head 708—Capital Subventions and Major Systems and Equipment," FCR(Mar. 2002)18, May 24, 2002 (15 pgs).
Exhibit 1018—Anonymous, "Happy %#@! Anniversary, First Parking Meter Installed Jul. 16, 1935," The Expired Meter News, Views, Information on Driving in Chicago, Jul. 16, 2009 (10 pgs).
Exhibit 1019—Anonymous, Parking Meter Patented 72 Years Ago Today, The Expired Meter News, Views, Information on Driving in Chicago, May 24, 2010 (6 pgs).
Exhibit 1020—U.S. Pat. No. 2,118,318 to Magee, May 24, 1938 (11 pgs).
Exhibit 1032—U.S. Pat. No. 5,570,771 to Jacobs, Nov. 5, 1996 (29 pgs).
Exhibit 1034—Anonymous, "Smart Cards and Parking," TC-06001, Smart Card Alliance Transportation Council White Paper, Jan. 2006 (52 pgs).
Exhibit 1037—Catalog Entry for Exhibit 1009, Tung, Y., "Design of an advanced on-street parking meter," Oct. 18, 2015 (2 pgs).
Exhibit 1038—POM Parking Meters website, Oct. 20, 2015 (4 pgs).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pgs).
Flatley, J., "In San Francisco, hackers park for free," posted Jul. 31, 2009, www.engadget.com (1 pg).
GE Plastics, "Weatherable PC applications expand," http://www.plasticstoday.com/weatherable-pc-applications-expand/14554616432605, Sep. 26, 2016 (2 pgs).
Howland, S., "How M2M Maximizes Denver's Revenue," FieldTechnologiesOnline.com, Oct. 2011, pp. 9-12 (4 pgs).
Independent News, "Technology Breakthrough counters abuse of disabled parking", Car Parking Technologies, Dec. 7, 2011, 1 pg.
Information Disclosure Statement by Applicant filed for U.S. Appl. No. 12/355,734 on May 23, 2012 (22 pgs).
Information Disclosure Statement by Applicant filed for U.S. Appl. No. 12/355,740 on May 23, 2012 (25 pgs).
Information Disclosure Statement by Applicant filed for U.S. Appl. No. 12/875,959 on May 24, 2012 (22 pgs).
Information Disclosure Statement by Applicant filed for U.S. Appl. No. 12/875,975 on May 24, 2012 (22 pgs).
Information Disclosure Statement by Applicant filed Oct. 23, 2012 for U.S. Appl. No. 12/355,734 (4 pgs).
International Preliminary Report on Patentability issued in related application No. PCT/CA2012/000191, dated Sep. 12, 2013 (7 pgs).
International Preliminary Report on Patentability, issued for application No. PCT/US2010/047907, dated Mar. 15, 2012 (6 pgs).
International Preliminary Report on Patentability, issued for application No. PCT/US2010/047906, dated Mar. 6, 2012 (5 pgs).
International Preliminary Report on Patentability, issued for application No. PCT/IB2006/054574, dated Mar. 10, 2009 (5 pgs).
International Search Report & Written Opinion, PCT/CA12/000191, dated Jun. 20, 2012 (8 pgs).
International Search Report and Written Opinion issued in application No. PCT/CA2016/050928, dated Oct. 12, 2016 (12 pgs).
International Search Report and Written Opinion issued in application No. PCT/CA2016/050927, dated Nov. 25, 2016 (14 pgs).
International Search Report issued for PCT/US2012/048190, dated Jan. 22, 2013 (4 pgs).
International Search Report issued in application No. PCT/US2012/037229, dated Jan. 28, 2013 (6 pgs).
International Search Report issued in application No. PCT/US2012/037205, dated Oct. 4, 2012 (3 pgs).
International Search Report issued in application No. PCT/US2013/021201, dated Apr. 30, 2013 (3 pgs).
International Search Report issued in related application No. PCT/CA2007/001266, dated Apr. 21, 2008 (3 pgs).
International Search Report, PCT/CA2009/001058, dated Nov. 12, 2009 (4 pgs).
International Search Report, PCT/CA2009/001657, dated Feb. 17, 2010 (2 pgs).
International Search Report, PCT/IB06/054574, dated Oct. 27, 2008 (2 pgs).
International Search Report, PCT/US2010/047906, dated Mar. 30, 2011 (3 pgs).
International Search Report, PCT/US2010/047907, dated Apr. 26, 2011 (3 pgs).

(56) References Cited

OTHER PUBLICATIONS

Intrinsync Software International, Inc., Intrinsyc and Digital Pioneer Partner on Development of New Leading Edge Parking Terminal Solution, Aug. 14, 2003 (2 pgs).
IPS Group Inc., Exhibit 2001, Design of an advanced on-street parking meter, Jan. 12, 2016 (2 pgs).
IPS Group Inc., Exhibit 2002, About RIT Digital Media Library, Jan. 12, 2016 (1 pg).
IPS Group Inc., Exhibit 2003, The U.S. Conference of Mayors Presents 'Best-Practice' Awards, Jan. 20, 2012 (2 pgs).
IPS Group Inc., Exhibit 2004, City of Los Angeles, Card & Coin Parking Meter Lease, Nov. 29, 2010 (4 pgs).
IPS Group Inc., Exhibit 2005, City of Culver City, California, Approval of a Contract with IPS Group Inc., for the Sole-Source Purchase of 1,000 Parking Meters, Dec. 12, 2011 (3 pgs).
IPS Group Inc., Exhibit 2006, City of San Luis Obispo City Manager Report, Award of Credit Card Meters and Service Contract, RFP Specification No. 91137, Jan. 20, 2012 (5 pgs).
IPS Group Inc., Exhibit 2007, Walnut Creek, Alternate Downtown Parking Pay Technology, Oct. 20, 2011 (4 pgs).
IPS Group Inc., Exhibit 2008, How M2M Maximizes Denver's Revenue, Oct. 2011 (4 pgs).
IPS Group Inc., Exhibit 2009, Somerville, MA, T&P Introduces User-Friendly Parking Meters & Service Upgrades with Electronic Meter Pilot, Apr. 19, 2011 (2 pgs).
IPS Multi Bay Parking Meter product description, http://www.design-industry.com.au/work/multi-bay-parking-meter/, Oct. 6, 2015 (6 pgs).
IPS Single Bay Parking Meter product description, http://www.design-industry.com.au/work/ips-single-parking-meter/, Oct. 6, 2015 (6 pgs).
Kienzle, meter photograph, pre-Mar. 2011 (1 pg).
MacKay Custodian™ Multi-Space Machine Configuration Guide, 2003-2005 (184 pgs).
MAX Dual Space Meter advertisement, Jun. 25, 2015 (2 pgs).
McCullagh, D., "Hackers: We can bypass San Francisco e-parking meters," Jul. 30, 2009, http://news.cnet.com (2 pgs).
Meter Solutions, Single-Space Meters brochure, downloaded from www.duncansolutions.com website, revised Apr. 2006 (2 pgs).
Micrel, Application Note 51 Frequency Hopping Techniques, Jun. 2006, Rev. 1.0 (8 pgs).
Photo Violation Technologies—Revolutionizing the Industry by Perfecting How People Park, https://web.archive.org/web/20060813094459/http://photoviolation.com/, Aug. 13, 2006 (65 pgs).
Photo Violation Technologies—Revolutionizing the Industry by Perfecting How People Park, https://web.archive.org/web/20060823100739/http://photoviolation.com/, Aug. 23, 2006 (65 pgs).
Photo Violation Technologies—Revolutionizing the Industry by Perfecting How People Park, https://web.archive.org/web/20080222104246/http://photoviolation.com/, Feb. 22, 2008 (47 pgs).
Photo Violation Technologies—Revolutionizing the Industry by Perfecting How People Park, https://web.archive.org/web/20060110041849/http://photoviolation.com/, Jan. 10, 2006 (57 pgs).
Photo Violation Technologies—Revolutionizing the Industry by Perfecting How People Park, https://web.archive.org/web/20060715195511/http://photoviolation.com/, Jul. 15, 2006 (49 pgs).
Photo Violation Technologies—Revolutionizing the Industry by Perfecting How People Park, https://web.archive.org/web/20070628195927/http://www.photoviolation.com/, Jun. 28, 2007 (50 pgs).
Photo Violation Technologies Corp.—Products, Oct. 2, 2015 (3 pgs).
Photo Violation Technologies Corp. Press Releases, Jul. 18, 2005-Jan. 17, 2006 (9 pgs).
Photo Violation Technologies Corp., https://web.archive.org/web/20131118213440/http://photoviolationmeter.com/, Nov. 18, 2013 (8 pgs).
Photo Violation Technologies Corp., https://web.archive.org/web/20040401225217/http://photoviolationmeter.com/, Apr. 1, 2004 (50 pgs).
Photo ViolationMeter pamphlet, dated Jan. 18, 2006 (2 pgs).
POM APM photographs, dated Apr. 29, 2010 (33 pgs).
POM APM Solar Powered Meter advertisements, dated Apr. 28, 2010 (5 pgs).
Reino International, Recommended Cashbox Handling Guidelines, Version 2.0, Nov. 26, 2003 (7 pgs).
Reino Meter Advertisement, The power of a paystation, Parking Today, Aug. 2003 (1 pg).
Reino Parking Systems: On-Street Service Procedures, Jun. 29, 2004 (19 pgs).
Reino, Operator User Manual, 2003 (106 pgs).
Reino, Parking Systems RSV2 Service Manual, Version 3.1, Dec. 2003 (78 pgs).
Reino, RSV3 brochure, Nov. 10, 2007 (4 pgs).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pgs).
Request for Continued Examination (RCE) and Information Disclosure Statement by Applicant filed for U.S. Appl. No. 12/973,109 on May 31, 2012 (43 pgs).
Request for Continued Examination, dated Mar. 30, 2012 in U.S. Appl. No. 12/355,734 (32 pgs).
Request for Continued Examination, dated Sep. 27, 2011 in U.S. Appl. No. 12/059,909 (18 pgs).
Sedadi, Amir, City of Los Angels Inter-Department Correspondence, Card & Coin Meter Lease, Nov. 29, 2010 (4 pages).
Shaheen, S., "Smart Parking Management Field Test: A Bay Area Rapid Transit (BART) District Parking Demonstration," Institute of Transportation Studies, UC Davis, Jan. 1, 2005 (139 pgs).
Spp Reporter, No change for car park charge? Just RingGo, accessed May 27, 2022, https://www.northern-times.co.uk/news/no-change-for-car-park-charge-just-ringgo-140901/, 7 pgs.
Spyker, R.L., "Predicting capacitor run time for a battery/capacitor hybrid source," Power Electronic Drives and Energy Systems for Industrial Growth, 1998, abstract only (2 pgs).
StreetSmart Technology, LLC, "Technical Specifications and System Features for the StreetSmart Solution" Brochure, May 2011 (8 pgs).
Supplementary European Search Report issued in related application No. EP07784953, dated Jul. 1, 2010 (1 pg).
The Patented Photo ViolationMeter Solution book view, dated Mar. 28, 2006 (12 pgs).
The Photo ViolationMeter Case Study, Photo Violation Technologies Corp., Dec. 15, 2015 (4 pgs).
The United States Conference of Mayors Press Release, "The U.S. Conference of Mayors Presents 'Best-Practice' Awards," Jan. 20, 2012, (3 pgs).
Transcript & Screenshots of https://web.archive.org/web/20080222104246/http://www.photoviolation.com/videos/PCM.wmv, Photo Violation Technologies Corp.—"ParkCardMeter™ System," dated prior to Jun. 15, 2015 (6 pgs).
Transcript & Screenshots of https://web.archive.org/web/20080222104246/http://www.photoviolation.com/videos/HHU.wmv, Photo Violation Technologies Corp.—"Photo ViolationHandHeldUnit™," dated prior to Jun. 15, 2015 (7 pgs).
Transcript & Screenshots of https://web.archive.org/web/20080222104246/http://www.photoviolation.com/videos/PBS.wmv, Photo Violation Technologies Corp.—"The PBS Solution," dated prior to Jun. 15, 2015 (10 pgs).
Transcript & Screenshots of https://web.archive.org/web/20080222104246/http://www.photoviolation.com/videos/PVM.wmv, Photo Violation Technologies Corp.—"The PVM Solution," dated prior to Jun. 15, 2015 (17 pgs).
Design U.S. Appl. No. 29/466,268, filed Sep. 5, 2013 (19 pgs).
Design U.S. Appl. No. 29/466,267, filed Sep. 5, 2013 (19 pgs).
Design U.S. Appl. No. 29/466,269, filed Sep. 5, 2013 (19 pgs).
Design U.S. Appl. No. 29/477,176, filed Dec. 19, 2013 (24 pgs).
Design U.S. Appl. No. 29/477,195, filed Dec. 19, 2013 (21 pgs).
Design U.S. Appl. No. 29/477,196, filed Dec. 19, 2013 (21 pgs).
Design U.S. Appl. No. 29/477,339, filed Dec. 20, 2013 (21 pgs).
Design U.S. Appl. No. 29/477,402, filed Dec. 20, 2013 (24 pgs).

(56) References Cited

OTHER PUBLICATIONS

Design U.S. Appl. No. 29/477,405, filed Dec. 20, 2013 (24 pgs).
U.S. Appl. No. 15/474,773, filed Mar. 30, 2017 (68 pgs).
Video link, "ParkCardMeter™ System," https://web.archive.org/web/20080222104246/http://www.photoviolation.com/videos/PCM.wmv, Photo Violation Technologies Corp., dated prior to Jun. 15, 2015.
Video link, "Photo ViolationHandHeldUnit™," https://web.archive.org/web/20080222104246/http://www.photoviolation.com/videos/HHU.wmv, Photo Violation Technologies Corp., dated prior to Jun. 15, 2015.
Video link, "The PBS Solution," https://web.archive.org/web/20080222104246/http://www.photoviolation.com/videos/PBS.wmv, Photo Violation Technologies Corp., dated prior to Jun. 15, 2015.
Video link, "The PVM Solution," https://web.archive.org/web/20080222104246/http://www.pbotoviolation.com/videos/PVM.wmv, Photo Violation Technologies Corp., dated prior to Jun. 15, 2015.
Written Opinion issued in application No. PCT/US2012/037205, dated Oct. 4, 2012 (5 pgs).
Written Opinion issued in application No. PCT/US2012/037229, dated Jan. 28, 2013 (6 pgs).
YouTube video, "The Photo ViolationMeter TM" https://www.youtube.com/watch?v=YEFuebnwn_Y, Dec. 15, 2006 (2 pgs).
Alibaba.com, "Ticket dispenser parking management system auto payment station machine street parking meter coin parking meters" http://www.alibaba.com/product-detail/Ticket-dispenser-parking-management-system-auto_60612328565.html 12 pages, accessed Aug. 29, 2023.
IPS Group, "M5 Single-Space Meter", ipsgroup.com, 2 pages, 2022.
IPS Group, "Stereoscopic Sensors", ipsgroup.com, 2 pages, 2022.
Made-in-China.com, "Pay Station for Payment-Parking Meter with Solar, Parking Management Payment, Automatic Park Pay Station for Car Parking Management Payment" 3 pages, accessed Aug. 29, 2023.
Par-Kut International, "Pay Station Shelters", https://www.parkut.com/products/shelters/pay-station-shelters/ 3 pages, accessed Aug. 29, 2023.
Ebay Listing, Amano Mcgann MSM Metric Elite LS Solar Electric Parking Lot Credit Pay Station, description, dated 2022.
Garra et al., A Privacy-Preserving Pay-by-Phone Parking System, IEEE, 2016, 11 pages.
IPS Group, Vehicle Detection Sensors, Smart Sensors, Unparalleled Audit Management, https://ipsgroupinc.com/vehicle-detection-sensors/, May 4, 2023, 12 pages.
Klinghardt Institute, The Heart of Healing, The Klinghardt "Brain Solutions" Protocol, 2 pages, dated Sep. 2023.
Nebraska Innovation Campus, Additional Way to Pay Metered Street Parking at NIC, dated Apr. 4, 2023, 2 pages.
Dalal, Pay Phones, Parking Meters, Vending Machines, and Optimal Bayesian Decisions on Collection Times, Journal of the American Statistical Association, Feb. 2001, 28 pages.

\* cited by examiner

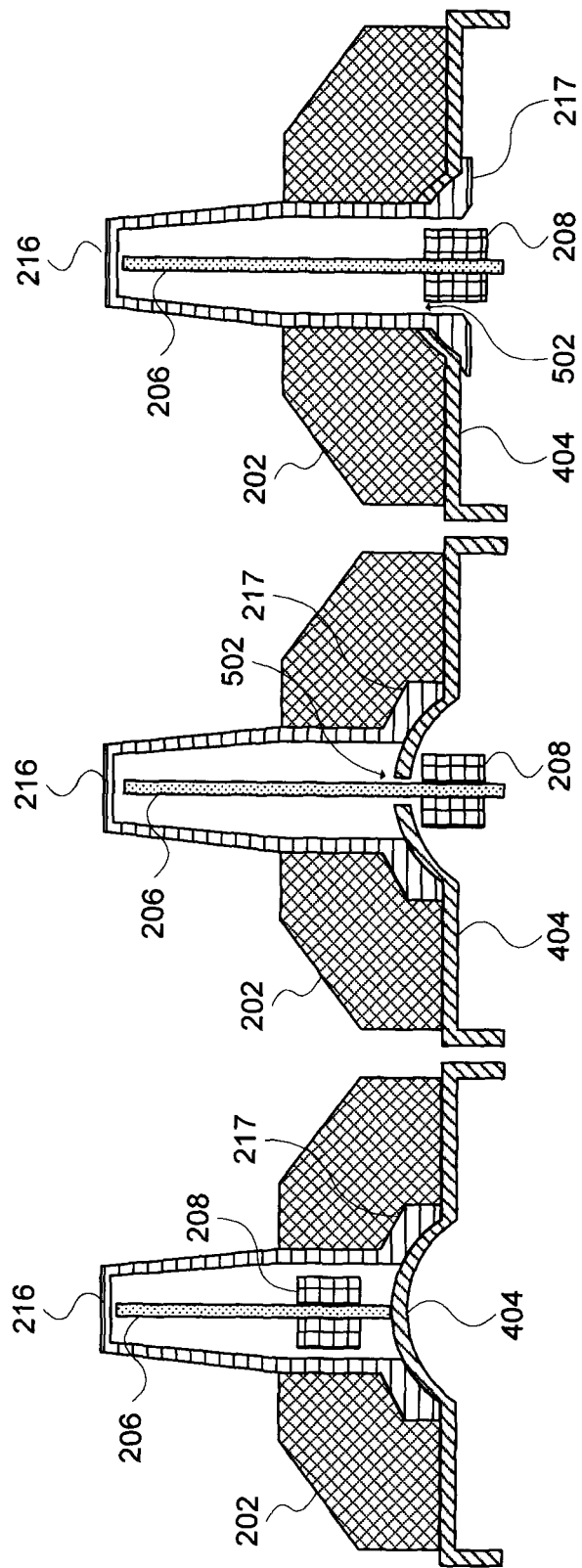

Azimuthal (x-y) plane, Phi component:

Elevation (x-z) plane, Theta component:

Azimuthal (x-y) plane, Theta (vertical) component:

Azimuthal (x-y) plane, Phi (horizontal) component (note scale change):

Elevation (x-z) plane, Theta component (note scale change)::

Elevation (x-z) plane, Phi component (non-existent):

Azimuthal (x-y) plane, Theta (vertical) component:

Azimuthal (x-y) plane, Phi (horizontal) component:

Elevation (x-z) plane, Theta component (note scale change):

Elevation (x-z) plane, Phi component:

Azimuthal (x-y) plane, Theta (vertical) component:

Azimuthal (x-y) plane, Phi (horizontal) component:

Elevation (x-z) plane, Theta component (note scale change):

Elevation (x-z) plane, Phi component:

SINGLE SPACE WIRELESS PARKING WITH IMPROVED ANTENNA PLACEMENTS

CROSS REFERENCE TO RELATED APPLICATIONS

This application is a continuation of U.S. patent application Ser. No. 17/222,694, filed Apr. 5, 2021, which in turn is a continuation of U.S. patent application Ser. No. 16/709, 531, filed Dec. 10, 2019, now U.S. Pat. No. 10,998,612, which in turn is a continuation of U.S. patent application Ser. No. 16/165,844, filed Oct. 19, 2018, now U.S. Pat. No. 10,573,953, which in turn is a continuation of U.S. patent application Ser. No. 15/348,785, filed Nov. 10, 2016, now U.S. Pat. No. 10,141,629, which in turn is a continuation of U.S. patent application Ser. No. 13/141,977, filed Jun. 23, 2011, now U.S. Pat. No. 9,494,922, which is a national entry application based on PCT Application No. PCT/CA2009/001657 having a filing date of Nov. 18, 2009, and which claims priority to U.S. Provisional Patent Application No. 61/140,543, filed Dec. 23, 2008, the contents of which are incorporated herein by reference.

FIELD OF THE INVENTION

The invention relates generally to parking meters, and in particular to single space wireless parking meters

BACKGROUND

Often, major cities deploy thousands of single-space parking meters throughout their jurisdiction. The management of such a deployment is labor intensive. Costs of overhead can be larger than necessary due to the normal inefficiencies in managing large distributed systems.

Wireless parking meters have been devised that enable the parking meter to communicate with enforcement officers to make parking enforcement more efficient, as well as to allow for payment using credit cards. The wireless parking meters may use a protocol such as ZigBee or SSIPCO for the wireless communication. The wireless systems may have disadvantages when used in single space parking meters, which may include, for example, shorter operating times due to increased power consumption, and communication latency due to the communication protocol used.

The wireless single space parking meters may include an antenna for transmitting radio frequency (RF) signals used for the wireless communication. However, the placement of the antenna has not provided efficient transmission of the RF signals, resulting in higher power consumption, lower communication range, or both.

SUMMARY

In one embodiment the current disclosure provides a parking meter comprising a mechanism housing comprising an upper mechanism housing enclosing a display module for displaying parking meter related information including an amount of parking meter time purchased; and a lower mechanism housing enclosing parking meter mechanism components for operating the parking meter. The parking meter further comprises a radio communication module coupled to at least one of the parking meter mechanism components for wirelessly communicating parking meter information and a parking meter housing enclosing at least the mechanism housing, the parking meter housing comprising: an upper housing enclosing the upper mechanism housing, the upper housing comprising an opening in the upper housing for viewing at least a portion of the display module; and a lower housing enclosing the lower mechanism housing. The parking meter further comprises an antenna coupled to the radio communication module located above the mechanism housing to transmit and receive radio frequency (RF) signals through at least a portion of the parking meter that has a high emissivity to RF signals (the transmission path).

In another embodiment the current disclosure provides a parking meter comprising a mechanism housing comprising an upper mechanism housing enclosing a display module for displaying parking meter related information including an amount of parking meter time purchased; and a lower mechanism housing enclosing parking meter mechanism components for operating the parking meter. The parking meter further comprises a radio communication module coupled to at least one of the parking meter mechanism components for wirelessly communicating parking meter information and a parking meter housing enclosing at least the mechanism housing, the parking meter housing comprising: an upper housing enclosing the upper mechanism housing, the upper housing comprising an opening in the upper housing for viewing at least a portion of the display module; and a lower housing enclosing the lower mechanism housing. The parking meter further comprises an antenna coupled to the radio communication module located above the mechanism housing to transmit and receive radio frequency (RF) signals, the antenna having a shape selected from the group consisting of a 'T' shape; an 'F' shape; and an 'L' shape.

BRIEF DESCRIPTION OF THE DRAWINGS

Embodiments of the novel technology are described herein, with reference to the drawings in which.

FIG. 5A-5C depict schematics of various embodiments of an illustrative parking meter with improved antenna placement.

DETAILED DESCRIPTION

A wireless parking meter is described herein that provides for better placement of an antenna. The location of the antenna described herein allows the antenna to transmit and receive radio frequency (RF) signals through a portion of the parking meter that has a high permittivity to the RF signals. Advantageously, the location of the antenna described herein allows for a more power efficient wireless parking meter, a larger communication range, or both. Furthermore, current parking meters may be modified to make use of the improved antenna locations described herein, reducing the cost of implementing wireless parking meters.

Figures 1A, 1B:
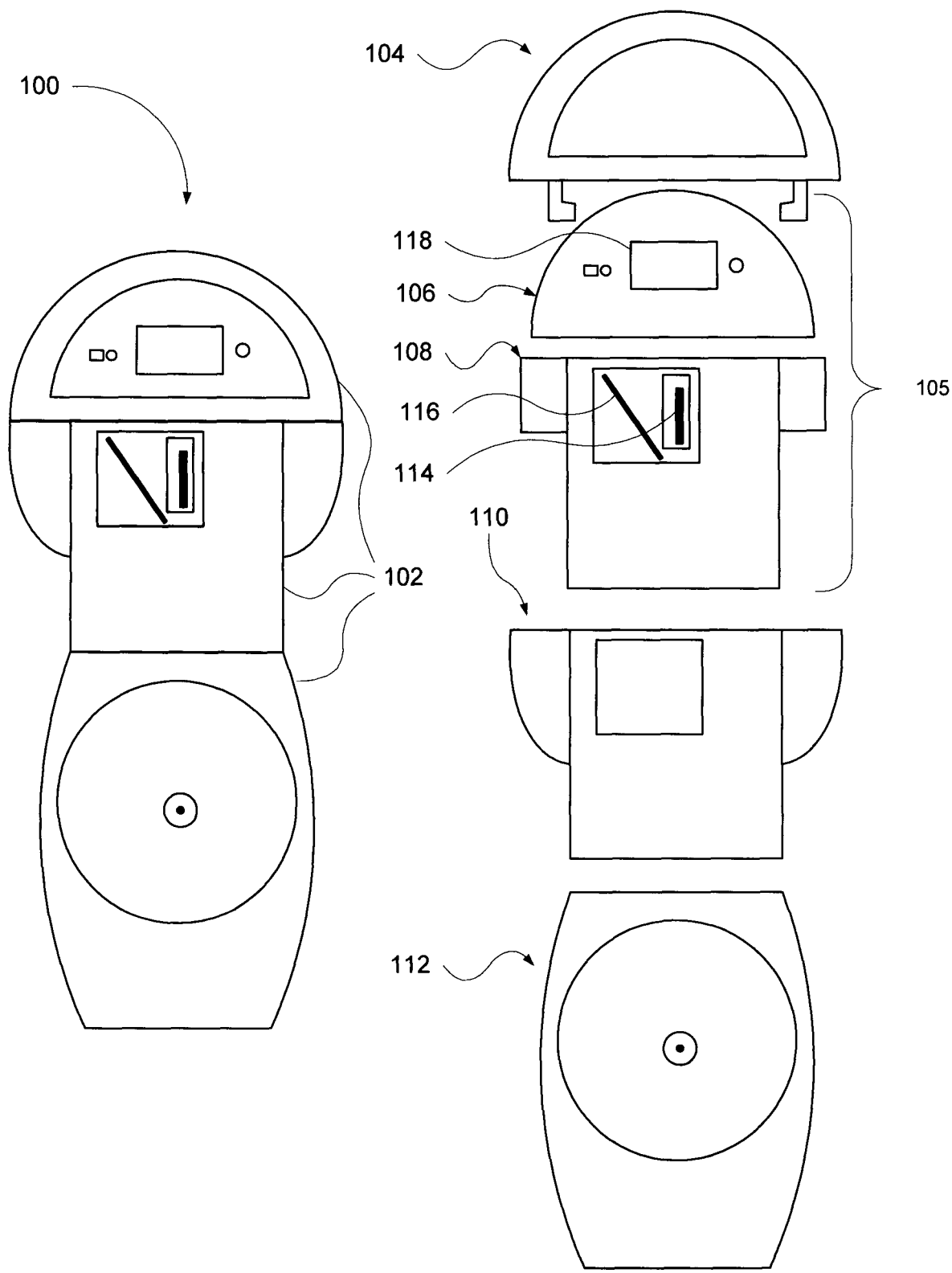
FIG. 1A depicts a schematic of a typical single space parking meter.
FIG. 1B depicts an exploded view of the single space parking meter of FIG. 1A.

FIGS. 1A and 1B depict a typical single space parking meter 100. A single space parking meter 100 typically comprises an outer housing 102, or simply a housing, comprising multiple components. The housing 102 typically comprises a two-part upper housing comprising of a removable upper housing cap 104 that is typically locked or otherwise secured to a meter housing 110 which in turn is attached to a lower vault housing 112. The upper housing cap 104 generally has a semi elliptical shape with an opening in the upper housing cap for viewing a display of the parking meter 100. It will be appreciated that the shape of the upper housing cap may be of other shapes. The upper housing cap 104 may include an opening on both sides in order to allow viewing of the display from either side of the parking meter 100. The opening in the upper housing cap is sealed by a dome situated within the housing. The dome is typically made from a high strength transparent material, such as Lexan. The meter housing 110 may include space for holding a coin vault, or alternatively may have a further lower vault housing 112 that can be secured to the meter housing 110 to hold the coin vault. The outer housing 102 provides physical protection for the components of the parking meter. The outer housing 102 also protects the components of the parking meter from the exterior environment. The outer housing 102 is typically made from a high strength metal that provides sufficient protection against intentional vandalism.

The outer housing 102 encloses a parking meter mechanism housing and various parking meter mechanism components. The parking meter mechanism housing and parking meter mechanism components may be referred to collectively as the parking meter mechanism 105. The parking meter mechanism 105 provides for the various functionality of the wireless parking meter 100. For example, the mechanism components may include a coin chute 114 for detecting coins inserted into the parking meter 100, a card reader 116 for detecting magnetic stripe, or smart-chip cards inserted into the parking meter 100, a main processing board (not shown) including a processor and memory storing instructions that, when executed by the processor, control the operation of the parking meter 100 as well as a display 118, or display module, for displaying parking meter information, such as an amount of parking time purchased, parking meter error messages, expired time, etc.

The parking meter mechanism housing generally comprises two sections, an upper mechanism housing 106 that houses the display 118 and a lower mechanism housing 108 that houses the parking meter mechanism components. It will be appreciated that while the display 118 is a component of the parking meter, it is not referred to herein as a mechanism component as it is housed above the mechanism components, such as the coin chute 114, card reader 116 and main processing board. Furthermore, while the upper mechanism housing 106 is located above the lower mechanism housing 108 it will be appreciated that this refers to the assembled mechanism 105. That is, the mechanism housing may be assembled from a back frame that includes a portion of the upper mechanism housing and the lower mechanism housing. The mechanism components and the display 118 may be attached to the back frame. A front frame may be secured over the mechanism components to provide the lower mechanism housing 108 of the assembled mechanism housing.

The parking meter outer housing 102, and the parking meter mechanism housing, present a problem when transmitting and receiving RF signals. The materials of the parking meter outer housing 102 and the mechanism housing are opaque to RF signals, or at least attenuate the transmitted RF signals. As a result the RF signals need to be transmitted with a higher power, consuming more power from a battery powering the parking meter 100. Alternatively, the same power may be used to transmit the RF signal; however, this will result in a reduced communication range and possibly require additional infrastructure to provide the wireless communication with the parking meter 100.

In order to increase the transmission efficiency of the RF signals from the parking meter 100, improved locations for the placement of the antenna are described herein. The improved wireless parking meter provides an antenna within the parking meter housing that locates the antenna such that the antenna can transmit and receive RF signals through a portion of the parking meter housing that has a high permittivity to RF signals. To further increase the transmission efficiency, improved shapes of antennas are described.

Figure 2A:
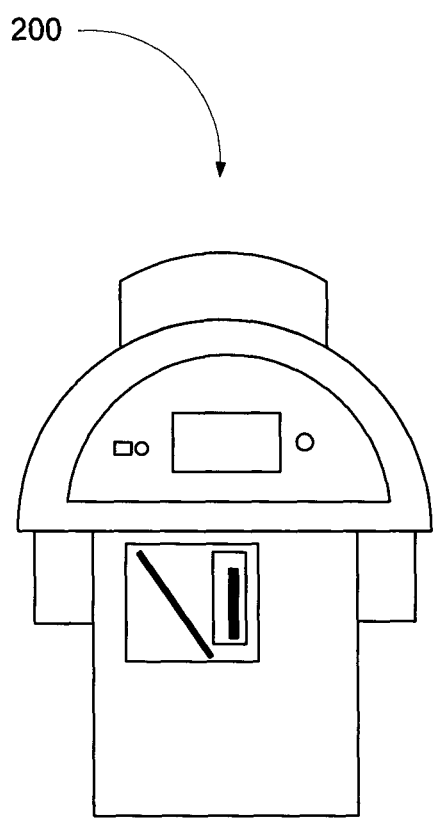
FIG. 2A depicts a schematic of an embodiment of a single space parking meter with an improved antenna placement.
Figure 2B:
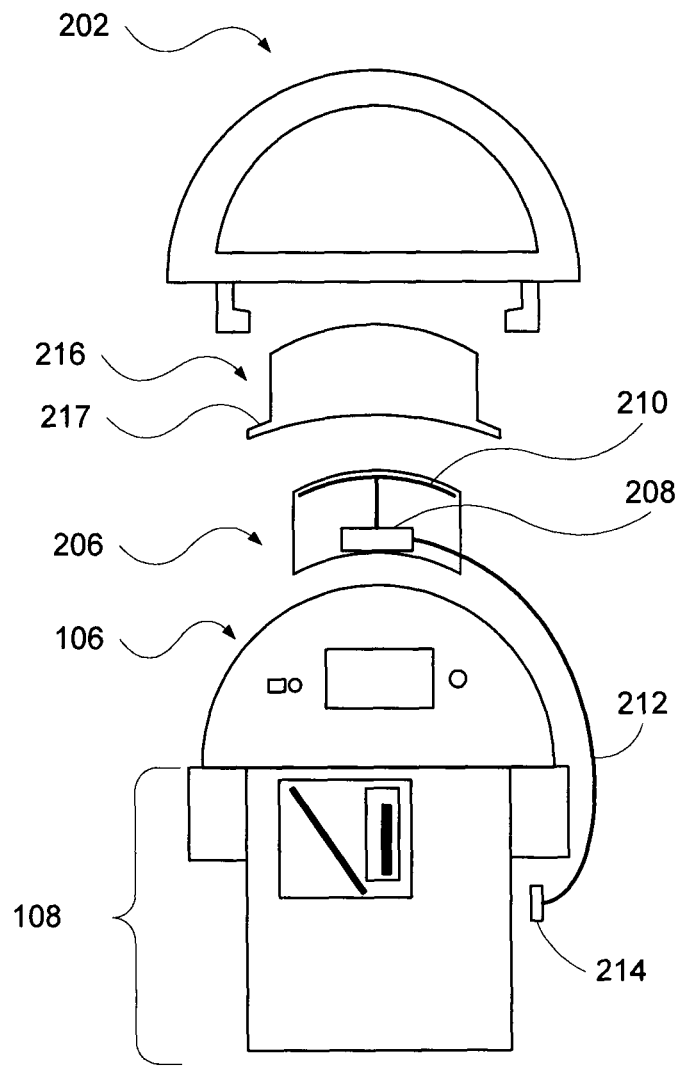
FIG. 2B depicts an exploded view of the single space parking meter of FIG. 2A.
Figure 3D:
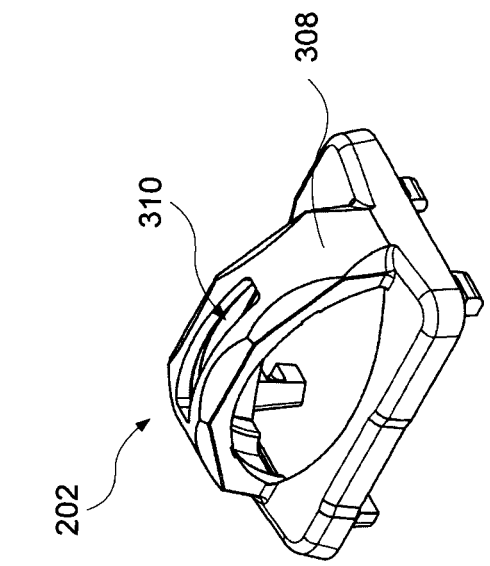
FIGS. 3A-3D depict various views of an illustrative upper housing of an illustrative parking meter.
Figure 3C:
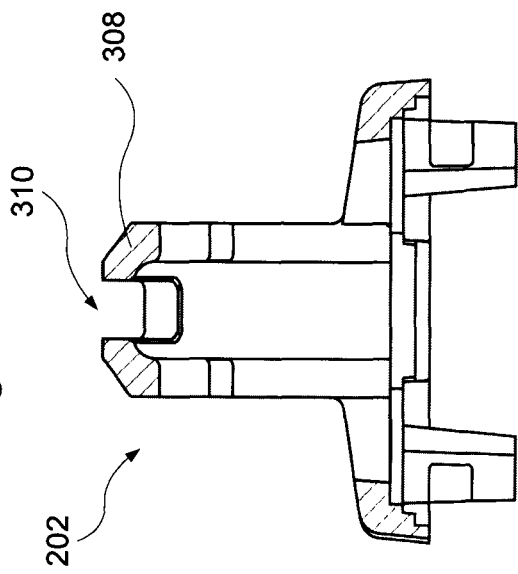
Figure 3A:
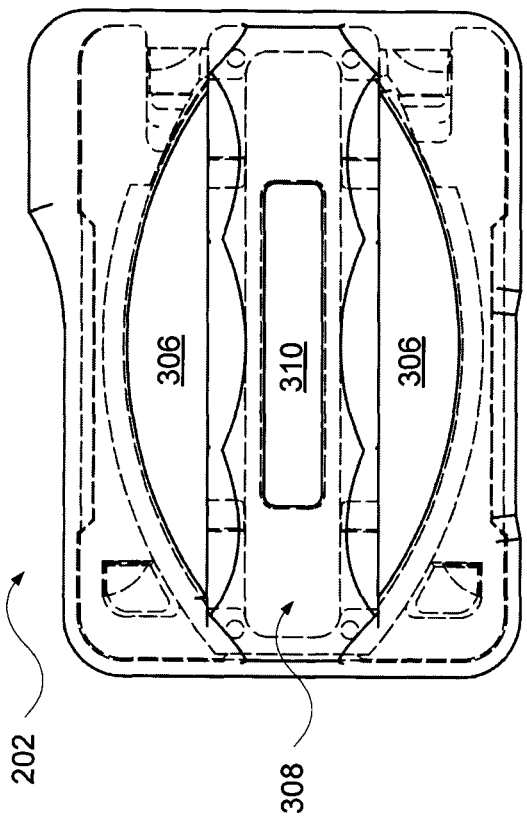
Figure 3B:
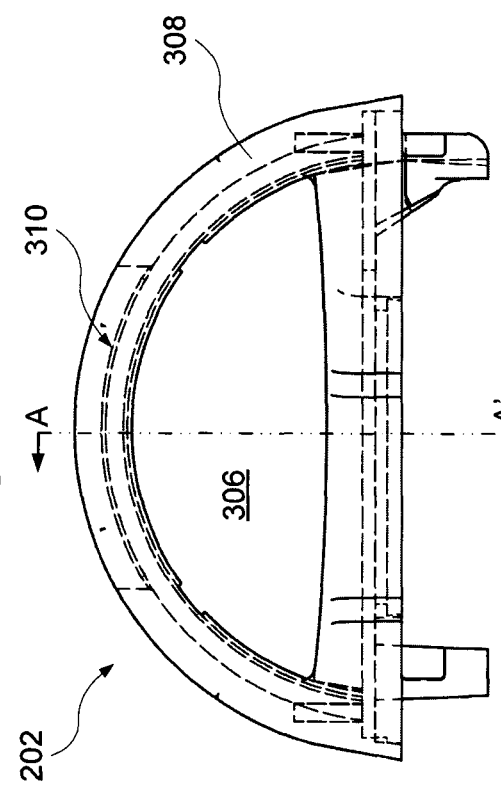

FIGS. 2A and 2B depict an illustrative embodiment of an antenna placement for a wireless parking meter 200. FIGS. 2A and 2B do not depict the lower vault housing or the meter housing of the wireless parking meter. The wireless parking meter 200 includes a fin cover 216 that protrudes through a second opening in the upper housing cap 202. The fin cover 216 encloses the antenna 210. The fin cover 216 is constructed from a material with a high permittivity to RF signals. The protruding fin cover 216 allows the antenna 210 to be located above the upper housing cap 202. As depicted in FIG. 2B the fin cover 216 may house the antenna 210 which is located on a radio board 206. The radio board 206 may include a radio control module 208 for controlling the transmission, and reception, of the RF signals. The radio control module 208 may be coupled to a parking meter mechanism component housed in the lower mechanism housing 108, such as the main control board, via an appropriate cable 212 with an appropriate connector 214. It will be appreciated that while the radio control module 208 is depicted as being located on the radio board 206, it may be located within the parking meter mechanism housing, or other convenient locations. If the radio control module 208 is not located on the radio board, the cable 212 and connector 214 may be used to connect the antenna to the radio control module 208. Additionally, it will be appreciated that, while the radio control module 208 has been described as being a separate component, it may be included as a component of the main control board or other parking meter mechanism components.

As described above, the fin cover 216 protrudes upwardly through a second opening in the upper housing cap 202. The second opening, or fin opening, is sized to allow a portion of the fin cover 216 to pass through. However a base portion 217 of the fin cover is enlarged so that it does not pass through the fin opening of the upper housing cap 202. This base portion 217 of the fin cover may also seal the fin opening in the upper housing. It will be appreciated that other means of securing the fin cover 216 to the upper housing cap 202 are possible, and will be apparent to those skilled in the art.

The fin cover 216 allows the antenna 210 to be located above the upper housing cap 202 of the parking meter 200. The fin cover 216 is constructed from a material with a higher permittivity to RF signals than the housings of the parking meter. As such, the fin cover 216 provides an improved antenna placement in which the antenna 210 can transmit and receive RF signals through a portion of the parking meter 200 that has a high permittivity to RF signals.

FIGS. 3A-3D depict various views of an illustrative embodiment of an upper housing for a parking meter 200. The upper housing cap 202 may be modified from an upper housing cap as used in previous parking meter housings. The upper housing cap 202 includes first openings 306, which may be referred to as dome openings. The dome openings 306 provide an opening through which the parking meter display may be viewed. If the display of the parking meter 200 is a dual sided display, dome openings 306 may be provided on each side of the upper housing cap 202. The upper housing cap 202 includes a central portion 308 located between the two dome openings; or alternatively located about a center of the upper housing cap 202 if only a single dome opening 306 is provided. The central portion 308 of the parking meter housing cap generally has a semi elliptical, or an actuate, shape. A second opening, or fin opening 310, is provided in the upper housing cap 202. As depicted in the Figures, the fin opening 310 is located centrally in the central portion 308 of the upper housing cap 202. It will be appreciated that the fin opening 310 is located centrally within the central portion 308 of the upper housing cap 202 for aesthetic reasons, and for the simplicity of forming the opening within the central portion 308. The fin opening 310 may be located at any suitable location of the upper housing cap 202 that allows the fin cover 216, and so the antenna housed within, to protrude away from the upper housing cap 202. Additionally, although the fin opening 310 has been described as being positioned within the upper housing cap 202, it is possible to locate the fin opening 310, and the fin cover 216, within any portion of the parking meter outer housing, for example within the meter housing. It will be appreciated that positioning the fin opening 310 within the upper housing cap 202 has the advantage of being relatively easy to replace if required. If the fin opening 310 is located within the meter housing, the upper housing cap 202 would be required to be removed, as well as possibly the parking meter mechanism housing in order to replace or service the fin cover 216 located within the fin opening 310. Removing the parking meter mechanism housing may require further disassembly of the parking meter 200 than would be required if simply placing the fin opening 310 in the upper housing cap 202.

Figure 4A:
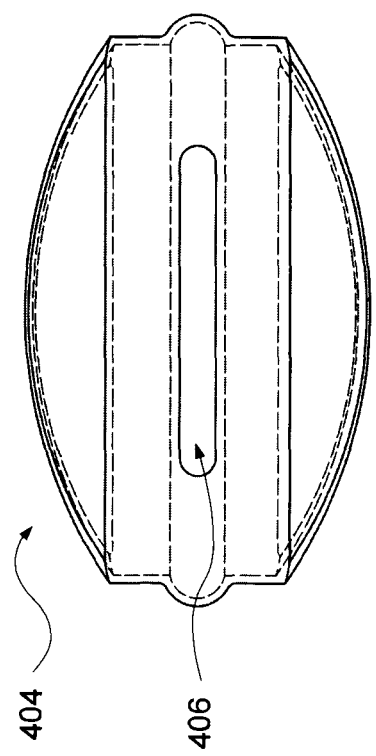
FIG. 4A-4C depict various views of an illustrative dome covering of an illustrative parking meter.
Figure 4B:
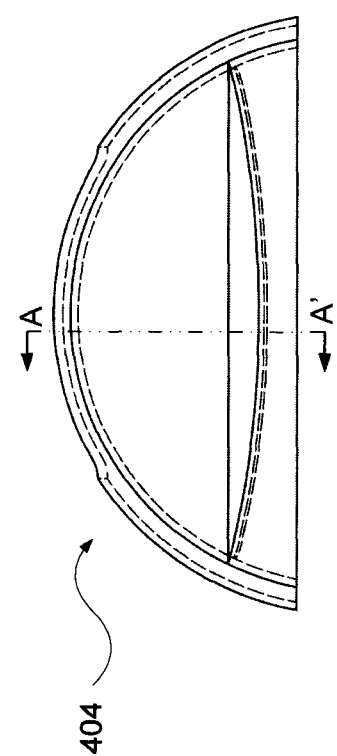
Figure 4C:
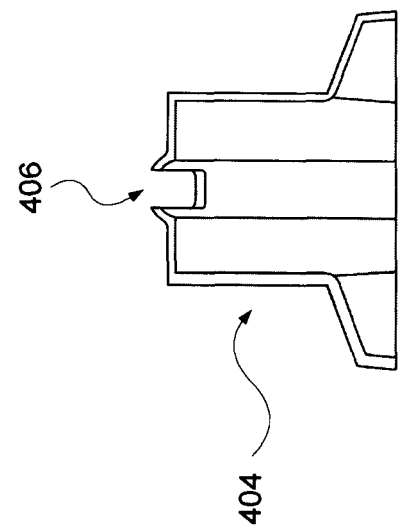

FIGS. 4A-4C depict various views of an illustrative dome cover 404. The dome cover 404 may be used with the upper housing cap 202 of FIGS. 3A-3D. The dome cover 404 includes a radio board opening 406 that is located to correspond with the fin opening 310 of the upper housing cap 202 of FIGS. 3A-3D. The radio board opening 406 of the dome cover 404 allows the radio board 206 to be situated above the dome cover 404 while having a portion of the radio board 206 pass through the dome cover 404. The radio board opening 406 may register the radio board 206 within the parking meter housing in order to securely position the radio board 206 within the fin cover. The size of the radio board opening 406 may vary. The radio board opening 406 may be sized to accommodate the radio control module 208 located on the radio board 206. Alternatively, the radio board opening 406 may be sized to accommodate only the board portion of the radio board 206, while the radio control module 208, if present, is situated above or below the dome cover 404. Alternatively, the dome cover 404 may not have a radio board opening 406 at all, and the radio board 206 may be wholly located above the dome cover 404.

If the dome cover 404 includes a radio board opening 406, it may be used to route the connection cable 212 from the radio board 206 to the appropriate location of the parking meter mechanism. If the radio board opening 406 is not present, the cable 212 may be routed along the dome cover 404 to a position where the dome cover 404 meets the parking meter housing and then routed to the appropriate connection location on the parking meter mechanism.

FIGS. 5A-5C depict various arrangements of the radio board 206 and fin cover 216 within the upper housing cap 202 and dome cover 404. FIG. 5A depicts a dome cover 404 that does not include a radio board opening. The radio board 206, which may include a radio control module 208, is wholly located above the dome cover 404. The fin cover 216 is located between the dome cover 404 and the upper housing cap 202. A main portion of the fin cover 216 protrudes through the fin opening in the upper housing cap 202. A base portion of the fin cover 216 extends past the fin opening in the upper housing cap 202 and captures the fin cover 216 between the dome cover 404 and the upper housing cap 202, helping to ensure that the fin cover 216 is not easily removed through the fin opening of the upper housing cap 202.

FIG. 5B depicts an alternative embodiment of the arrangement of the radio board 206 and fin cover 216 within the upper housing cap 202 and dome cover 404. The dome cover 404 of FIG. 5B includes a radio board opening 502 that is sized to allow the radio board 206 to pass through but not a radio control module 208, if present. The fin cover 216 is located between the dome cover 404 and the upper housing cap 202 in a similar manner as in the embodiment of FIG. 5A. If the radio control module 208 is present on the radio board 206, it may be located above or below the dome cover 404. If it is located above the dome cover 404, a bottom surface of the radio control module 208 may rest on an upper surface of the dome cover 404, and position the radio board 206 within the fin cover 216. If the radio control module 208 is positioned below the dome cover 404, it may be held between the upper mechanism housing (not shown) and the dome cover 404.

FIG. 5C depicts a further alternative embodiment of the arrangement of the radio board 206 and fin cover 216 within the upper housing cap 202 and dome cover 404. The radio board opening 502 in the dome cover 404 is expanded to allow the main portion of the fin cover 216 to pass through. The base portion of the fin cover 216 is captured by the dome cover 404, preventing the fin cover 216 from passing through the radio board opening 502. The fin cover 216 and the radio board 206, is held in position between the upper mechanism housing and the dome cover 404.

The radio board 206 may be further held in position within the fin cover 216, of any of the described embodiments, by a radio board clip or other suitable means. Although not required to locate the radio board 206 within the fin cover 216, the radio board clip may hold the radio board 206 within the fin cover 216, which may facilitate assembly or disassembly of the parking meter.

As is apparent from the above description of various embodiments, the antenna 210, and possibly the radio control module 208, is housed at the top of the parking meter within the fin cover 216. The fin cover 216 provides the required physical strength to prevent, or reduce, the likelihood that the antenna 210 can be broken off from the parking meter.

The fin cover 216 is constructed from a material with a high permittivity to RF signals and in particular to the RF signals used by the radio control module 208 of the parking meter. The fin cover 216 may be made from a plastic or similar material. The following table provides a listing of possible suitable materials for the fin cover 216, as well as their RF characteristics.

TABLE 1

Table showing RF properties of various materials

| Product & Grade | Color | Dielectric Constant (Dk) (Relative Permittivity) | | | Loss Tangent (Df) (Dissipation Factor) | | |
|---|---|---|---|---|---|---|---|
| | | 1.2 GHz | 2.4 GHz | 10 GHz | 1.2 GHz | 2.4 GHz | 10 GHz |
| HB Rated | | | | | | | |
| CYCOLOY ® C1000HF | natural | 2.72 | 2.71 | | 0.0045 | 0.0045 | |
| CYCOLOY ® C1200HF | natural | 2.72 | 2.75 | | 0.0046 | 0.0046 | |
| GELOY ® CR7520 | unknown | 2.98 | 2.97 | 2.87 | 0.0212 | 0.0186 | 0.0148 |
| LEXAN ® 121R | natural | 2.76 | 2.80 | | 0.0047 | 0.0047 | |
| LEXAN ® EXL1414 | unknown | 2.83 | 2.86 | | 0.0062 | 0.0056 | |
| LEXAN ® EXL1414 (dry) | unknown | 2.81 | 2.85 | | 0.0060 | 0.0052 | |
| XENOY ® 5731 | unknown | 2.88 | 2.93 | 2.85 | 0.0082 | 0.0069 | 0.0057 |
| ® X7110 | natural | | 2.83 | | | 0.0121 | |
| XYLEX ® X8210 | NA9A004 | | 2.84 | | | 0.0141 | |
| V-2 Rated | | | | | | | |
| XYLEX ® X7200 | NA9A008 | | 2.87 | | | 0.0134 | |
| V-1 Rated | | | | | | | |
| NORYL ® EN265 | unknown | 2.71 | 2.69 | 2.65 | 0.0029 | 0.0030 | 0.0029 |
| V-0 Rated | | | | | | | |
| ULTEM ® 1000 | unknown | 3.05 | 3.09 | 3.05 | 0.0025 | 0.0031 | 0.0047 |
| CYCOLOY ® C6200 | Natural | | 2.87 | | | 0.0134 | |
| V-0 Rated, UV Stabilized | | | | | | | |
| LEXAN ® 923A | unknown | 2.81 | 2.82 | 2.76 | 0.0058 | 0.0052 | 0.0050 |
| VALOX ® 357U | unknown | 2.92 | 2.91 | 2.86 | 0.0122 | 0.0103 | 0.0084 |
| VALOX ® 364 | unknown | 2.88 | 2.93 | 2.85 | 0.0079 | 0.0074 | 0.0061 |

The fin cover 216 may house the radio control module 208 and the antenna 210. The antenna 210 may be formed on the radio board 206. Although the arrangement of the antenna 210 within the parking meter 200 as described above allows RF signals to be transmitted, and received, through a portion of the parking meter 200 with a high permittivity to RF signals and so provides a more efficient wireless parking meter 200, further efficiency may be gained by the type, or shape, of antenna 210 used.

FIGS. 6A-6D depict various shapes of antennas 210A-D that can be used within wireless parking meters. The antennas 210A-D may be formed on the radio board by a metal trace or other techniques known to one skilled in the art. FIGS. 6A-6D also depict the characteristics of connection to the antennas 210A-D that may provide improved impedance matching between the antenna and the RF signal source. It will be appreciated that the characteristics of the connection, including components connected to the antenna and their values may vary depending upon the specific characteristics of the antenna used. One skilled in the art will appreciate that the values of components may be readily determined through experimentation, simulation, or through theoretical calculations.

Figure 6A:
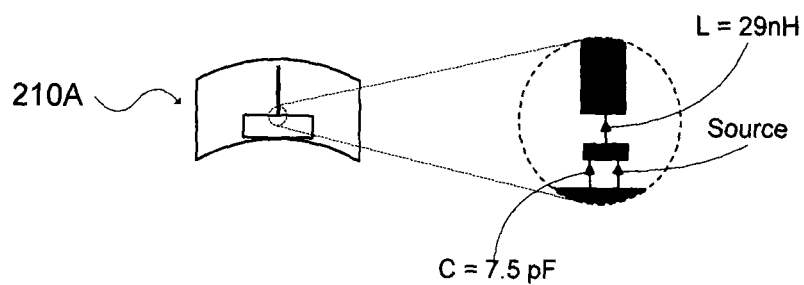
FIGS. 6A-6D depict schematics of illustrative antenna configurations.
Figure 6B:
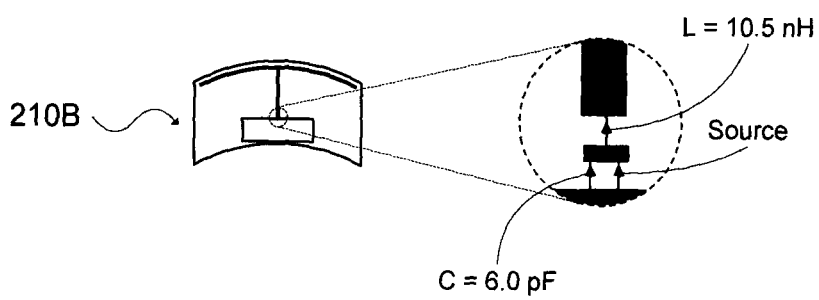
Figure 6C:
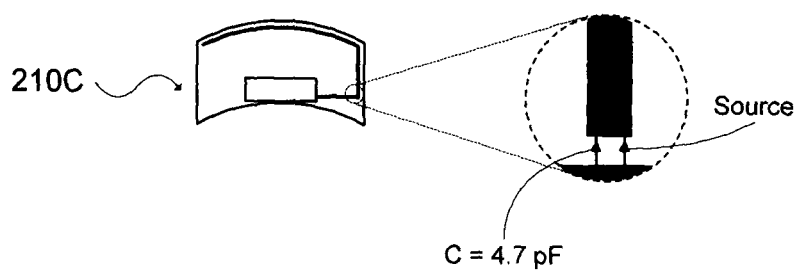
Figure 6D:
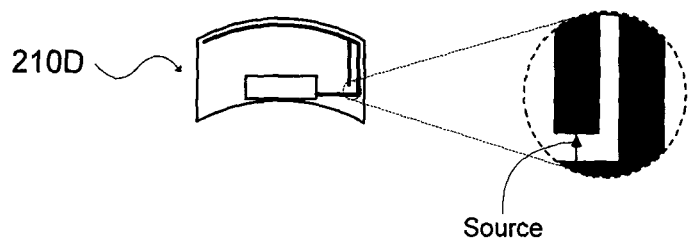

FIG. 6A depicts a monopole antenna 210A. The monopole antenna 210A is coupled to the source through an inductor with a value of 29 nH. A 7.5 pF capacitor is connected in parallel with the source. FIG. 6B depicts a T antenna 210B. A base of the T is coupled to the RF source through a 10.5 nH inductor. A 6.0 pF capacitor is connected in parallel with the source. FIG. 6C depicts an L antenna 210C. A short leg of the antenna 210C is connected to the source with a 4.7 pF capacitor connected in parallel. FIG. 6D depicts an F antenna 210D. A short arm of the F is coupled to the source. No additional capacitors or inductors are required for impedance matching in the arrangement of FIG. 6D. Various specific antenna arrangements have been described with reference to FIGS. 6A-6D. It will be appreciated that these antenna shapes are merely illustrative, and other antennas may be used in a wireless parking meter in accordance with the present disclosure.

Figure 7A:
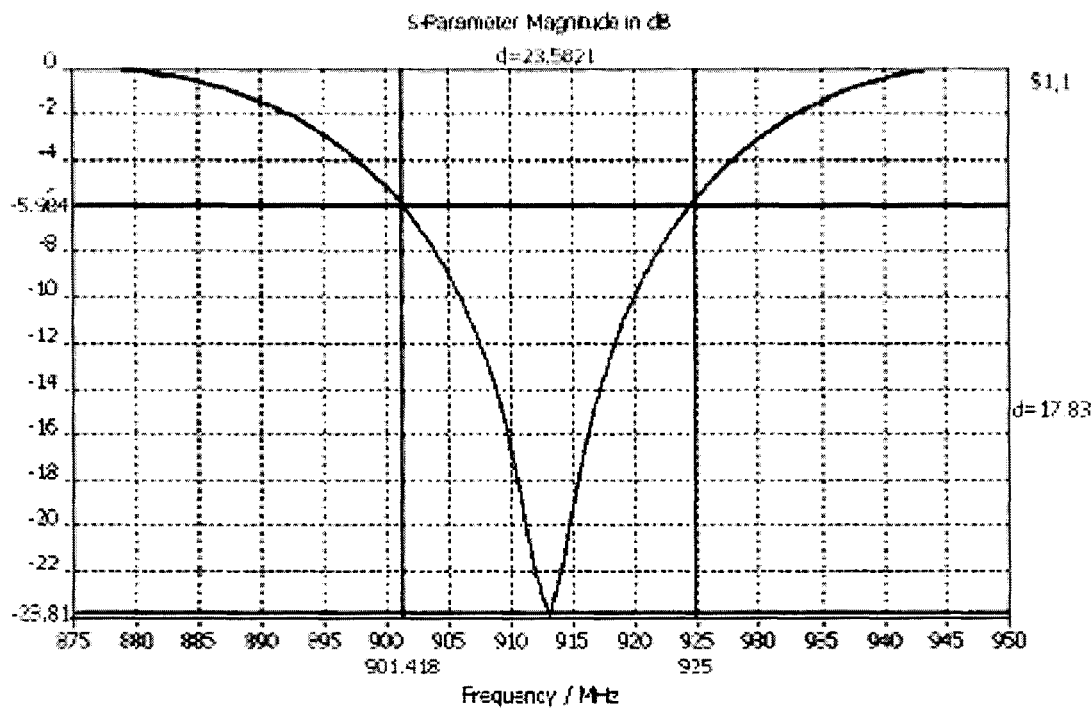
FIGS. 7A-7E depict results of radiation pattern simulations of a monopole antenna.
Figure 7B:
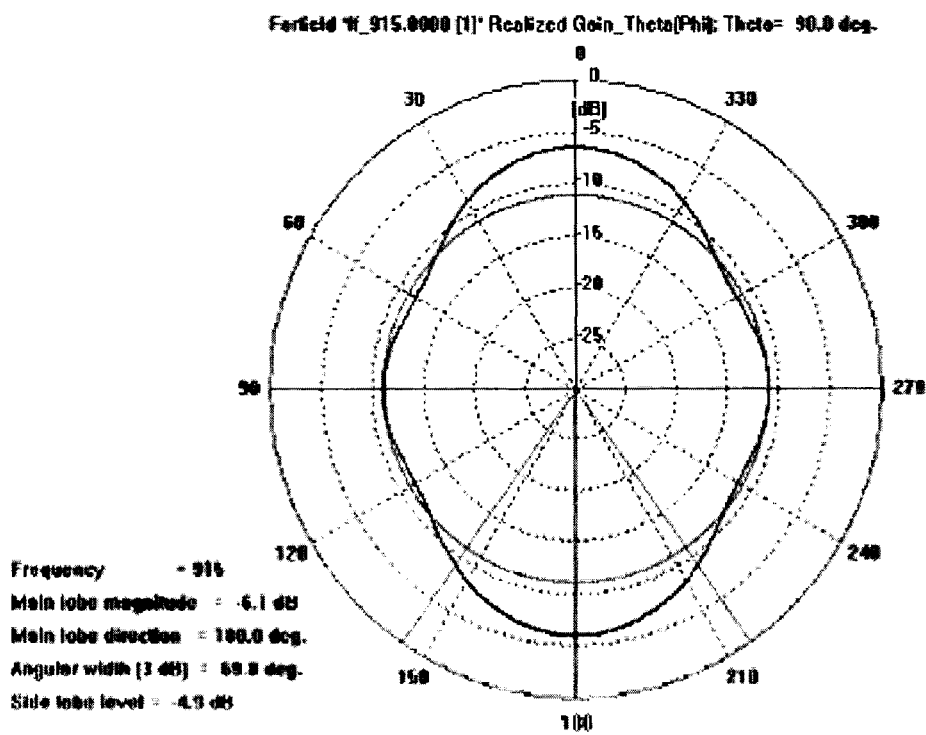
Figure 7C:
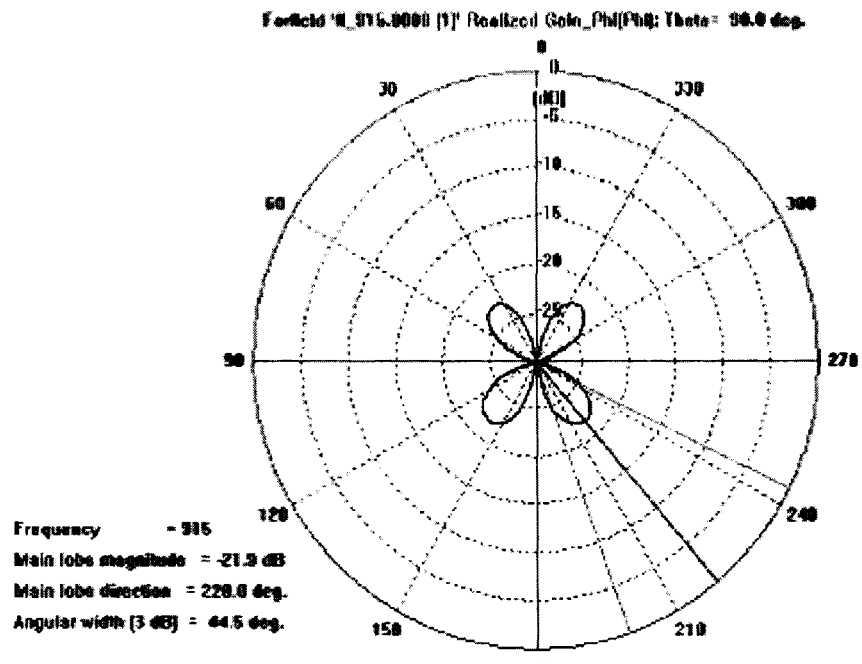
Figure 7D:
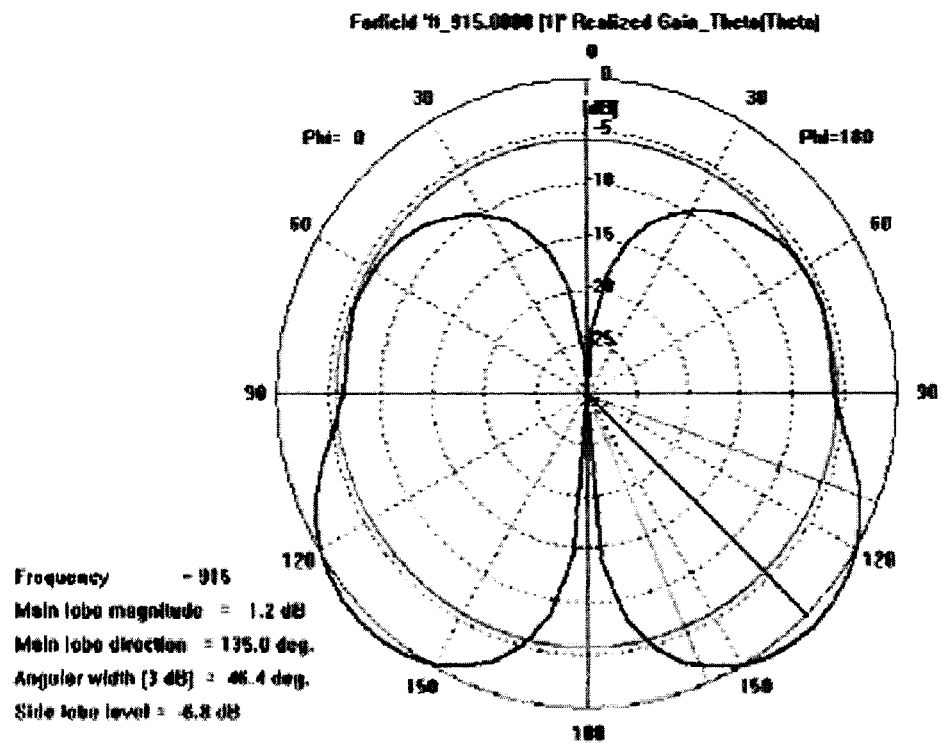
Figure 7E:
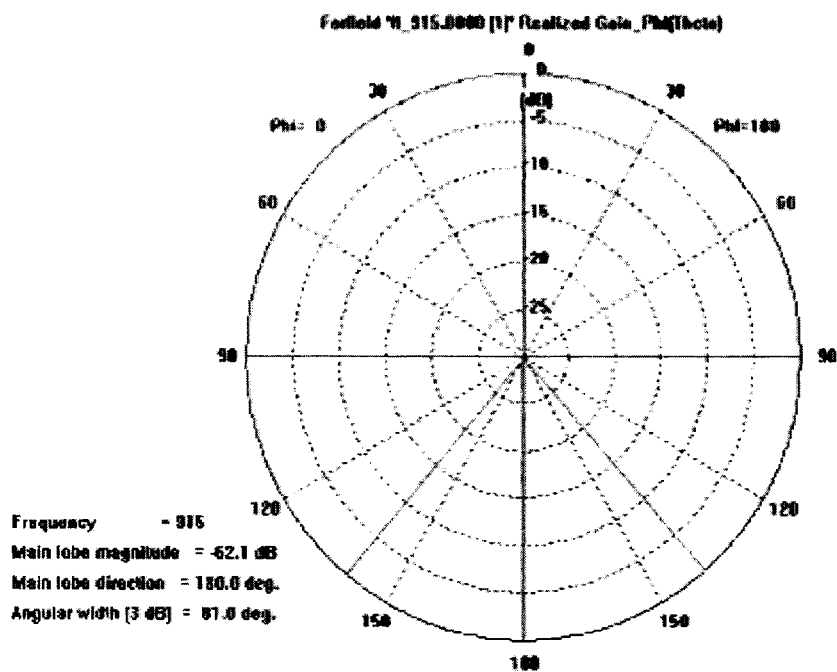

FIGS. 7A-7E depict characteristics of the monopole antenna 210A of FIG. 6A. The characteristics were determined through a simulation of the antenna located above the upper housing of a parking meter housing. FIG. 7A depicts the impedance matching characteristics of the monopole antenna 210A. FIGS. 7B-7E depict the transmission characteristics of the simulated monopole antenna 210A along different planes.

Figure 8A:
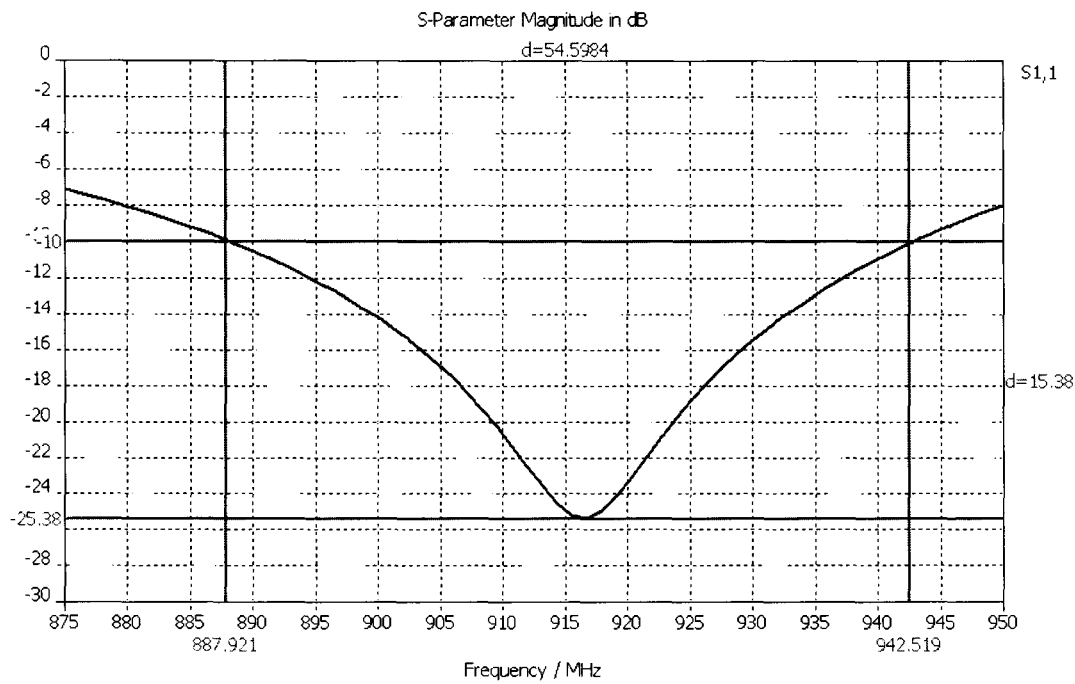
FIGS. 8A-8E depict results of radiation pattern simulations of a T antenna.
Figure 8B:
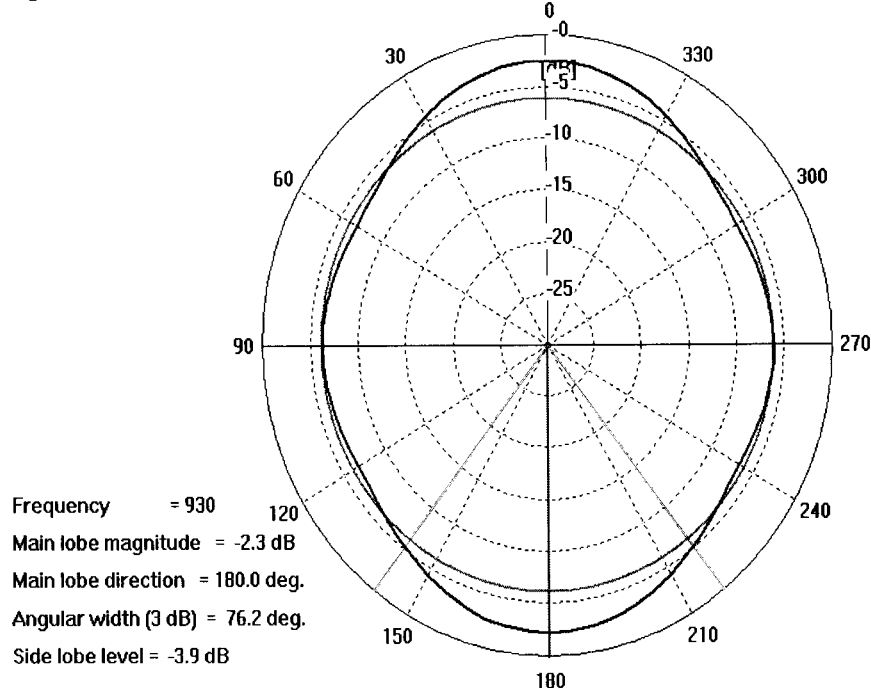
Figure 8C:
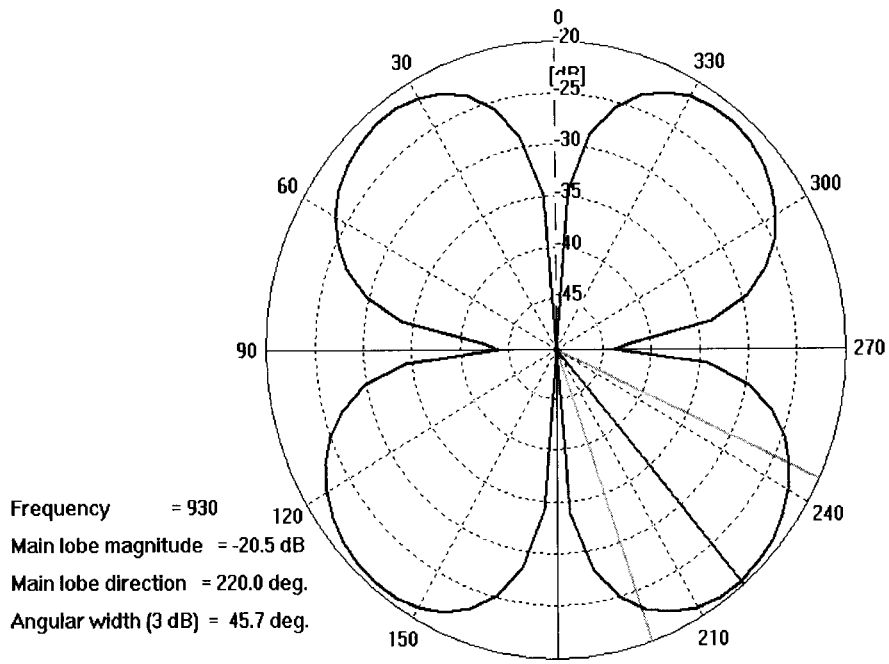
Figure 8D:
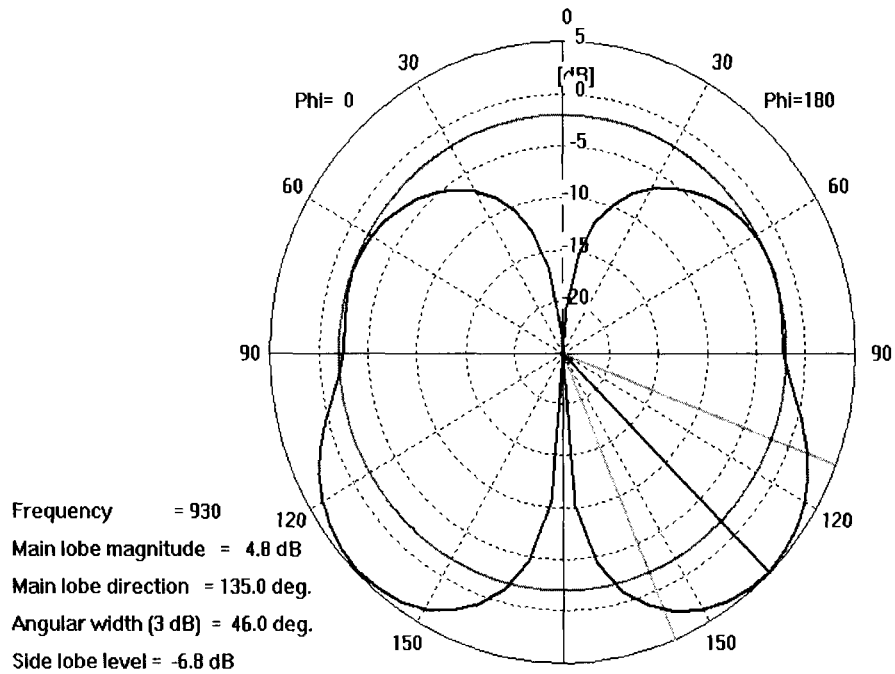
Figure 8E:
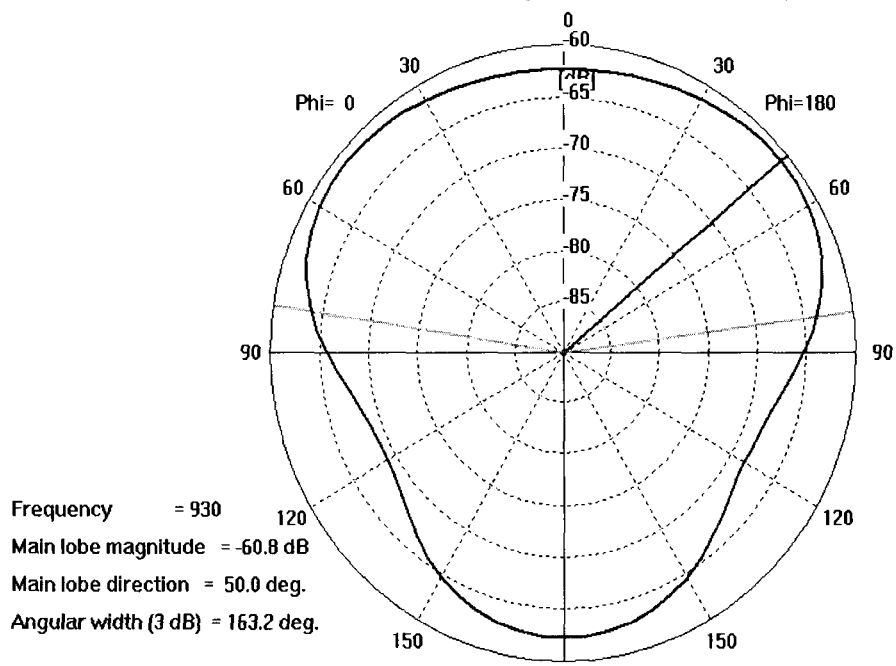

FIGS. 8A-8E depict characteristics of the T antenna 210B of FIG. 6B. The characteristics were determined through a simulation of the antenna located above the upper housing of a parking meter housing. FIG. 8A depicts the impedance matching characteristics of the T antenna 210B. FIGS. 8B-8E depict the transmission characteristics of the simulated antenna along different planes.

Figure 9A:
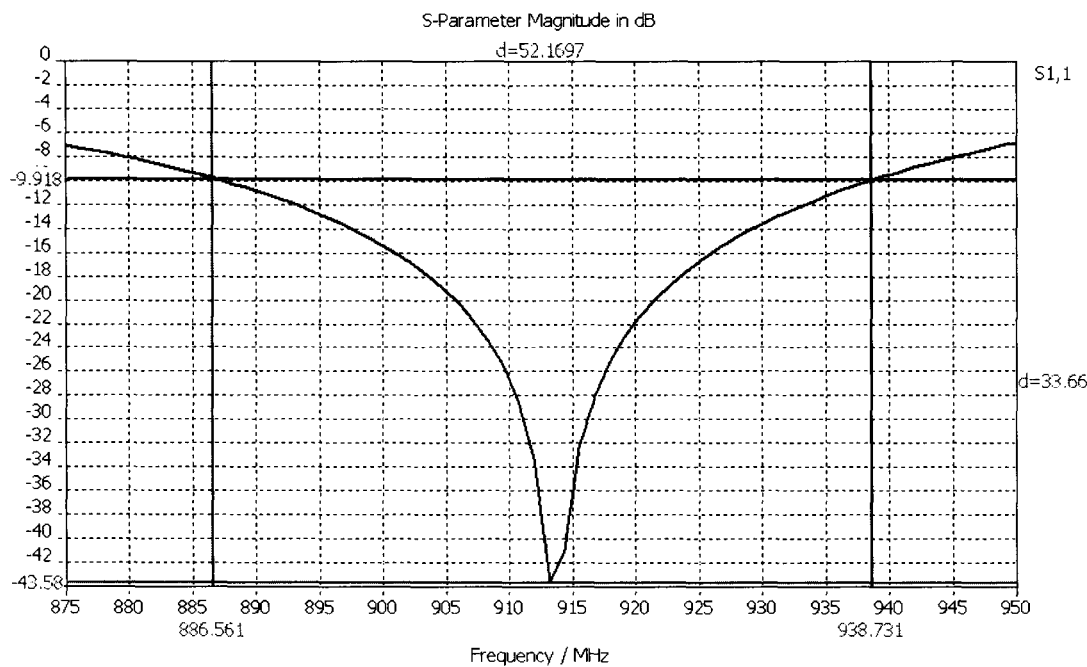
FIGS. 9A-9E depict results of radiation pattern simulations of an L antenna.
Figure 9B:
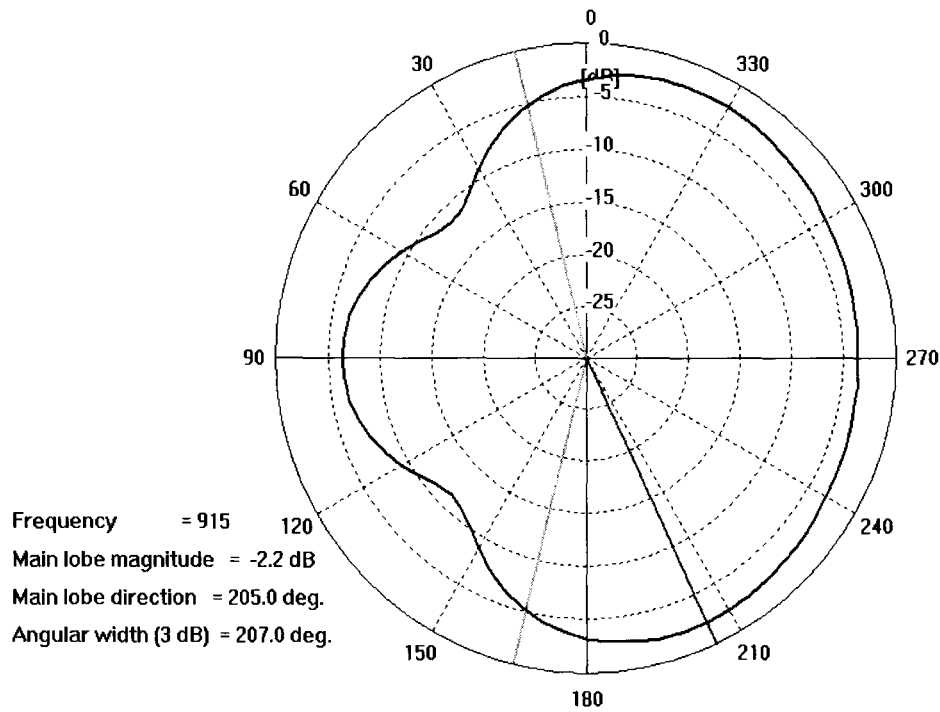
Figure 9C:
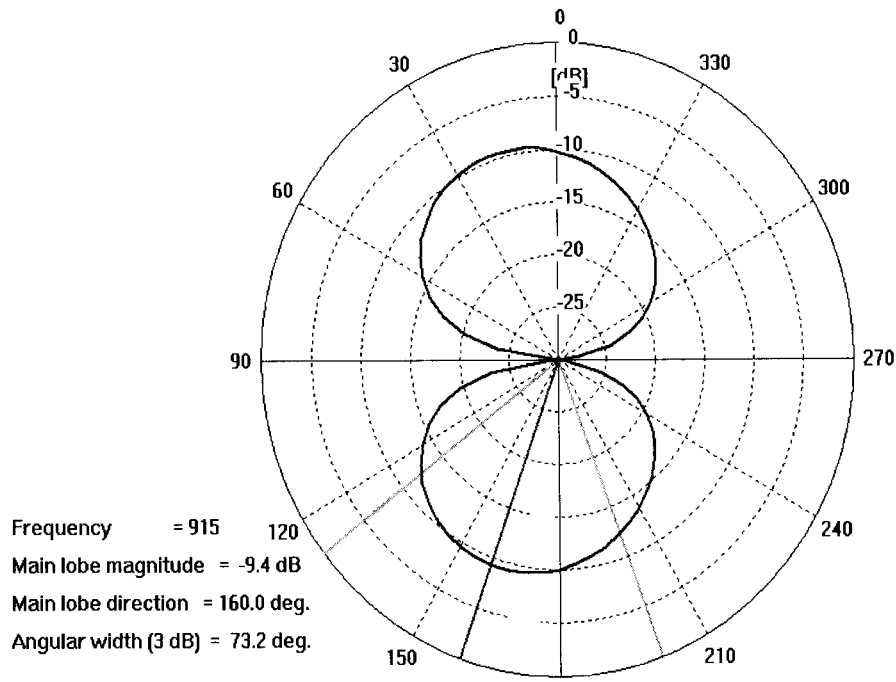
Figure 9D:
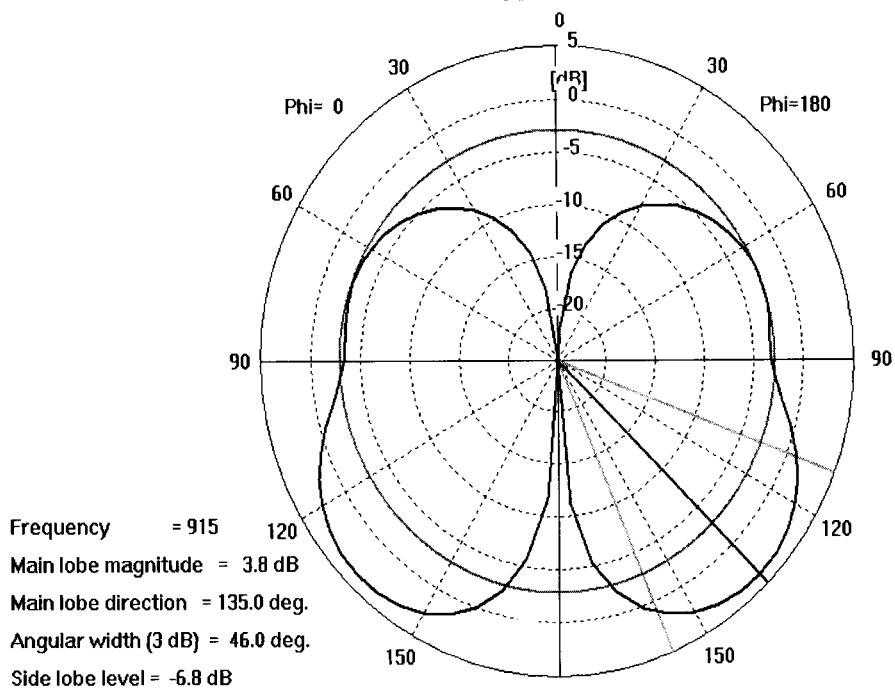
Figure 9E:
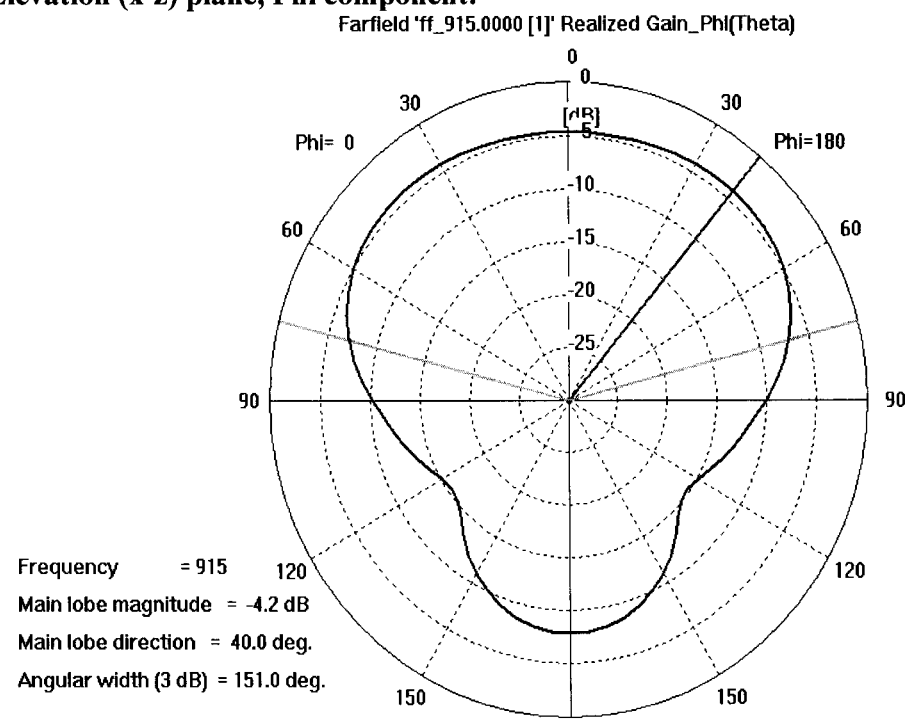

FIGS. 9A-9E depict characteristics of the L antenna 210C of FIG. 6C. The characteristics were determined through a simulation of the antenna located above the upper housing of a parking meter housing. FIG. 9A depicts the impedance matching characteristics of the L antenna 210C. FIGS.

9B-9E depict the transmission characteristics of the simulated antenna along different planes.

Figure 10A:
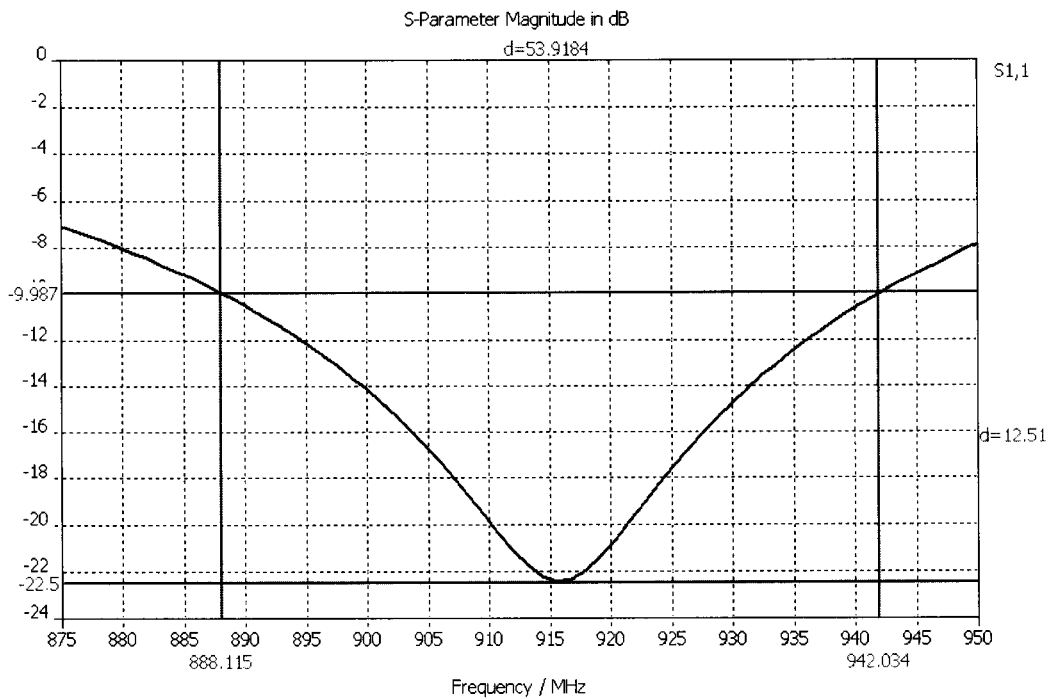
FIGS. 10A-10E depict results of radiation pattern simulations of an F antenna.
Figure 10B:
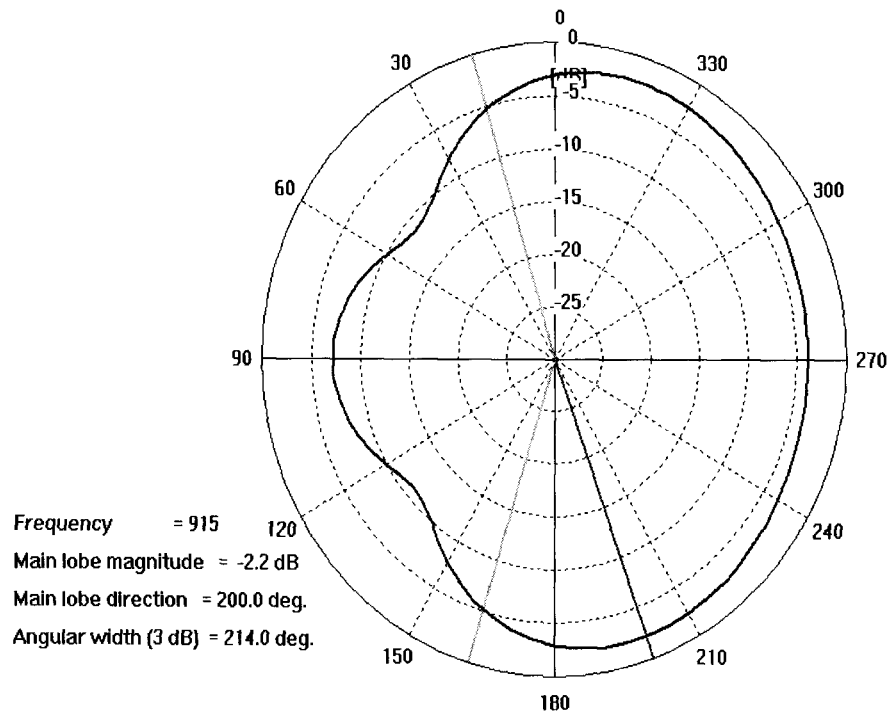
Figure 10C:
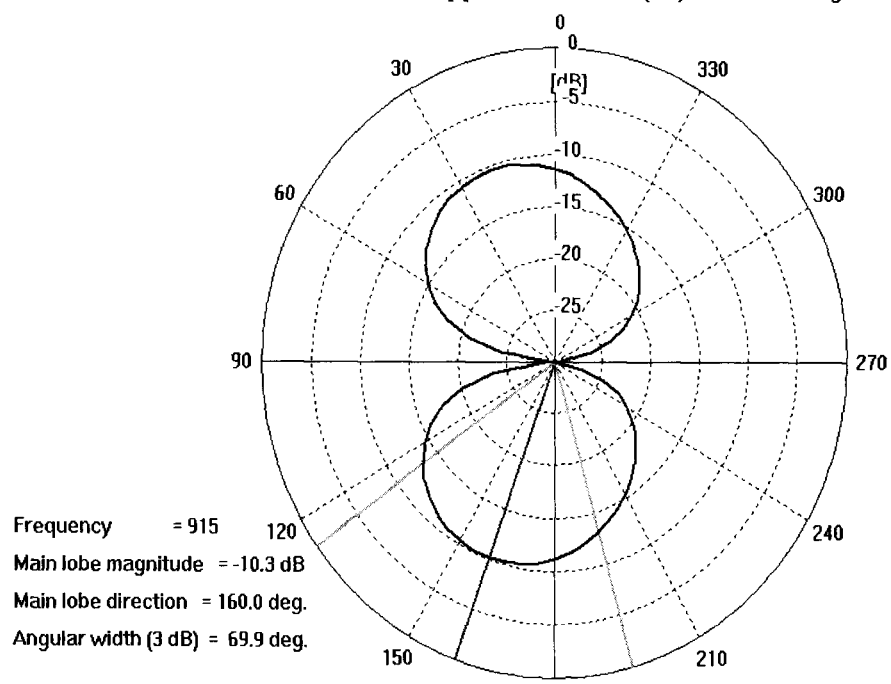
Figure 10D:
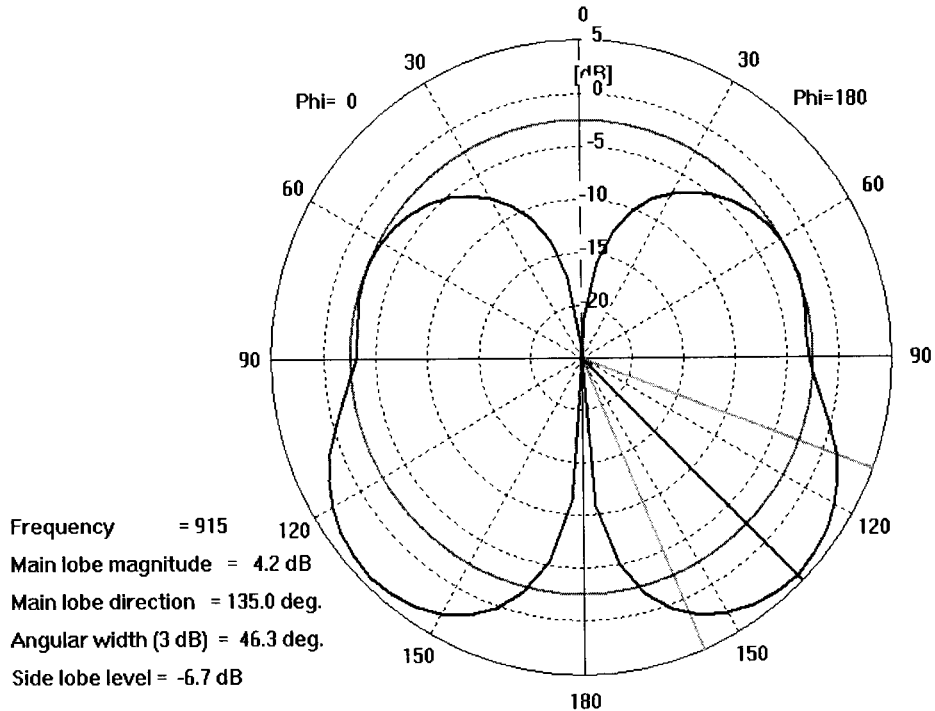
Figure 10E:
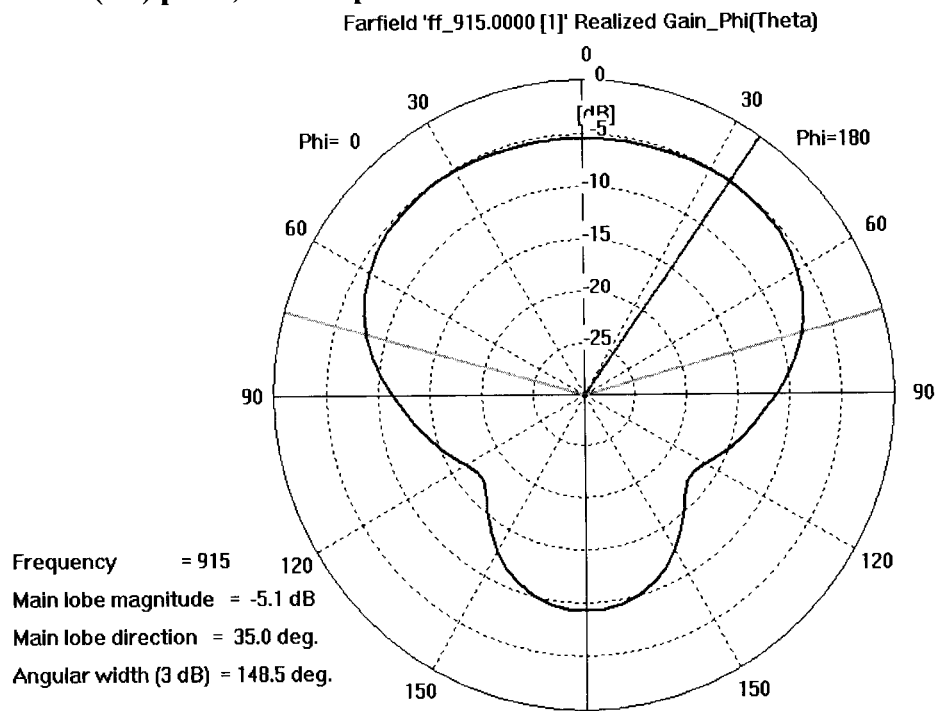

FIGS. 10A-10E depict characteristics of the F antenna 210D of FIG. 6D. The characteristics were determined through a simulation of the antenna located above the upper housing of a parking meter housing. FIG. 10A depicts the impedance matching characteristics of the F antenna 210D. FIGS. 10B-10E depict the transmission characteristics of the simulated antenna along different planes.

An improved location for an antenna of a wireless parking meter has been described above. The antenna is located above the upper housing of the parking meter housing within a fin cover that is constructed from a material with high permittivity to the RF signals used by the wireless parking meter. Although the fin cover provides for the desirable placement of the antenna above the upper housing of the parking meter, the antenna may be located in other positions. For example, as described above, the fin cover may be located on a portion of the parking meter housing. Furthermore, as described below, the antenna may also be located within the housing of the parking meter.

Figure 11C:
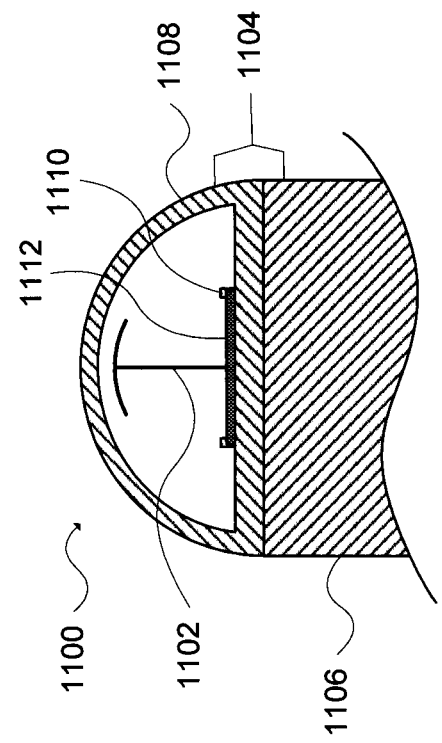
FIG. 11A-11C depict schematics of an alternative antenna arrangement of an illustrative parking meter with improved antenna placement.
Figure 11A:
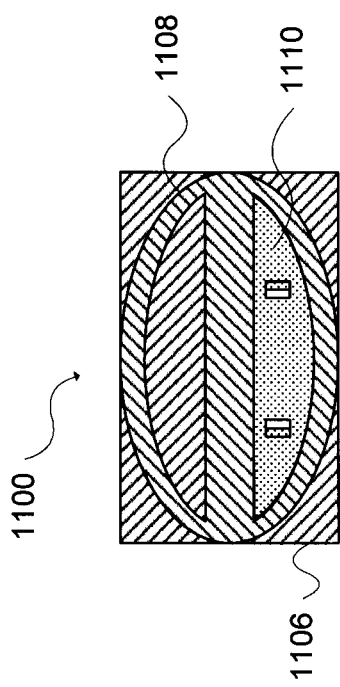
Figure 11B:
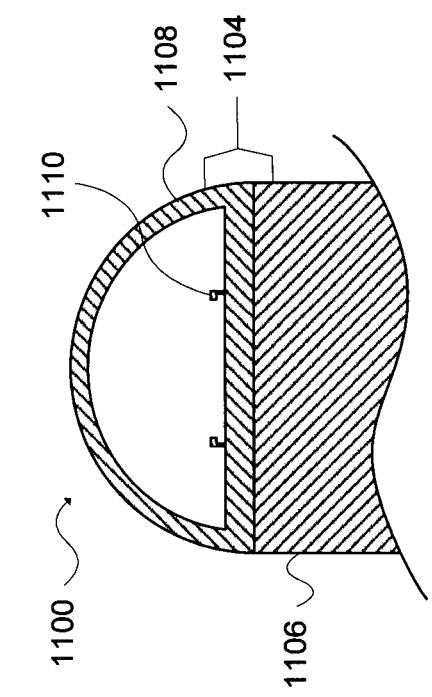

FIG. 11A-11C depict various views of an alternative embodiment of a wireless parking meter 1100. As seen in FIG. 11C, an antenna 1102 can be located within the housing 1104, above the lower mechanism housing 1106. The antenna 1102 is positioned within the opening of the upper housing 1108. A dome cover, such as dome cover 404, provides a transmission path, which has a high permittivity to RF signals. The upper housing 1108 may include a radio board holder 1110 for securing the radio board 1112, which may include the radio control module. The antenna 1102 may be positioned in front of the display as depicted, or may be located to one side of the display.

Unlike the antennas described above with reference to FIGS. 6A-D, which are formed on the radio board, the antenna 1102 is made from a self supporting wire that allows the antenna 1102 to be positioned vertically within the dome opening in the upper housing 1108, above the lower mechanism housing 1106. The self supported wire allows the antenna 1102 to be positioned in front of the display without blocking, or interfering with, the visibility of the display. The self supported antenna 1102 may be formed into various shapes. A T antenna is depicted in FIG. 11C.

Although the fin cover locates the antenna above the upper housing, it may require that the upper housing be modified to include a fin cover opening to allow the fin cover to protrude from the upper housing. While the self supported antenna may be positioned within the housing, and so avoid modification of the upper housing, it may not have as advantageous transmission characteristics as the fin cover placement. The display and the upper mechanical housing may provide a transmission path on one side of the antenna with low permittivity to the RF signals. Although one side of the antenna may be blocked by the relatively low permittivity of the display and upper mechanism housing, the transmission path from the other side of the antenna will advantageously pass through the opening in the upper housing through the dome cover. The dome cover is made from a transparent material with high permittivity to the RF signals.

As described herein, locating the antenna of the wireless parking meter so that the RF signals will have a transmission path that passes at least partly through a portion of the parking meter with high permittivity to RF signals, allows for more efficient transmission of RF signals. The more efficient transmission of RF signals from the wireless parking meter may provide either a more power efficient wireless parking meter, a wireless parking meter with extended communication range, or both.

Furthermore, the transmission efficiency can also be improved by improving the shape of the antenna. As described herein, a 'T' shaped antenna has superior transmission characteristics than previous antennas used in wireless parking meters. Although, the 'T' shape provides the best transmission characteristics according to the simulations and calculations performed, the 'L' shaped and 'F' shaped antennas also provided superior transmission characteristics for use in a wireless parking meter over a typical monopole antenna.

The embodiments described above are intended to be illustrative only. The scope of the invention is therefore intended to be limited solely by the scope of the appended claims.

What is claimed is:

1. A parking meter comprising:
   parking meter mechanism components comprising:
     an antenna for transmitting and receiving Radio Frequency (RF) signals; and
     a radio control module connected to the antenna;
   an exterior housing at least partially enclosing the parking meter mechanism components, the exterior housing providing protection to the enclosed parking meter mechanism components from an exterior environment; and
   a transmission path providing low attenuation of the RF signals transmitted from and received by the antenna.

2. The parking meter of claim 1, wherein the exterior housing comprises at least a first portion and a second portion separable from the first portion.

3. The parking meter of claim 2, wherein the first portion of the exterior housing is securable to the second portion of the exterior housing.

4. The parking meter of claim 3, wherein the first portion comprises a lower vault housing secured to a parking location and a lower meter housing.

5. The parking meter of claim 1, wherein the parking meter mechanism components are secured to a frame providing a removable mechanism component that can be removed from the exterior housing as a single component.

6. The parking meter of claim 1, wherein the antenna is part of a radio board comprising the radio control module.

7. The parking meter of claim 6, wherein the radio board is located within a removable cover that includes the transmission path.

8. The parking meter as claimed in claim 1, wherein the radio control module is located on a radio board and the antenna comprises a trace of a configuration of the antenna on the radio board.

9. The parking meter as claimed in claim 8, wherein the configuration of the antenna trace is selected from the group consisting of:
   a 'T' shape;
   an 'F' shape; and
   an 'L' shape.

10. The parking meter of claim 1, wherein at least a portion of the transmission path is made from a different material from the exterior housing.

11. The parking meter of claim 1, wherein the material of the transmission path is selected from the group consisting of:
   LEXAN;
   CYCOLOY;
   GELOY;
   XENOY;

XYLEX;
NORYL;
ULTEM; and
VALOX.

12. The parking meter of claim 1, further comprising an antenna cover, wherein the transmission path is part of the antenna cover.

13. The parking meter of claim 12, wherein the antenna cover is a separate component from the exterior housing and secured to the exterior housing.

14. The parking meter of claim 1, wherein the parking meter components comprise one or more of:
- a display;
- a coin chute;
- a card reader; and
- a processing board.

* * * * *